(12) United States Patent
Lee et al.

(10) Patent No.: US 10,327,172 B2
(45) Date of Patent: *Jun. 18, 2019

(54) LONG TRAINING FIELD SEQUENCE CONSTRUCTION

(71) Applicant: NEWRACOM, INC., Irvine, CA (US)

(72) Inventors: Daewon Lee, Irvine, CA (US); Sungho Moon, Irvine, CA (US); Yujin Noh, Irvine, CA (US); Minho Cheong, Irvine, CA (US)

(73) Assignee: Newracom, Inc., Lake Forest, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 15/452,567

(22) Filed: Mar. 7, 2017

(65) Prior Publication Data

US 2017/0181034 A1   Jun. 22, 2017

Related U.S. Application Data

(63) Continuation of application No. 15/079,007, filed on Mar. 23, 2016, now Pat. No. 9,628,310.

(Continued)

(51) Int. Cl.
*H04W 28/06* (2009.01)
*H04L 27/26* (2006.01)
*H04L 25/00* (2006.01)
*H04L 25/02* (2006.01)
(Continued)

(52) U.S. Cl.
CPC ........... *H04W 28/065* (2013.01); *H04L 25/00* (2013.01); *H04L 25/0204* (2013.01);
(Continued)

(58) Field of Classification Search
CPC ....... H04L 27/26; H04L 1/0643; H04L 25/00; H04L 25/0204; H04L 25/0226;
(Continued)

(56) References Cited

U.S. PATENT DOCUMENTS 8,767,848 B2 * 7/2014 Kim ................... H04J 11/0079
375/260
8,879,472 B2   11/2014 Porat
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Man U Phan
(74) *Attorney, Agent, or Firm* — Morgan, Lewis & Bockius LLP

(57) ABSTRACT

In wireless communications for a 20 megahertz (MHz) channel bandwidth, a first device may determine a high efficiency long training field (HE-LTF) mode. The first device may generate an HE-LTF symbol by using a portion or an entirety of an HE-LTF sequence corresponding to the channel bandwidth and HE-LTF mode. The first device may transmit, in the channel bandwidth, a high efficiency physical layer protocol data unit (HE PPDU) that includes the HE-LTF symbol. A second device may receive, in the 20 MHz channel bandwidth, a downlink HE PPDU that includes an HE-LTF symbol. The second device may obtain, from the HE-LTF symbol, a portion or an entirety of an HE-LTF sequence corresponding to the channel bandwidth and an HE-LTF mode of the HE-LTF symbol. The downlink HE PPDU may be the HE PPDU from the first device. Other methods, apparatus, and computer-readable media are also disclosed.

20 Claims, 47 Drawing Sheets

Related U.S. Application Data

(60) Provisional application No. 62/214,139, filed on Sep. 3, 2015, provisional application No. 62/214,156, filed on Sep. 3, 2015, provisional application No. 62/157,849, filed on May 6, 2015, provisional application No. 62/236,815, filed on Oct. 2, 2015, provisional application No. 62/250,944, filed on Nov. 4, 2015, provisional application No. 62/264,812, filed on Dec. 8, 2015, provisional application No. 62/138,302, filed on Mar. 25, 2015.

(51) Int. Cl.
*H04B 7/0452* (2017.01)
*H04L 1/06* (2006.01)

(52) U.S. Cl.
CPC .......... *H04L 25/0226* (2013.01); *H04L 27/26* (2013.01); *H04L 27/2613* (2013.01); *H04B 7/0452* (2013.01); *H04L 1/0643* (2013.01); *H04L 27/2614* (2013.01)

(58) Field of Classification Search
CPC ........... H04L 27/2613; H04L 27/2614; H04W 28/065; H04W 28/06; H04B 7/0452
USPC ........................................................ 370/328
See application file for complete search history.

(56) References Cited

U.S. PATENT DOCUMENTS

| | | | |
|---|---|---|---|
| 8,948,284 B2* | 2/2015 | Park | H04L 27/2613 375/259 |
| 2008/0049654 A1* | 2/2008 | Otal | H04W 28/06 370/311 |
| 2014/0301412 A1* | 10/2014 | Kim | H04J 3/0602 370/476 |
| 2015/0063288 A1 | 3/2015 | Yang et al. | |
| 2015/0365263 A1* | 12/2015 | Zhang | H04L 1/0057 375/295 |
| 2015/0365266 A1* | 12/2015 | Zhang | H04L 1/0057 370/330 |
| 2016/0056943 A1* | 2/2016 | Stacey | H04L 5/0091 370/338 |
| 2016/0065467 A1* | 3/2016 | Wu | H04L 65/60 370/392 |
| 2016/0165524 A1* | 6/2016 | Kim | H04W 52/02 370/338 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner $VHTLTF_{-28,28} = \{1, 1, LTF_{left}, 0, LTF_{right}, -1, -1\}$

FIG. 7A $VHTLTF_{-58,58} = \{VHTLTF_{left}, 0, 0, 0, VHTLTF_{right}\}$

FIG. 7B $VHTLTF_{-122,122} = \{VHTLTF_{left}, 1, -1, 1, 1, VHTLTF_{right}, 1, -1, 1, 1, -1, 1, 0, 0, 0, 1, -1, -1, 1, VHTLTF_{left}, 1, -1, 1, 1, VHTLTF_{right}\}$

FIG. 7C $VHTLTF_{-250,250} = \{VHTLTF_{-122,122}, 0, 0, 0, 0, 0, 0, 0, 0, 0, 0, 0, VHTLTF_{-122,122}\}$

FIG. 7D

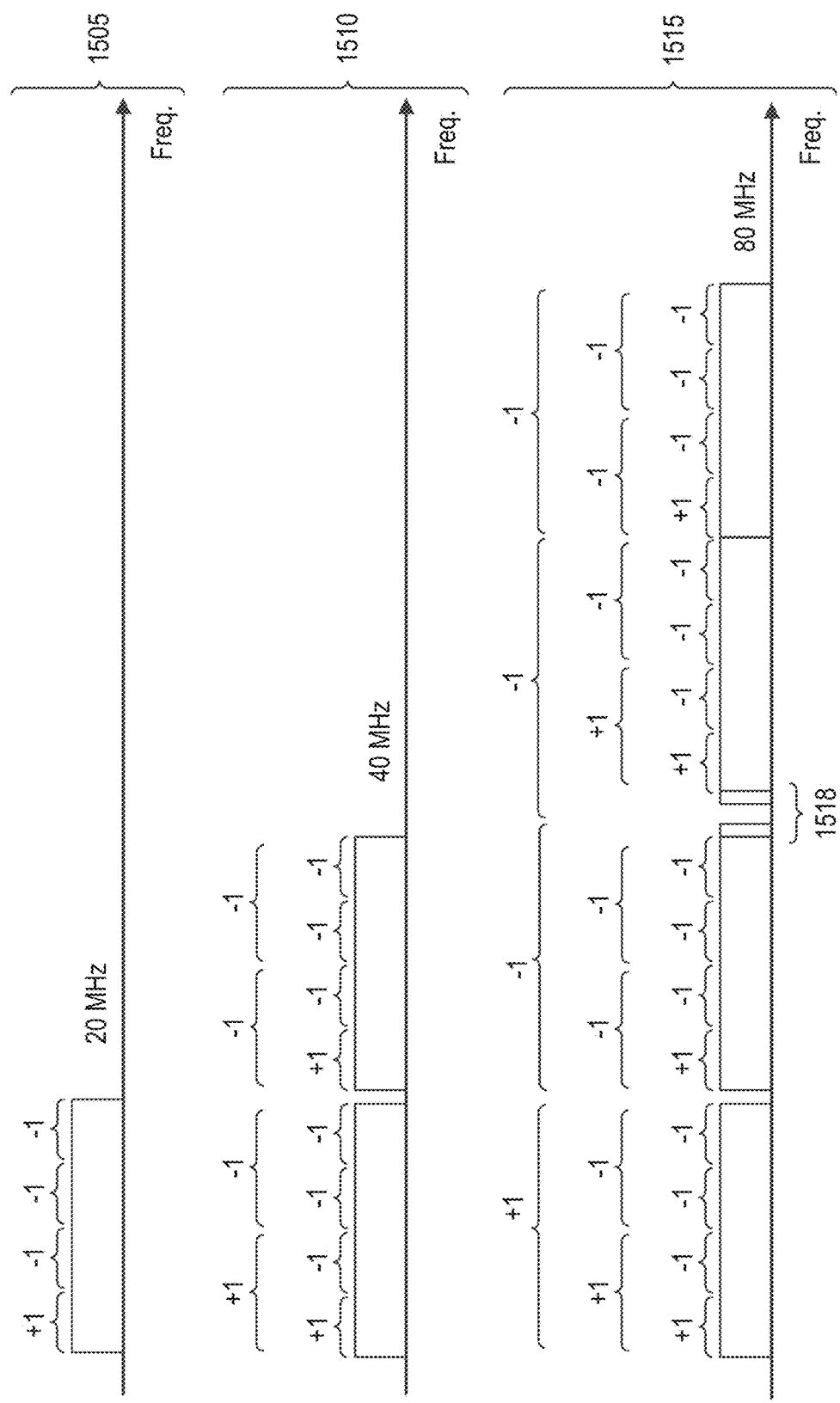

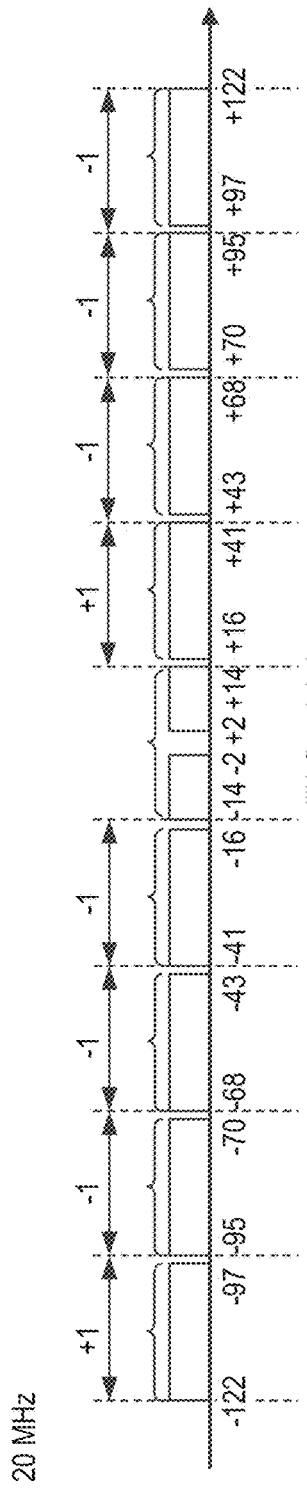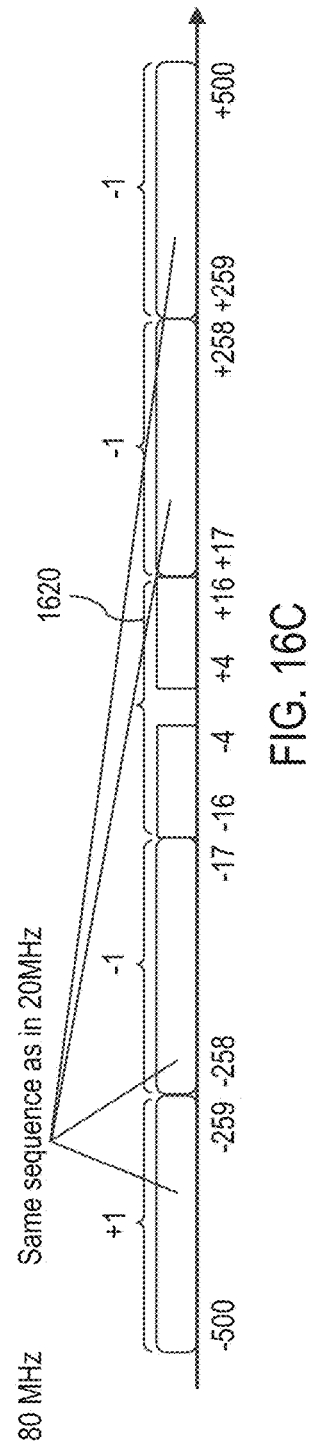
FIG. 16A
FIG. 16B
FIG. 16C

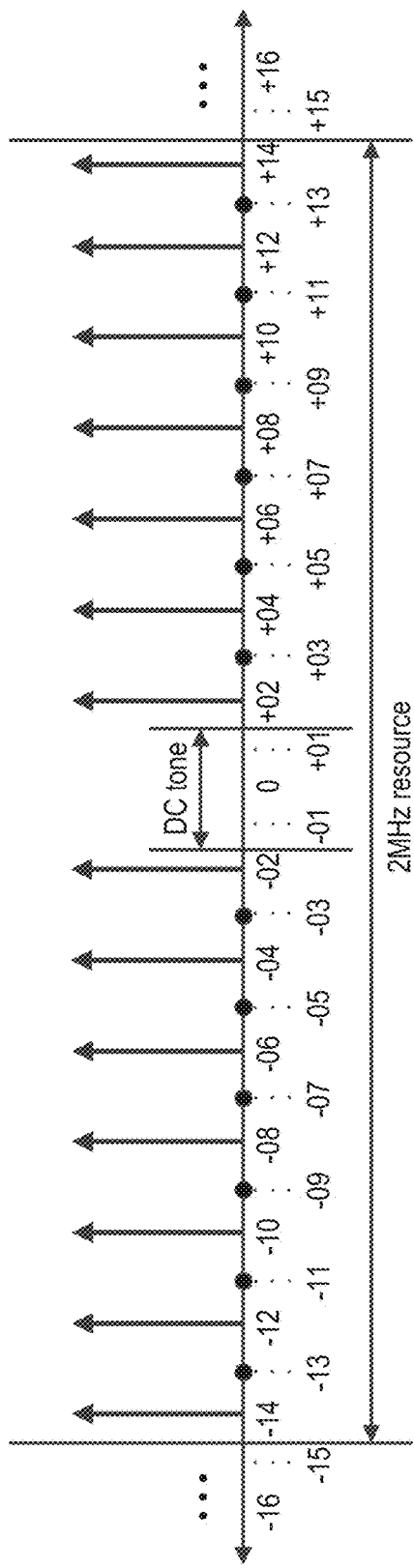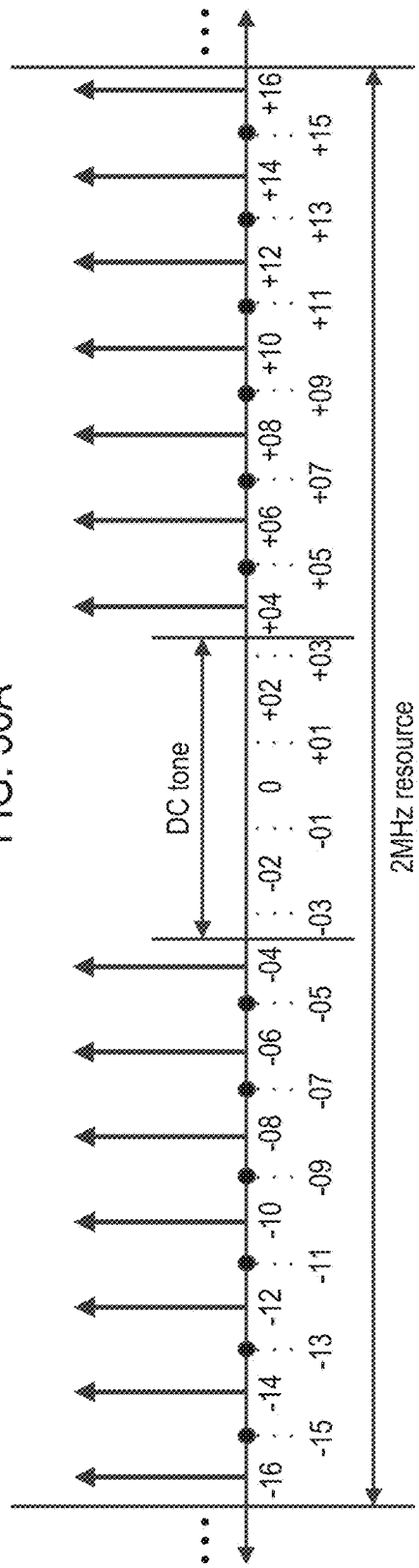
FIG. 36A
FIG. 36B

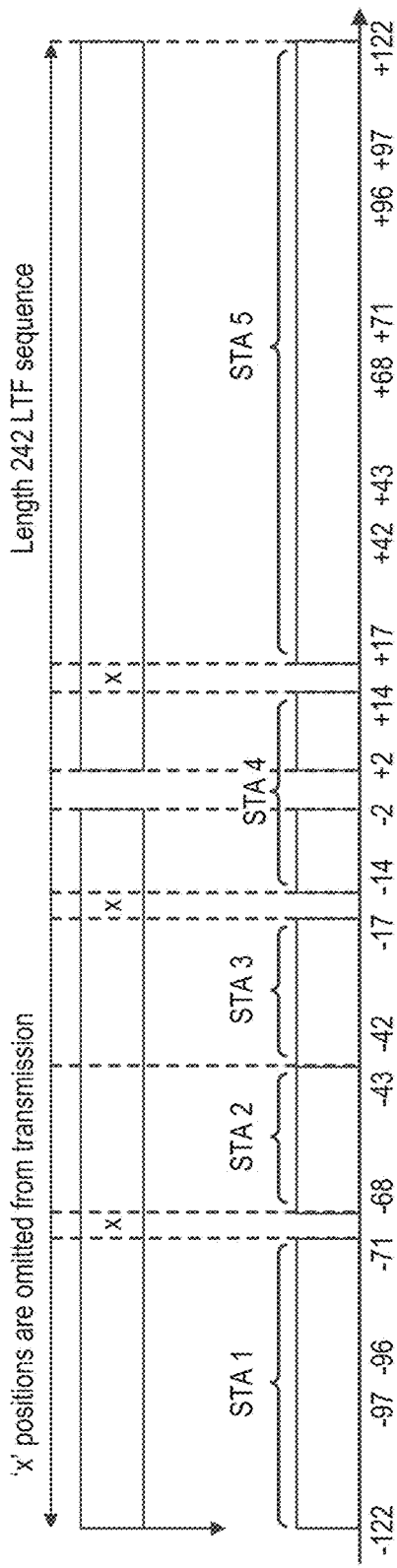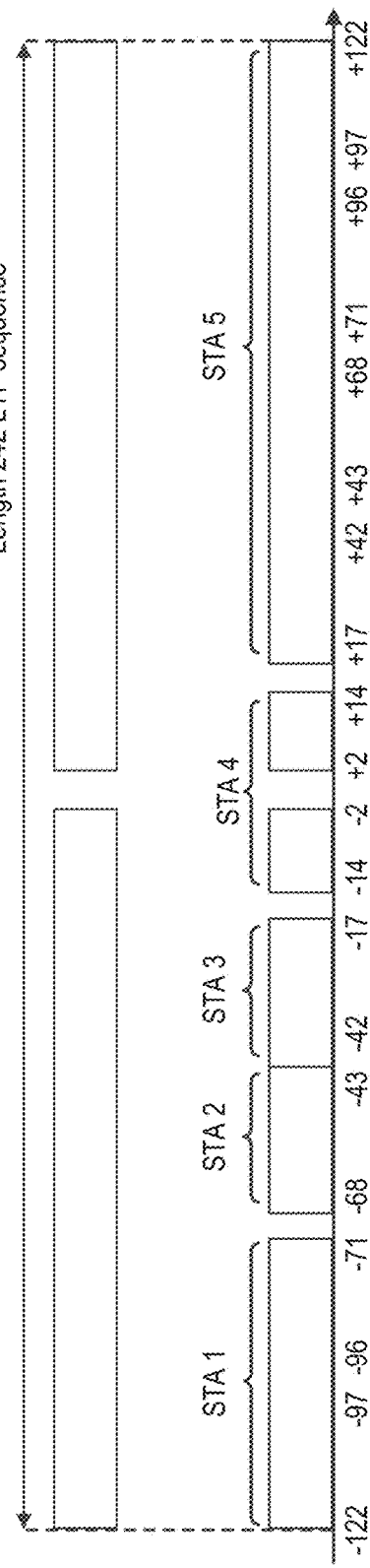

1

LONG TRAINING FIELD SEQUENCE CONSTRUCTION

CROSS-REFERENCE TO RELATED APPLICATIONS

This application is a continuation of U.S. patent application Ser. No. 15/079,007, entitled "LONG TRAINING FIELD SEQUENCE CONSTRUCTION", filed Mar. 23, 2016, which claims the benefit of priority from U.S. Provisional Application No. 62/138,302, entitled "LTF SEQUENCE DESIGN FOR 11AX", filed Mar. 25, 2015, U.S. Provisional Application No. 62/157,849, entitled "LTF SEQUENCE DESIGN FOR 11AX", filed May 6, 2015, U.S. Provisional Application No. 62/214,139, entitled "LONG TRAINING FIELD SEQUENCE CONSTRUCTION", filed Sep. 3, 2015, U.S. Provisional Application No. 62/214,156, entitled "LTF SEQUENCE DESIGN FOR 11AX", filed Sep. 3, 2015, U.S. Provisional Application No. 62/236,815, entitled "LTF SEQUENCE DESIGN FOR 11AX", filed Oct. 2, 2015, U.S. Provisional Application No. 62/250,944, entitled "LTF SEQUENCE DESIGN FOR 11AX", filed Nov. 4, 2015, and U.S. Provisional Application No. 62/264,812, entitled "LTF SEQUENCE DESIGN FOR 11AX", filed Dec. 8, 2015, the entirety of each of which is incorporated herein by reference.

TECHNICAL FIELD

The present description relates in general to wireless communication systems, and more particularly to, for example, without limitation, long training field sequence construction.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 7A through 7D illustrate examples of applying a phase rotation to a VHT long training field (LTF) sequence.

FIG. 15 illustrates an example of applying phase rotation hierarchically.

FIGS. 16A through 16C illustrate examples of applying phase rotations hierarchically.

FIGS. 36A and 36B illustrate examples of an even sub-sampling of a 26-length sequence.

FIGS. 42 through 44 illustrate examples of LTF transmission for uplink and downlink.

Figure 1:
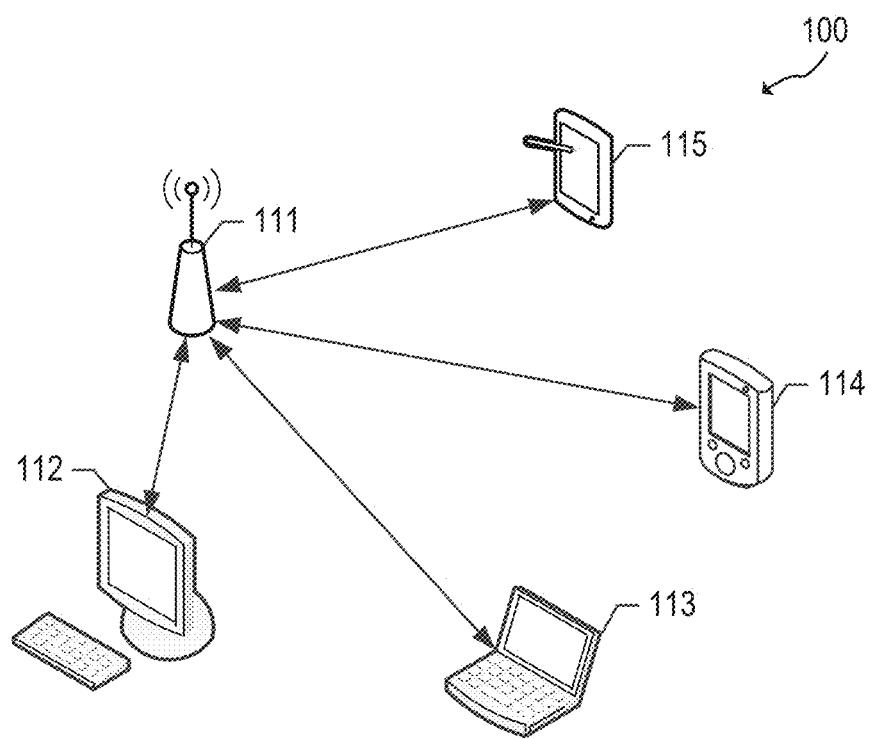
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

One or more aspects of the present disclosure relate to increasing efficiency in wireless communications and improving user experience in wireless environments. One or more aspects of the present disclosure provide techniques for constructing a long training field (LTF) sequence for a preamble of a high efficiency (HE)-based transmission. Such an LTF sequence may be referred to as an HE LTF sequence. Peak-to-average power ratio (PAPR) may be utilized to evaluate HE LTF sequences, with HE LTF sequences of lower PAPR values generally being more desirable. One or more aspects of the present disclosure utilizes orthogonal frequency-division multiple access (OFDMA).

In one or more implementations, HE LTF sequences are constructed for various channel bandwidths (e.g., 20 MHz, 40 MHz, 80 MHz, 160 MHz, and 80+80 MHz). Phase rotation may be applied to tones (e.g., blocks of tones) within an HE LTF sequence, where one or more reserved tones may be included into such blocks. Further, hierarchical phase rotation may be utilized. In one aspect, usable center tones are optimized so that their corresponding PAPR values may be lowered. In one aspect, an HE LTF sequence may be subsampled so that a subset of the HE LTF sequence (e.g., about a half of the elements of the HE LTF sequence) is transmitted. In downlink-OFDMA (DL-OFDMA), in some aspects, a station (e.g., an access point) transmits an HE LTF sequence only for those tones that have been allocated to the stations that participate in the OFDMA communication. In one aspect, an access point transmits an HE LTF sequence for the data/pilot tones allocated to the stations as well as reserved tones. In uplink-OFDMA (UL-OFDMA), each station that participates in the OFDMA communication may transmit a subset of an HE LTF sequence, where the subset is associated with the tones that have been allocated to the station. In one or more aspects, wireless communications utilizing HE LTF sequences can allow for lower PAPR and/or higher transmission efficiency.

FIG. 1 illustrates a schematic diagram of an example of a wireless communication network. In the wireless communication network 100, such as a wireless local area network (WLAN), a basic service set (BSS) includes a plurality of wireless communication devices (e.g., WLAN devices). In one aspect, a BSS refers to a set of stations (STAs) that can communicate in synchronization, rather than a concept indicating a particular area. In this example, the wireless communication network 100 includes wireless communication devices 111-115, which may be referred to as stations (STAs).

Each of the wireless communication devices 111-115 may include a medium access control (MAC) layer and a physical (PHY) layer according to an Institute of Electrical and Electronics Engineers (IEEE) 802.11 standard. In this example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in Ad-hoc networking.

An AP STA and a non-AP STAs may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

One or more implementations of the present disclosure relate to a High Efficiency (HE) WLAN system in which an HE STA supporting the IEEE 802.11ax standard may coexist with one or more non-HE STAs, such as a very high throughput (VHT) STA supporting the IEEE 802.11ac standard, an HT STA supporting the IEEE 802.11n, and/or a legacy STA (e.g., a non-HT STA supporting the IEEE 802.11a/b/g standard). The IEEE 802.11a/b/g/n/ac standards are incorporated herein by reference. Further, one or more aspects of the present disclosure relate to OFDMA, which is a technique that can be used in next generation WLAN technologies such as the HE technologies (e.g., technologies supporting the IEEE 802.11ax standard). In one or more aspects, the present disclosure relates to WLAN indoor and outdoor operation in the 2.4 GHz and the 5 GHz frequency bands. Additional bands (e.g., bands between 1 GHz and 6 GHz) may be added as they become available.

Figure 2:
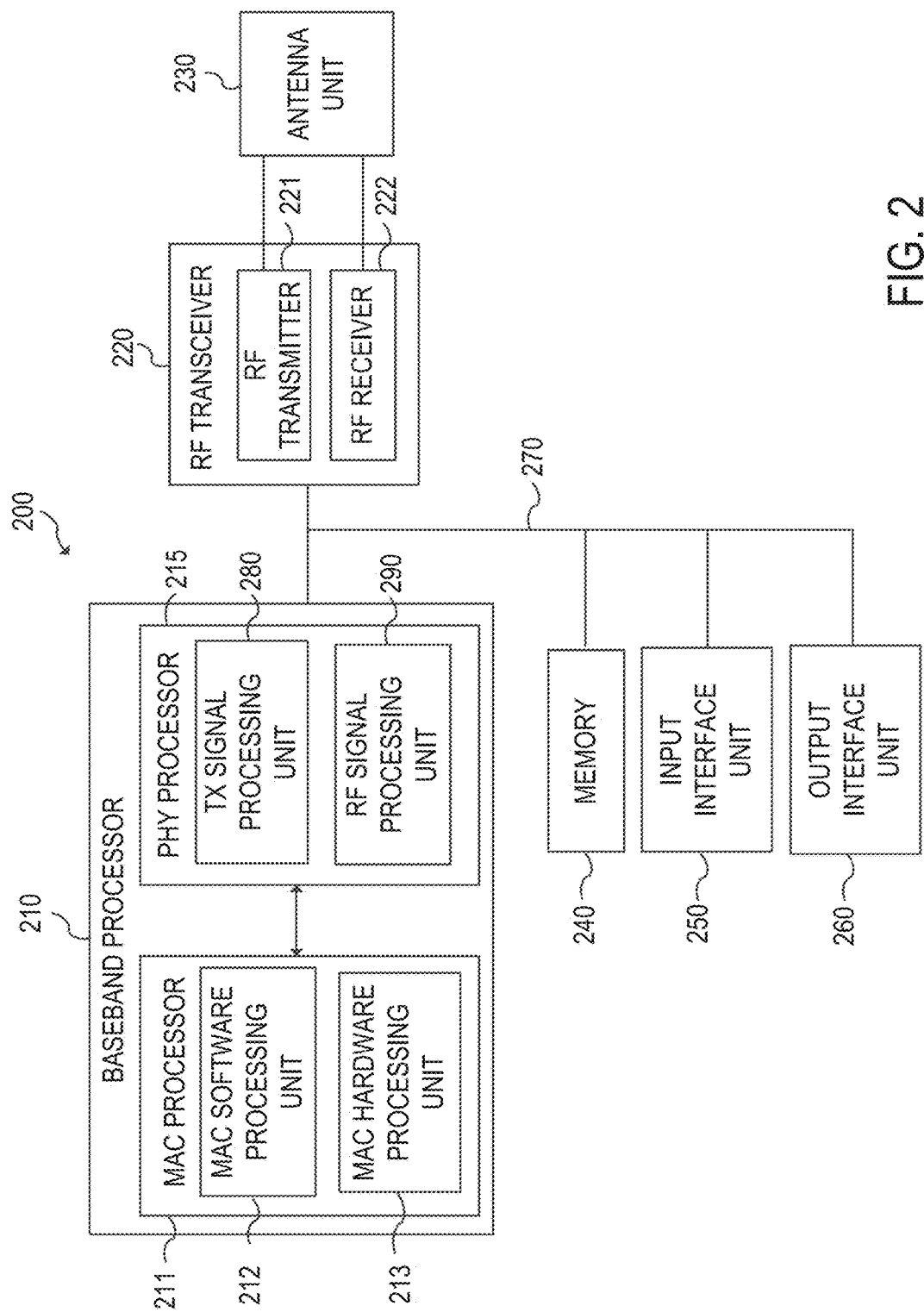
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In this example, the baseband processor 210 performs baseband signal processing, and includes a medium access control (MAC) processor 211 and a physical layer (PHY) processor 215. The memory 240 may store software (such as MAC software) including at least some functions of the MAC layer. The memory may further store an operating system and applications.

In this illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation.

The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multiple-input multiple-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 215, 280, 290), the one or more processors cause one or more operations of the subject disclosure to occur or cause an apparatus (e.g., a wireless communication device 200) to perform operations or a method of the subject disclosure.

Figure 3A:
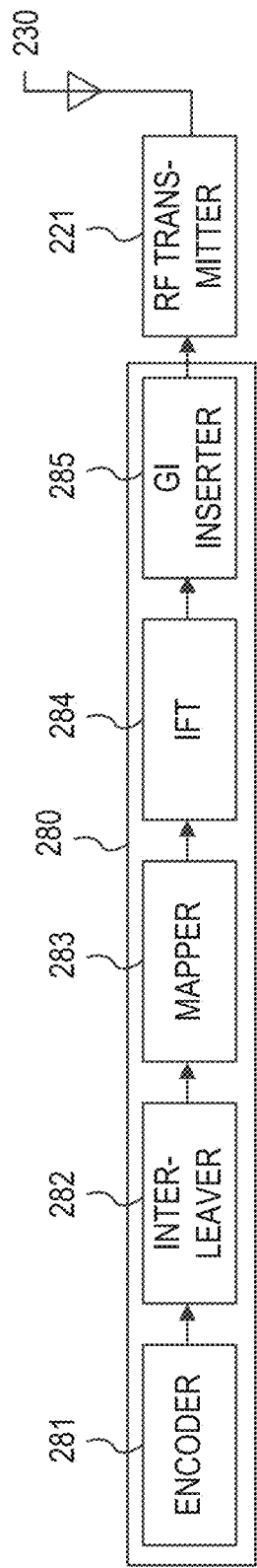
FIG. 3A illustrates a schematic block diagram of an example of a transmitting signal processor in a wireless communication device.

FIG. 3A illustrates a schematic block diagram of an example of a transmitting signal processing unit in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. In one or more implementations, the transmitting signal processing unit 280 includes a scrambler (not shown) for scrambling the input data before the encoding operation to reduce the probability of long sequences of zeroes or ones.

If BCC encoding is used in the encoder 281, the transmitting signal processing unit 280 may further include an encoder parser for demultiplexing the scrambled bits among one or more BCC encoders. In one aspect, if LDPC encoding is used in the encoder 281, the transmitting signal processing unit 280 may not use the encoder parser.

The interleaver 282 interleaves the bits of each stream output from the encoder 281 to change the order of bits. In one aspect, interleaving may be applied only when BCC encoding is employed.

The mapper 283 maps the sequence of bits output from the interleaver 282 into constellation points. If the LDPC encoding is used in the encoder 281, the mapper 283 may further perform LDPC tone mapping instead of the constellation mapping.

When MIMO or MU-MIMO is employed, the transmitting signal processing unit 280 may use multiple instances of the interleaver 282 and multiple instances of the mapper 283 corresponding to the number of spatial streams ($N_{SS}$). In this example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
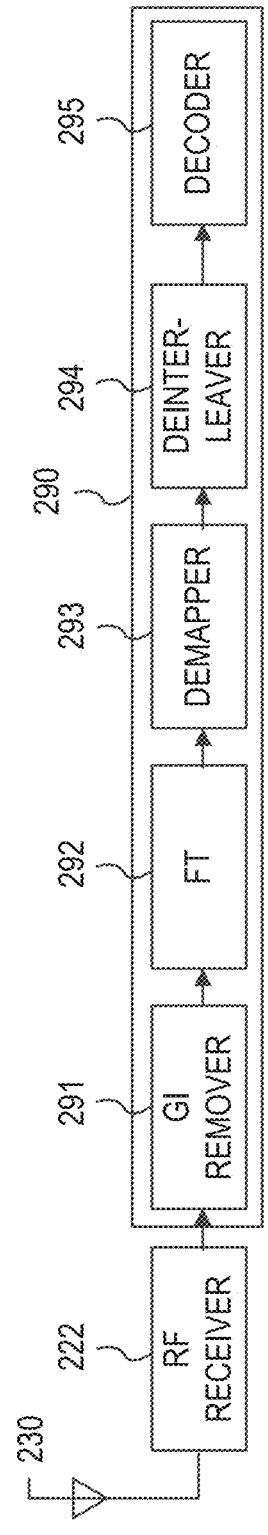
FIG. 3B illustrates a schematic block diagram of an example of a receiving signal processor in a wireless communication device.

FIG. 3B illustrates a schematic block diagram of an example of a receiving signal processing unit in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In this example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

The receiving signal processing unit 290 may further include a descrambler for descrambling the decoded data. If BCC decoding is used in the decoder 295, the receiving signal processing unit 290 may further include an encoder deparser for multiplexing the data decoded by multiple instances of the BCC decoder. In one or more implementations, if LDPC decoding is used in the decoder 295, the receiving signal processing unit 290 may not use the encoder deparser.

Figure 4:
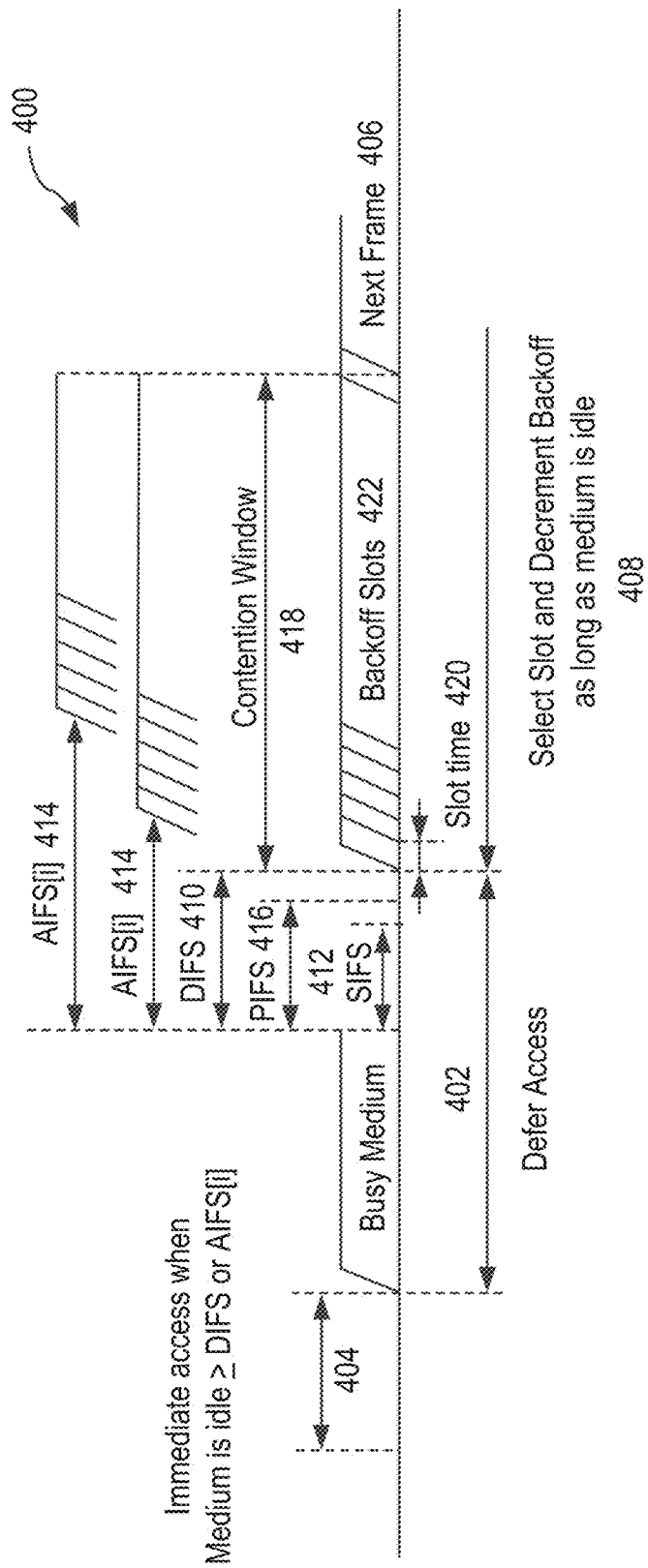
FIG. 4 illustrates an example of a timing diagram of interframe space (IFS) relationships between wireless communication devices.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
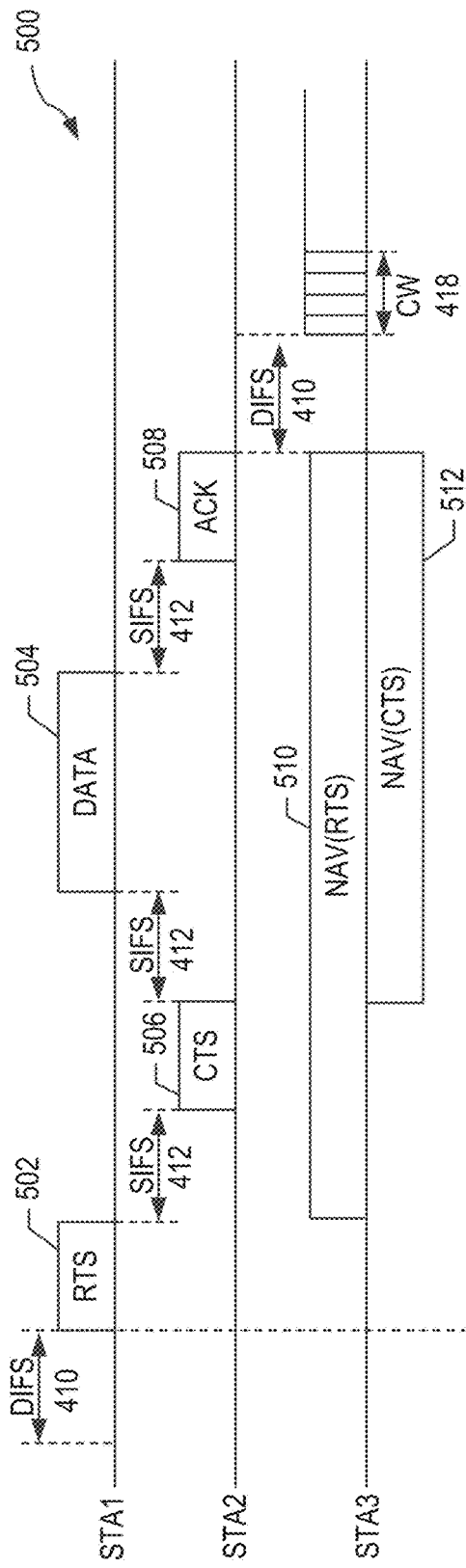
FIG. 5 illustrates an example of a timing diagram of a carrier sense multiple access/collision avoidance (CSMA/CA) based frame transmission procedure.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
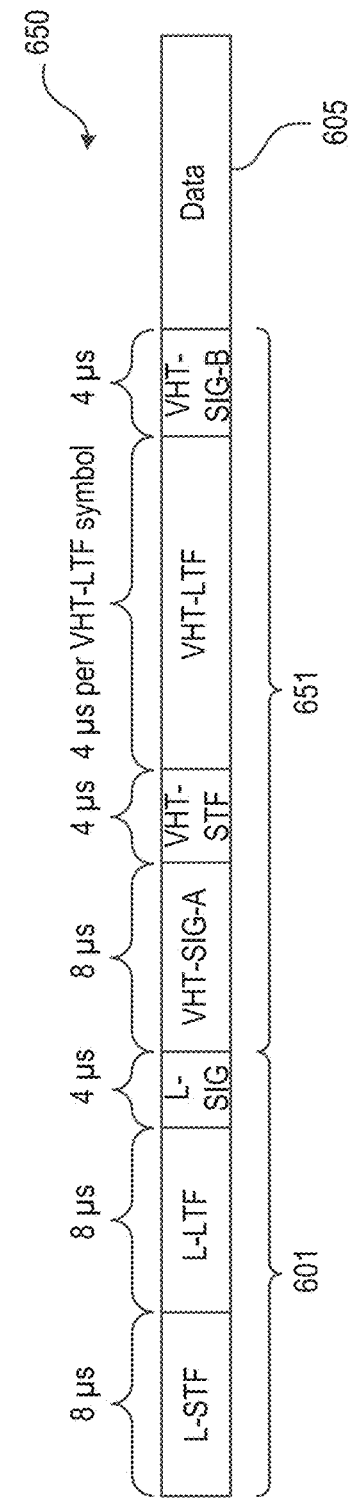
FIG. 6 illustrates a very high throughput (VHT) frame format.

FIG. 6 illustrates a very high throughput (VHT) frame format 650. The VHT frame format 650 is a physical layer convergence procedure (PLCP) protocol data unit (or PPDU) format. In the VHT format 650, packets of this format contain the legacy preamble 601 composed of a legacy (non-HT) short training field (L-STF), a legacy long training field (L-LTF), and a legacy signal field (L-SIG). The L-STF and L-LTF portions each has a duration of 8 microsecond (µs) per symbol whereas the L-SIG portion has a duration of 4 µs per symbol. The L-STF field may be utilized for packet detection, automatic gain control (AGC), and coarse frequency-offset correction. The L-LTF field may be utilized for channel estimation, fine frequency-offset correction, and symbol timing.

The remainder of the VHT frame format 650 includes a VHT specific portion 651 composed of a VHT-SIG-A field, a VHT-STF field, a VHT-LTF field, and a VHT-SIG-B field. The VHT frame format 650 also includes the data frame 605, which is composed of a service field, a scrambled PLCP service data unit (PSDU) field, a tail bits field and a pad bits field. The VHT-SIG-A field has a duration of 8 µs per symbol while the VHT-STF, the VHT-LTF and the VHT-SIG-B fields each has a duration of 4 µs per symbol.

Clause 22 specifies the PHY entity for a very high throughput (VHT) orthogonal frequency-division multiplexing (OFDM) system, which is identified in the IEEE Standard 802.11ac. In one or more implementations, a VHT STA transmits and receives PPDUs that are compliant with the PHY specifications defined in Clause 20. Clause 20 specifies the PHY entity for a HT OFDM system, which is identified in the IEEE Standard 802.11n. The VHT PHY is based on the HT PHY defined in Clause 20, which in turn is based on the OFDM PHY defined in Clause 18.

In one or more implementations, a VHT single-user (SU) PPDU includes individually addressed and group addressed transmissions. In some aspects, the VHT PHY provides support for 20 MHz, 40 MHz, 80 MHz and 160 MHz contiguous channel widths and support for 80+80 MHz non-contiguous channel width. The VHT PHY data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or low-density parity check (LDPC) coding) is used with coding rates of 1/2, 2/3, 3/4 and 5/6.

The VHT-LTF sequences for transmission use channel bandwidths (CBWs) of 20 MHz, 40 MHz, 80 MHz, and 160 MHz. Each VHT-LTF sequence is defined over a set of tone indices.

In a 20 MHz transmission, the VHT-LTF sequence transmitted is given by $$\text{VHTLTF}_{-28,28} = \{1, 1, \text{LTF}_{left}, 0, \text{LTF}_{right}, -1, -1\} \quad \text{Equation (1)}$$

where $$\text{LTF}_{left} = \{1, 1, -1, -1, 1, 1, -1, 1, -1, 1, 1, 1, 1, 1, \\ -1, -1, 1, 1, -1, 1, -1, 1, 1, 1, 1\} \quad \text{Equation (2)}$$

and $$\text{LTF}_{right} = \{1, -1, -1, 1, 1, -1, 1, -1, 1, -1, -1, -1, \\ -1, -1, 1, 1, -1, -1, 1, -1, 1, -1, 1, 1, 1, 1\} \quad \text{Equation (3)}$$

The VHTLTF$_{-28,28}$ sequence is defined for tone indices from −28 to +28.

In a 40 MHz transmission, the VHT-LTF sequence transmitted is given by $$\text{VHTLTF}_{-58,58} = \{\text{VHTLTF}_{left}, 0, 0, 0, \text{VHTLTF}_{right}\} \quad \text{Equation (4)}$$

where $$\text{VHTLTF}_{left} = \{\text{LTF}_{left}, 1, \text{LTF}_{right}, -1, -1, -1, 1\} \quad \text{Equation (5)}$$

and $$\text{VHTLTF}_{right} = \{-1, 1, 1, -1, \text{LTF}_{left}, 1, \text{LTF}_{right}\} \quad \text{Equation (6)}$$

The sequence VHTLTF$_{-58,58}$ is defined for tone indices from −58 to +58.

In an 80 MHz transmission, the VHT-LTF sequence transmitted is given by $$\text{VHTLTF}_{-122,122} = \{\text{LTF}_{left}, 1, \text{LTF}_{right}, -1, -1, -1, 1, \\ 1, -1, 1, -1, 1, 1, -1, \text{LTF}_{left}, 1, \text{LTF}_{right}, 1, -1, \\ 1, -1, 0, 0, 0, 1, -1, -1, 1, \text{LTF}_{left}, 1, \text{LTF}_{right}, \\ -1, -1, -1, 1, 1, -1, 1, -1, 1, -1, 1, 1, -1, \\ \text{LTF}_{left}, 1, \text{LTF}_{right}\} \quad \text{Equation (7)}$$

or equivalently $$\text{VHTLTF}_{-122,122} = \{\text{VHTLTF}_{left}, 1, -1, 1, \text{VHTLTF}_{right}, \\ 1, -1, 1, -1, 0, 0, 0, 1, -1, -1, 1, \\ \text{VHTLTF}_{left}, 1, -1, 1, \text{VHTLTF}_{right}\} \quad \text{Equation (8)}$$

The sequence VHTLTF$_{-122,122}$ is defined for tone indices from −122 to +122.

In a 160 MHz transmission, the VHT-LTF sequence transmitted is given by $$\text{VHTLTF}_{-250,250} = \{\text{VHTLTF}_{-122,122}, 0, 0, 0, 0, 0, 0, \\ 0, 0, 0, 0, \text{VHTLTF}_{-122,122}\} \quad \text{Equation (9)}$$

The sequence VHTLTF$_{-250,250}$ is defined for tone indices from −250 to +250.

The time domain representation of a waveform transmitted on frequency segment $i_{Seg}$ of transmit chain $i_{TX}$ is described by the following equation:

$$r_{VHT\text{-}LTF}^{(i_{Seg}, i_{Tx})}(t) = \quad \text{Equation (10)}$$

$$\frac{1}{\sqrt{N_{VHT\text{-}LTF}^{Tone} N_{STS,total}}} \sum_{n=0}^{N_{VHTLTF}-1} w_{T_{VHT\text{-}LTF}}(t - nT_{VHT\text{-}LTF}) \cdot$$

$$\sum_{k=-N_{SR}}^{N_{SR}} \sum_{u=0}^{N_{user}-1} \sum_{m=1}^{N_{STS,u}} ([Q_k^{(iseg)}]_{i_{Tx},(M_u+m)})$$

$$\gamma_{k,BW} [A_{VHTLTF}^k]_{(M_u+m),(n+1)} VHTLTF_k \cdot$$

$$\exp(j2\pi k \Delta_F (t - nT_{VHT\text{-}LTF} -$$

$$T_{GI} - T_{CS,VHT}(M_u + m))))$$

where $r_{VHT\text{-}LTF}^{(i_{Seg}, i_{Tx})}(t)$ represents the time domain signal, $w_{T_{VHT\text{-}LTF}}(t - nT_{VHT\text{-}LTF})$ represents a time domain windowing filter, and $\gamma_{k,BW}$ represents a phase rotation. More details are in the IEEE 802.11ac specification. With regard to the summation indices, k represents a tone index, u represents a user index, and m represents a spatial stream index (per user).

The $\gamma_{k,BW}$ is used to represent a rotation of the tones. BW in $\gamma_{k,BW}$ is determined by the TXVECTOR parameter CH_BANDWIDTH as provided in the following table:

| CH_BANDWIDTH and $\gamma_{k,BW}$ | |
| --- | --- |
| CH_BANDWIDTH | $\gamma_{k,BW}$ |
| CBW20 | $\gamma_{k,20}$ |
| CBW40 | $\gamma_{k,40}$ |
| CBW80 | $\gamma_{k,80}$ |
| CBW160 | $\gamma_{k,160}$ |
| CBW80 + 80 | $\gamma_{k,80}$ per frequency segment |

Phase rotation may be applied per 20 MHz bandwidth, such as in IEEE 802.11n and 802.11ac.

For a 20 MHz PPDU transmission, $$\gamma_{k,20} = 1 \quad \text{Equation (11)}$$

For a 40 MHz PPDU transmission, $$\gamma_{k,40} = \begin{cases} 1, & k < 0 \\ j, & k \geq 0 \end{cases} \quad \text{Equation (12)}$$

For an 80 MHz PPDU transmission, $$\gamma_{k,80} = \begin{cases} 1, & k < -64 \\ -1, & k \geq -64 \end{cases} \quad \text{Equation (13)}$$

which can be written equivalently as:

$$\gamma_{k,80} = \begin{cases} 1, & k < -64 \\ -1, & -64 \leq k < 0 \\ -1, & 0 \leq k < 64 \\ -1, & 64 \leq k \end{cases} \quad \text{Equation (14)}$$

For a 160 MHz PPDU transmission, $$\gamma_{k,160} = \begin{cases} 1, & k < -192 \\ -1, & -192 \leq k < 0 \\ 1, & 0 \leq k < 64 \\ -1, & 64 \leq k \end{cases} \quad \text{Equation (15)}$$

FIGS. 7A through 7D illustrate examples of applying a phase rotation to a VHT-LTF sequence. For each VHT-LTF sequence, the DC tone at tone index k=0 is labeled. A value above each of the brackets denotes a phase rotation value that will be multiplied (e.g., applied) to the subset of the sequence within the bracket.

FIG. 7A illustrates an example of applying the phase rotation provided in Equation (11) to the VHTLTF$_{-28,28}$ sequence provided in Equation (1). In this case, the resulting sequence is the same as VHTLTF$_{-28,28}$, since applying the phase rotation provided by Equation (11) involves multiplying each element of the VHTLTF$_{-28,28}$ sequence by 1.

FIG. 7B illustrates an example of applying the phase rotation provided in Equation (12) to the VHTLTF$_{-58,58}$ sequence provided in Equation (4). In this case, the resulting sequence is provided by $\{1 \cdot [\text{VHTLTF}_{left}, 0], j \cdot [0, 0, \text{VHTLTF}_{right}]\}$. The character "·" refers to multiplication.

FIG. 7C illustrates an example of applying the phase rotation provided in Equation (13), or equivalently Equation (14), to the VHTLTF$_{-122,122}$ sequence provided in Equation (8). In this case, the resulting sequence is provided by $\{1 \cdot [\text{VHTLTF}_{left}, 1], -1 \cdot [-1, 1, \text{VHTLTF}_{right}, 1, -1, 1, -1, 0, 0, 0, 1, -1, -1, 1, \text{VHTLTF}_{left}, 1, -1, 1, \text{VHTLTF}_{right}]\}$ FIG. 7D illustrates an example of applying the phase rotation provided in Equation (15) to the VHTLTF$_{-250,250}$ sequence provided in Equation (9).

Figure 8:
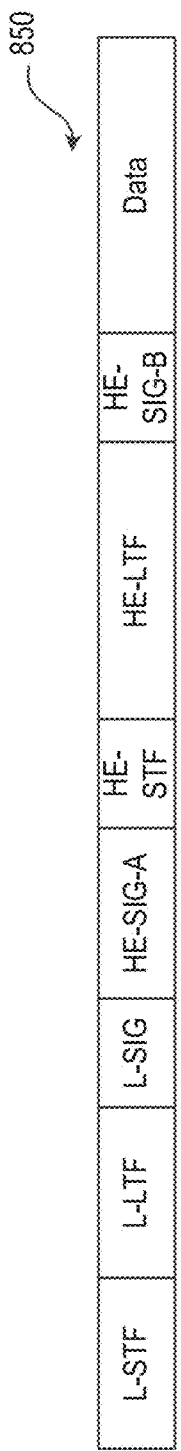
FIG. 8 illustrates an example of a high efficiency (HE) frame.

FIG. 8 illustrates an example of a high efficiency (HE) frame 850. The HE frame 850 is in a PPDU format. The HE frame 850 includes a preamble and a payload. A preamble (e.g., some or all fields before the last field in FIG. 8) includes a legacy preamble and an HE preamble.

The legacy preamble comprises: L-STF, L-LTF, and L-SIG. Presence of these legacy symbols would make any new design compatible with the legacy designs and products. In one or more implementations, the legacy STF, LTF and SIG symbols are modulated/carried with FFT size of 64 on a 20 MHz sub-channel and the modulated symbols are duplicated on every 20 MHz sub-channel when a PPDU has a channel bandwidth wider than 20 MHz (e.g., 40 MHz, 80 MHz, 160 MHz, or 80+80 MHz). In addition appropriate phase rotation may be applied.

The HE preamble may include HE SIG-A, HE STF, HE LTF and HE SIG-B. The HE SIG-A and HE SIG-B are symbols that carry control information that may be vital regarding each PSDU and regarding the radio frequency (RF), PHY, and MAC properties of a PPDU. In the present disclosure, several fields are located either in HE SIG-A and/or HE SIG-B. The HE SIG-A and HE SIG-B can be carried/modulated using FFT size of 64 or 256 depending on implementation. In some implementations, an HE SIG-B is not present in a PPDU.

The HE short training field (STF) and HE long training field (LTF) are symbols used to perform necessary RF and PHY processing for each PSDU and/or for the whole PPDU. Depending on whether the HE STF/LTF symbols are beamformed, there may be two sets of such symbols. In one or more implementations, the present disclosure constructs LTF sequences that are utilized in an HE LTF field of an HE frame 850. In one or more aspects, an HE LTF sequence is predetermined. In one or more aspects, an HE LTF sequence is not random data. In one or more aspect, an HE LTF sequence is predetermined for each channel bandwidth and/or for each subband utilized. In one or more aspects, an HE LTF sequence is predetermined or selected based on any one or more of the following: one or more other HE LTF sequences, one or more LTF sub-sequences, one or more phase rotation values, and/or one or more subband allocation. In one or more aspects, an HE LTF sequence may be determined, selected, obtained, generated, or provided based on preexisting sequence, sub-sequence, information, functions, formula and/or method.

A payload (e.g., the last field depicted as data in FIG. 8) may include one or more payloads, or one or more data frames. A data frame may include a PLCP service data unit (PSDU), which includes data. In one or more aspects, data in a payload can include audio, image, video, text and/or other type of data. Such data (e.g., a video sequence) can change over time. In one aspect, such data is not predetermined. Data may be outputted at a STA using a visual, auditory, tactile, and/or sensory output device.

An HE frame may be a downlink (DL) frame or an uplink (UL) frame. An HE frame for transmission is associated with one of the channel bandwidths (e.g., 20 MHz, 40 MHz, 80 MHz, 160 MHz, or 80+80 MHz). In other words, an HE frame has a channel bandwidth, and it utilizes (or occupies) its channel bandwidth. An 80+80 MHz channel bandwidth utilizes (or occupies) two 80 MHz channel bandwidths, where the first 80 MHz bandwidth and the second 80 MHz bandwidth are non-contiguous.

In one aspect, a downlink frame may refer to a DL OFDMA frame, an HE DL OFDMA frame, a DL OFDMA PPDU, an HE DL OFDMA PPDU, a DL PPDU, or vice versa. In one aspect, an uplink frame may refer to a UL OFDMA frame, an HE UL OFDMA frame, a UL OFDMA PPDU, an HE UL OFDMA PPDU, a UL PPDU, or vice versa. In one aspect, a PPDU may refer to an HE PPDU or an OFDMA PPDU. In one aspect, a PPDU is a downlink frame or an uplink frame.

In one aspect, a preamble is referred to as a preamble header, a preamble field, a preamble section, a header, a header section, or vice versa. For the sake of brevity, a preamble may refer to a component of a preamble. Thus, in one aspect, a preamble may refer to one or more preambles (e.g., L-STF, L-LTF, L-SIG, HE SIG-A, HE STF, HE LTF, and/or HE SIG-B).

In one aspect, a legacy preamble (e.g., each or all of L-STF, L-LTF and L-SIG) is associated with a channel bandwidth of a frame (e.g., downlink frame or uplink frame). In one example, for a given channel bandwidth (e.g., 80 MHz) of a frame, a legacy preamble is modulated on the entire channel bandwidth of the frame (e.g., entire 80 MHz). In another example, a legacy preamble is modulated on a sub-channel (e.g., 20 MHz sub-channel) of the channel bandwidth (e.g., 80 MHz) and the modulated signal is duplicated on each of the remaining sub-channels (e.g., remaining three 20 MHz sub-channels) of the channel bandwidth to allow the legacy preamble to utilize the entire channel bandwidth.

In one aspect, an access point may allocate different portions of a channel bandwidth to different STAs. In one aspect, a portion of a channel bandwidth is allocated to a STA, and an HE LTF for the STA is associated with the portion of the channel bandwidth. In one aspect, a portion of a channel bandwidth may be a resource unit. In another aspect, a portion of a channel bandwidth may be one or more resource units. In yet another aspect, a portion of a channel bandwidth may be one or more blocks of a channel bandwidth.

One or more aspects of the present disclosure provide techniques for constructing an HE LTF sequence for an HE preamble of an HE-based transmission. In one aspect, an HE LTF sequence may be utilized for channel estimation. Channel estimation may be utilized to decode data transmitted and compensate for channel properties (e.g., effects, distortions). For example, when a preamble is transmitted through a wireless channel, various distortions may occur, and a training sequence in the HE LTF field is useful to reverse the distortion. This may be referred to as equalization. To accomplish this, the amount of channel distortion is measured. This may be referred to as channel estimation. In one aspect, channel estimation is performed using an HE LTF sequence, and the channel estimation may be applied to other fields that follow the HE LTF sequence.

Examples of numerologies are provided below for each of the 20 MHz, 40 MHz, 80 MHz, 160 MHz, and 80+80 MHz HE channel bandwidths. A channel bandwidth may be sometimes referred to as a transmission bandwidth. In the description provided below, for the sake of brevity, in one or more aspects, an LTF may refer to an HE LTF, an LTF sequence may refer to an HE LTF sequence, a sequence may refer to an HE LTF sequence, and a phase rotation block may refer to an HE phase rotation block.

Figure 9:
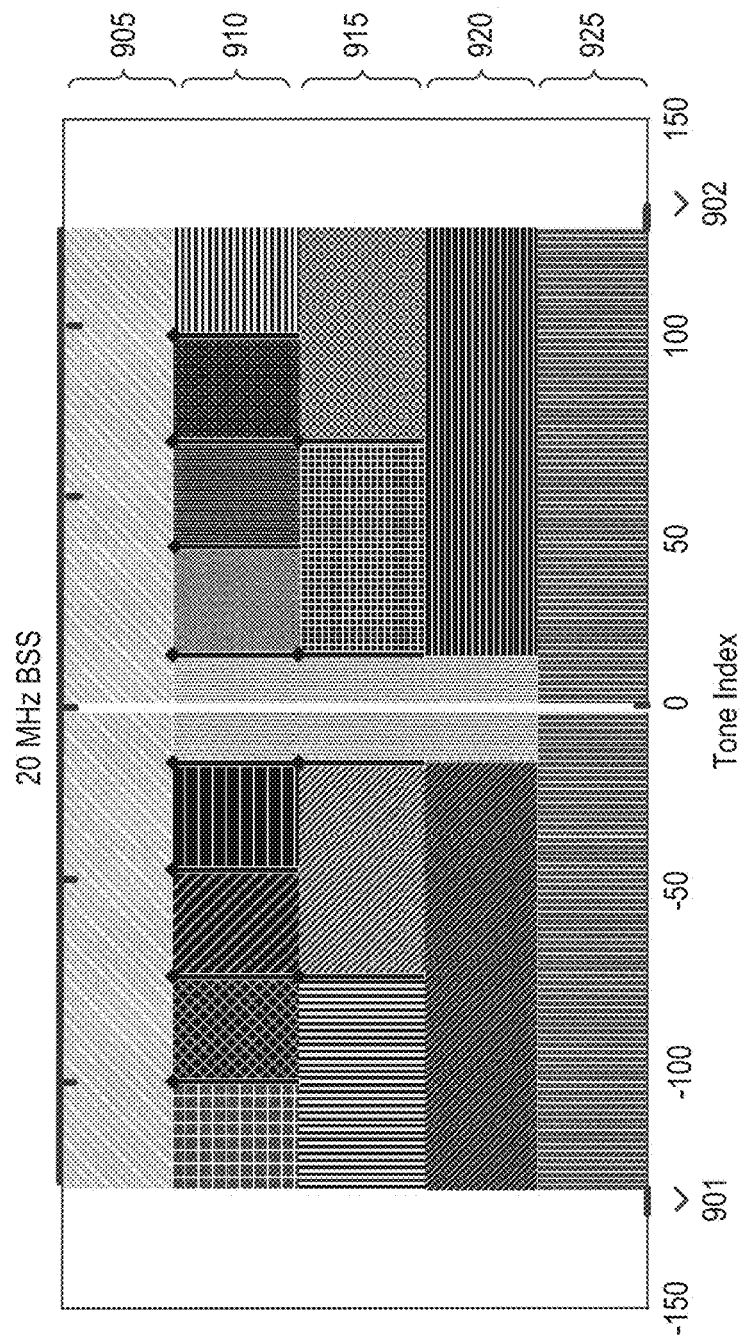
FIG. 9 illustrates example numerology for a 20 MHz channel bandwidth.

FIG. 9 illustrates an example numerology for a 20 MHz channel bandwidth. The numerology provides different manners by which to allocate resources for the 20 MHz channel bandwidth into individual resource units. A resource unit contains tones, where each tone may be a data tone or a pilot tone.

A tone may be referred to as subcarrier. Each tone may be associated with or otherwise identified by a tone index or a subcarrier index. A tone index may be referred to as a subcarrier index.

For a 20 MHz HE PPDU transmission, the 20 MHz may be divided into 256 tones with a 78.125 kHz spacing between tones. In this case, a signal may be transmitted on tone indices −122 to −2 and 2 to 122, with the tone indices −1, 0, and +1 being direct current (DC) tones. Hence, there may be a total of 242 usable tones, which do not include DC tones. The remaining 11 tones may be guard tones, where 6 tones may be for one edge of the bandwidth, and 5 tones may be for the other edge of the bandwidth. (See 901 and 902 in FIG. 9). In one aspect, usable tones do not include DC tones or guard tones.

A first row 905 illustrates an example of usable tones for a 20 MHz channel bandwidth. In one aspect, usable tones include data/pilot tones and any reserved tones. A data/pilot tone is a data tone or a pilot tone. A data/pilot tone is a tone that can be utilized as a data tone or a pilot tone. A reserved tone may be referred to as a null tone or a left over tone. A reserved tone may have zero energy.

A second row 910 illustrates a resource allocation of the 20 MHz bandwidth into multiple resource units. In one or more implementations, the 20 MHz bandwidth may be allocated into 9 resource units. Each non-center resource unit includes 26 data/pilot tones. A center resource unit includes 26 data/pilot tones and 3 DC tones. A center resource unit may be referred to as a central resource unit. One reserved tone may be allocated between two adjacent resource units. For example, the allocation may include, in order from the lowest usable tone index (e.g., −122) to the highest usable tone index (e.g., +122) plus DC tones: 26 data/pilot tones, 1 reserved tone, 26 data/pilot tones, 1 reserved tone, 26 data/pilot tones, 1 reserved tone, 26 data/pilot tones, 1 reserved tone, 13 data/pilot tones, 3 DC tones, 13 data/pilot tones, 1 reserved tone, 26 data/pilot tones, 1 reserved tone, 26 data/pilot tones, 1 reserved tone, 26 data/pilot tones, 1 reserved tone, and 26 data/pilot tones. For simplicity, this may be illustrated by the following shorthand resource allocation representation: 26-1-26-1-26-1-26-1-13-3-13-1-26-1-26-1-26-1-26.In this example, each "-" is inserted simply for convenience, and it may be used to separate different tone types (e.g., data/pilot, reserved, and DC tones). Each "26" represents 26 data/pilot tones, each "1" represents one reserved tone, each "13" represents 13 data/pilot tones, and the "3" represents 3 DC tones. Similar conventions may be used for other shorthand resource allocation representations provided below. For each 26-tone resource unit, 24 of the data/pilot tones may be data tones and 2 may be pilot tones.

A third row 915 illustrates a resource allocation of the 20 MHz bandwidth into fewer, but generally larger, resource units than the resource allocation illustrated in the second row 910. In one or more implementations, the 20 MHz bandwidth may be allocated into 5 resource units in the following manner: 4 resource units (each including 52 data/pilot tones) and one center resource unit (including 26 data/pilot tones and 3 DC tones). Two consecutive reserved tones may be allocated between any two adjacent resource units. For example, the allocation may include, in order from the lowest usable tone index to the highest usable tone index plus DC tones: 52 data/pilot tones, 2 reserved tones, 52 data/pilot tones, 2 reserved tones, 13 data/pilot tones, 3 DC tones, 13 data/pilot tones, 2 reserved tones, 52 data/pilot tones, 2 reserved tones, and 52 data/pilot tones. For simplicity, this may be illustrated by the following shorthand resource allocation representation: 52-2-52-2-13-3-13-2-52-2-52.This example uses conventions similar to those describe above. Each "52" represents 52 data/pilot tones, and each "2" represents 2 reserved tone. For each 52-tone resource unit, 48 of the data/pilot tones may be data tones and 4 may be pilot tones.

A fourth row 920 illustrates a resource allocation of the 20 MHz bandwidth into fewer, but generally larger, resource units than the resource allocation illustrated in the third row 915. In one or more implementations, the 20 MHz bandwidth may be allocated into 3 resource units in the following manner: 2 resource units (each including 106 data/pilot tones) and one center resource unit (including 26 data/pilot tones and 3 DC tones). Two consecutive reserved tones may be allocated between any two adjacent resource units. For example, the allocation may include, in order from the lowest usable tone index to the highest usable tone index plus DC tones: 106 data/pilot tones, 2 reserved tones, 13 data/pilot tones, 3 DC tones, 13 data/pilot tones, 2 reserved tones, and 106 data/pilot tones. For simplicity, this may be illustrated by the following shorthand resource allocation representation: 106-2-13-3-13-2-106.This example uses conventions similar to those described above. Each "106" represents 106 data/pilot tones, and each "2" represents 2 reserved tone. For each 106-tone resource unit, 102 of the data/pilot tones may be data tones and 4 may be pilot tones.

Alternatively, in one or more implementations, the 20 MHz bandwidth may be allocated into 3 resource units in the following manner: 2 resource units (each including 108 data/pilot tones) and one center resource unit (including 26 data/pilot tones and 3 DC tones). In such implementations, no reserved tones are utilized. For example, the allocation may include, in order from the lowest usable tone index to the highest usable tone index plus DC tones: 108 data/pilot tones, 13 data/pilot tones, 3 DC tones, 13 data/pilot tones, and 108 data/pilot tones. For simplicity, this may be illustrated by the following shorthand resource allocation representation: 108-13-3-13-108.This example uses conventions similar to those describe above. Each "108" represents 108 data/pilot tones. For each 108-tone resource unit, 102 of the data/pilot tones may be data tones and 6 may be pilot tones.

For each of the resource allocations illustrated in the second row 910, third row 915, and fourth row 920, one station (STA) may be allocated to one or more of the resource units. For example, for the fourth row 920, a first STA may be allocated to the leftmost resource unit containing 108 data/pilot tones, a second STA may be allocated to the center resource unit containing 26 data/pilot tones and 3 DC tones, and/or a third STA may be allocated to the rightmost resource unit containing 108 data/pilot tones. In one or more implementations, a STA that is allocated to the center resource unit may not be allocated to any of the other resource units.

A fifth row 925 illustrates a resource allocation of the 20 MHz bandwidth into a single 242 tone resource unit. For example, the resource allocation may include, in order from the lowest usable tone index to the highest usable tone index plus DC tones: 121 data/pilot tones, 3 DC tones, and 121 data/pilot tones. The allocation may be utilized for a non-OFDMA case, in which all the data/pilot tones (e.g., the 242 data/pilot tones) are allocated to a single STA.

Figure 10:
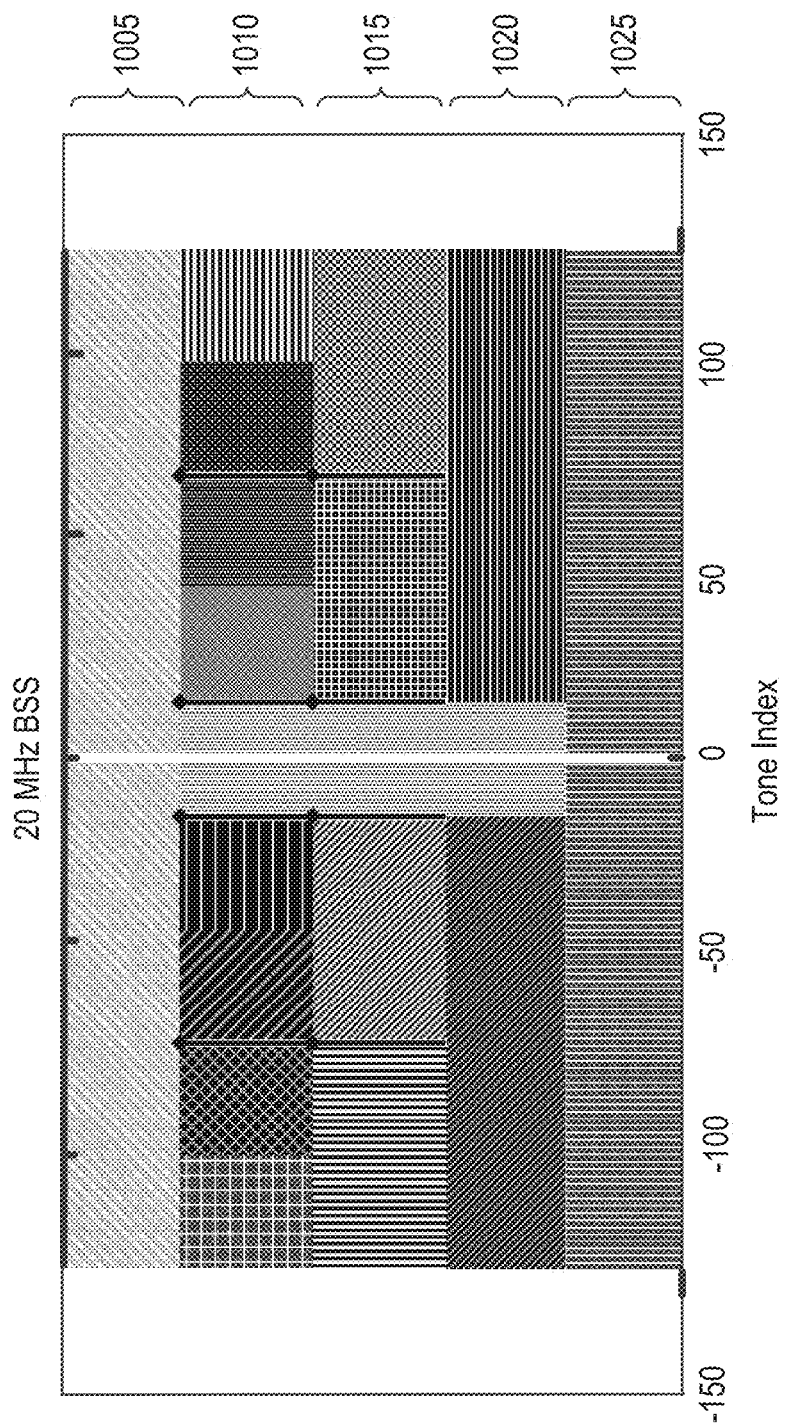
FIG. 10 illustrates example numerology for a 20 MHz channel bandwidth.

FIG. 10 illustrates an example numerology for a 20 MHz channel bandwidth. Compared to the example resource allocation illustrated in FIG. 9, the position (e.g., tone) of the null positions are different. A first row 1005 is the same as the first row 905.

A second row 1010 illustrates a resource allocation of the 20 MHz bandwidth into multiple resource units. In one or more implementations, the 20 MHz bandwidth may be allocated into 9 resource units. Each non-center resource unit includes 26 data/pilot tones. A center resource unit includes 26 data/pilot tones and 3 DC tones. Two reserved tones may be allocated after every two 26-tone resource units for the negative tone index region when observed from the lowest usable tone index (e.g., −122), and two reserved tones may be allocated after every two 26-tone resource units for the positive tone index region when observed from the highest usable tone index (e.g., +122). For example, the resource allocation may include, in order from the lowest usable tone index (e.g., −122) to the highest usable tone index (e.g., +122) plus DC tones: 26 data/pilot tones, 26 data/pilot tones, 2 reserved tones, 26 data/pilot tones, 26 data/pilot tones, 2 reserved tones, 13 data/pilot tones, 3 DC tones, 13 data/pilot tones, 2 reserved tones, 26 data/pilot tones, 26 data/pilot tones, 2 reserved tones, 26 data/pilot tones, and 26 data/pilot tones. For simplicity, this may be illustrated by the following shorthand resource allocation representation: 26-26-2-26-26-2-13-3-13-2-26-26-2-26-26.This example uses conventions similar to those described above. Each "26" represents 26 data/pilot tones, each "2" represents two reserved tones, each "13" represents 13 data/pilot tones, and the "3" represents 3 DC tones.

A third row 1015, fourth row 1020, and fifth row 1025 illustrates a resource allocation of the 20 MHz bandwidth into fewer, but generally larger, resource units than the resource allocation illustrated in the second row 1010. The third row 1015, fourth row 1020, and fifth row 1025 may be the same as the third row 915, fourth row 920, and fifth row 925 of FIG. 9, in which case the same description applies.

Similar to FIG. 9, in the second row 1010, third row 1015, and fourth row 1020 of FIG. 10, one STA may be allocated to one or more of the resource units. Furthermore, in one or more implementations, a STA that is allocated to the center resource unit may not be allocated to any of the other resource units. The resource allocation illustrated in the fifth row 1025 of FIG. 10 may be utilized for a non-OFDMA case, in which all the data/pilot tones (e.g., the 242 data/pilot tones) are allocated to a single STA.

The numerologies for 20 MHz as illustrated in FIGS. 9 and 10 are similar to 80 MHz for IEEE 802.11ac. Whereas IEEE 802.11ac utilizes 64 FFT, HE technology may utilize 256 FFT in one or more implementations. In one aspect, for a given FFT size, the number of tones is given; however, depending on the tone spacing, two OFDM symbols with e.g., FFT=64 and FFT=256 may occupy the same bandwidth.

Figure 11:
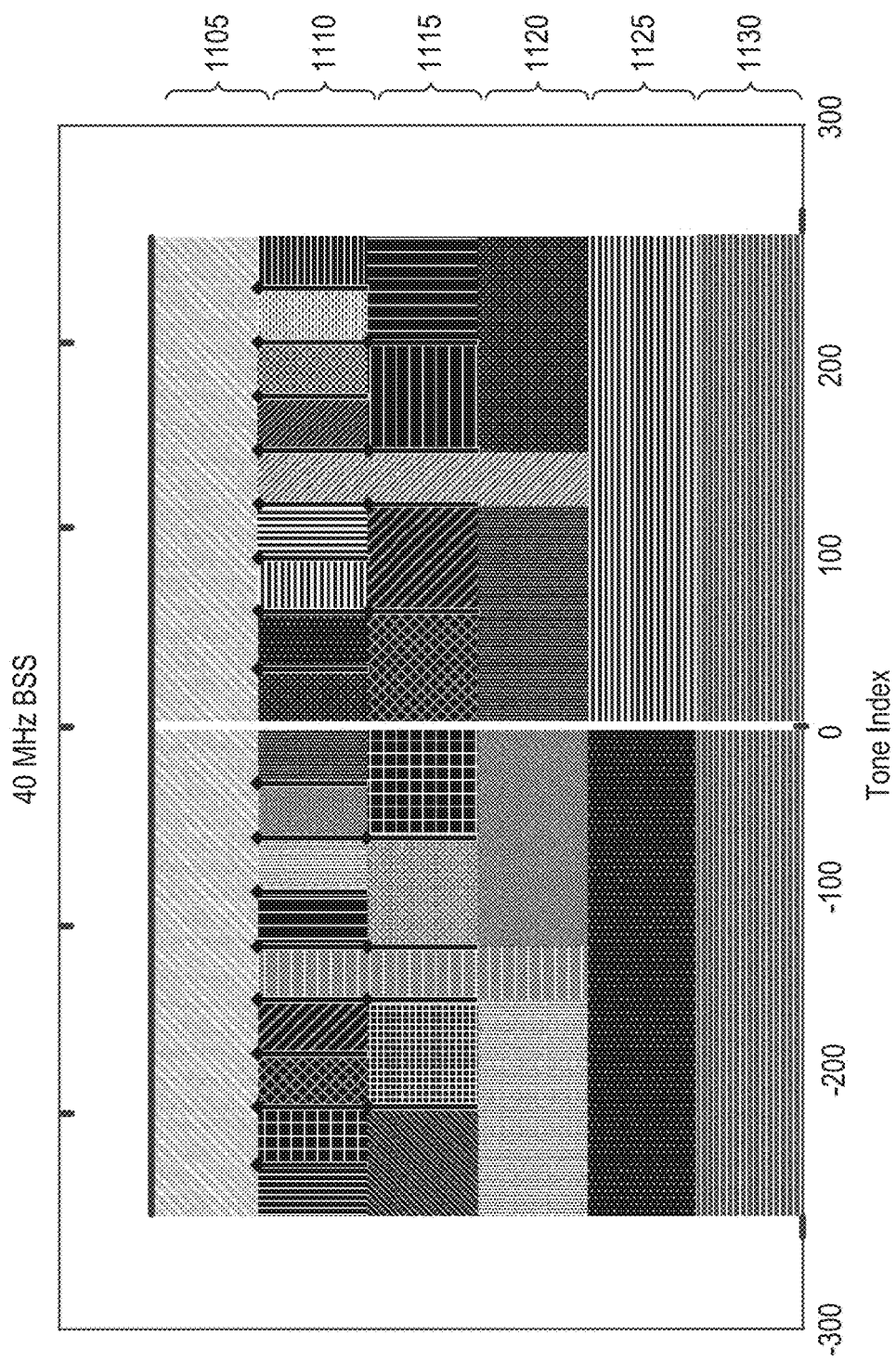
FIG. 11 illustrates example numerology for a 40 MHz channel bandwidth.

FIG. 11 illustrates an example numerology for a 40 MHz channel bandwidth. For a 40 MHz HE PPDU transmission, the 40 MHz may be divided into 512 tones with a 78.125 kHz spacing between tones. A signal is transmitted on tone indices −244 to −3 and +3 to +244, with the tone indices between −2 and +2, inclusive, being DC tones (i.e., 5 DC tones). Hence, there may be a total of 484 usable tones (not including 5 DC tones). The remaining tones may be guard tones (e.g., 12 guard tones on the left edge and 11 guard tones on the right edge of the bandwidth). A first row 1105 illustrates an example of usable tones spanning tone indices −244 to +244. A usable tone may be utilized as a data/pilot tone or a reserved tone. A reserved tone may be referred to as a null tone.

A second row 1110 illustrates a resource allocation of the 40 MHz bandwidth into multiple resource units. In one or more implementations, the 40 MHz bandwidth may be allocated into 18 resource units that include 26 data/pilot tones each. One reserved tone may be allocated between two adjacent resource units, excluding the DC tone regions. For example, the resource allocation may include, in order from the lowest usable tone index (e.g., −244) to the highest usable tone index (e.g., +244) plus DC tones: 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 5 DC tones, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, 26 data/pilot tones, 1 reserved tone, and 26 data/pilot tones. For simplicity, this may be illustrated by the following shorthand resource allocation representation: 26-1-26-1-26-1-26-1-26-1-26-1-26-1-26-1-26-5-26-1-26-1-26-1-26-1-26-1-26-1-26-1-26-1-26.This example uses conventions similar to those described above. Each "26" represents 26 data/pilot tones, each "1" represents one reserved tone, and the "5" represents 5 DC tones.

A third row 1115 illustrates a resource allocation of the 40 MHz bandwidth into fewer, but generally larger, resource units than the resource allocation illustrated in the second row 1110. In one or more implementations, the 40 MHz bandwidth may be allocated into a total of 10 resource units, having (a) 8 resource units that include 52 data/pilot tones each and (b) 2 resource units that include 26 data/pilot tones each. Two consecutive reserved tones may be allocated between two adjacent resource units, excluding the DC tone regions. For example, the resource allocation may include, in order from the lowest usable tone index to the highest usable tone index plus DC tones: 52 data/pilot tones, 2 reserved tones, 52 data/pilot tones, 2 reserved tones, 26 data/pilot tones, 2 reserved tones, 52 data/pilot tones, 2 reserved tones, 52 data/pilot tones, 5 DC tones, 52 data/pilot tones, 2 reserved tones, 52 data/pilot tones, 2 reserved tones, 26 data/pilot tones, 2 reserved tones, 52 data/pilot tones, 2 reserved tones, and 52 data/pilot tones. For simplicity, this may be illustrated by the following shorthand resource allocation representation: 52-2-52-2-26-2-52-2-52-5-52-2-52-2-26-2-52-2-52. This example uses conventions similar to those described above. Each "52" represents 52 data/pilot tones, each "2" represents 2 reserved tones, and the "5" represents 5 DC tones.

A fourth row 1120 illustrates a resource allocation of the 40 MHz bandwidth into fewer, but generally larger, resource units than the resource allocation illustrated in the third row 1115. In one or more implementations, the 40 MHz bandwidth may be allocated into a total of 6 resource units, having (a) 4 resource units that include 106 data/pilot tones each and (b) 2 resource units that include 26 data/pilot tones each. Two consecutive reserved tones may be allocated between any two adjacent resource units, excluding the DC tone regions. For example, the resource allocation may include, in order from the lowest usable tone index to the highest usable tone index plus DC tones: 106 data/pilot tones, 2 reserved tones, 26 data/pilot tones, 2 reserved tones, 106 data/pilot tones, 5 DC tones, 106 data/pilot tones, 2 reserved tones, 26 data/pilot tones, 2 reserved tones, and 106 data/pilot tones. For simplicity, this may be illustrated by the following shorthand resource allocation representation: 106-2-26-2-106-5-106-2-26-2-106. This example uses conventions similar to those describe above. Each "106" represents 106 data/pilot tones, each "2" represents 2 reserved tones, and the "5" represents 5 DC tones.

Alternatively, in one or more implementations, the 40 MHz bandwidth may be allocated into a total of 6 resource units that include (a) 4 resource units that include 108 data/pilot tones each and (b) 2 resource units that include 26 data/pilot tones each. In such implementations, no reserved tones are utilized. For example, the allocation may include, in order from the lowest usable tone index to the highest usable tone index plus DC tones: 108 data/pilot tones, 26 data/pilot tones, 108 data/pilot tones, 5 DC tones, 108 data/pilot tones, 26 data/pilot tones, and 108 data/pilot tones. For simplicity, this may be illustrated by the following shorthand resource allocation representation: 108-26-108-5-108-26-108. This example uses conventions similar to those described above. Each "108" represents 108 data/pilot tones, each "26" represents 26 data/pilot tones, and the "5" represents 5 DC tones.

In one or more implementations, the resource allocation for 40 MHz channel bandwidth can be obtained through duplications (e.g., two) of the resource allocation for 20 MHz channel bandwidth. For example, each of the left half and the right half of the resource allocation in the second row 1110, third row 1115, and fourth row 1120 of FIG. 11 may be the resource unit allocation illustrated in the second row 910, third row 915, and fourth row 920, respectively, of FIG. 9, except with the DC tones removed. When constructing the 40 MHz resource allocation based on duplications (e.g., two) of the 20 MHz resource allocation, each of the 26-tone center resource units illustrated in the second through fourth rows of FIG. 9 (excluding the DC tones) becomes the respective one of the 26-tone resource units illustrated in the second through fourth rows of FIG. 11 on each of the left half and the right half.

A fifth row 1125 illustrates a resource allocation of the 40 MHz bandwidth into fewer, but generally larger, resource units than the resource allocation illustrated in the fourth row 1120. In one or more implementations, the 40 MHz bandwidth may be allocated into 2 resource units that include 242 data/pilot tones each. In such implementations, no reserved tones are utilized. For example, the allocation may include, in order from the lowest usable tone index to the highest usable tone index plus DC tones: 242 data/pilot tones, 5 DC tones, and 242 data/pilot tones. For simplicity, this may be illustrated by the following shorthand resource allocation representation: 242-5-242. This example uses conventions similar to those describe above. Each "242" represents 242 data/pilot tones, and the "5" represents 5 DC tones. For each 242-tone resource unit, 234 of the data/pilot tones may be data tones and 8 may be pilot tones.

For each of the allocations illustrated in the second through fifth rows of FIG. 11, one STA may be allocated to one or more of the resource units. For example, for the fifth row 1125, one STA may be allocated to one of the 242-tone resource unit, and another STA may be allocated to the other of 242-tone resource unit.

A sixth row 1130 illustrates a resource allocation of the 40 MHz bandwidth into a single resource unit with 484 non-DC tones. For example, the single resource unit may include, in order from the lowest usable tone index to the highest usable tone index plus DC tones: 242 data/pilot tones, 5 DC tones, and 242 data/pilot tones. The single resource unit may be utilized for a non-OFDMA case, in which all the data/pilot tones are allocated to a single STA.

Figure 12:
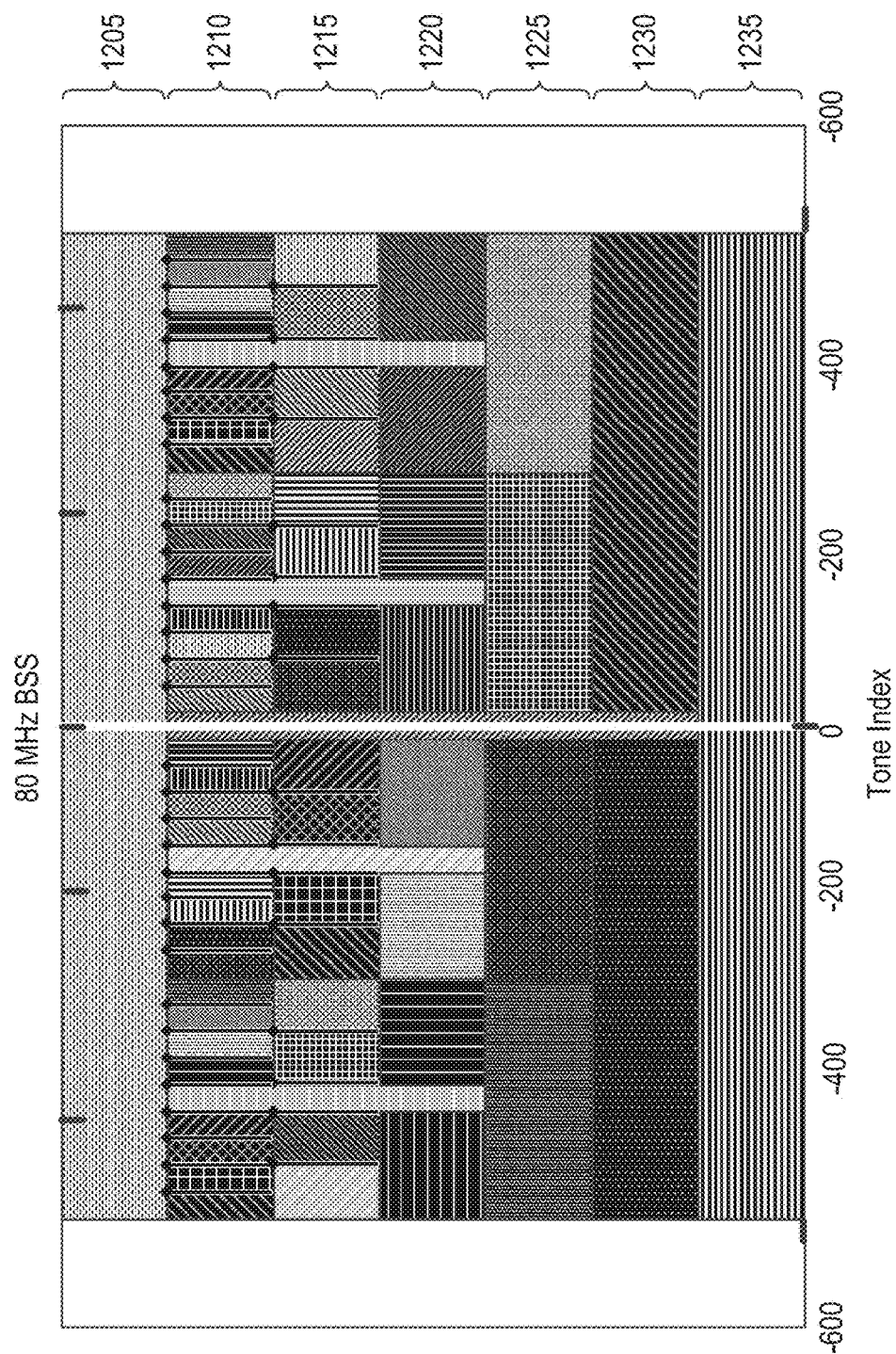
FIG. 12 illustrates example numerology for an 80 MHz channel bandwidth.

FIG. 12 illustrates an example numerology for an 80 MHz channel bandwidth. For an 80 MHz HE PPDU transmission, the 80 MHz may be divided into 1024 tones with a 78.125 kHz spacing between tones. In one or more implementations, the number of usable tones for the OFDMA case may be different from the number of usable tones for the non-OFDMA case. In some aspects, the number of DC tones for the OFDMA case may be different from the number of DC tones for the non-OFDMA case.

For an 80 MHz HE PPDU transmission for the OFDMA case, a signal may be transmitted on tones −500 to −4 and +4 to +500, with the tones between −3 and +3, inclusive, being DC tones (i.e., 7 DC tones). In this example, the number of usable tones may be 994, not including the DC tones. The remaining tones may be guard tones (e.g., 12 guard tones on the left edge and 11 guard tones on the right edge).

For an 80 MHz HE PPDU transmission for the non-OFDMA case, a signal may be transmitted on tones −500 to −3 and +3 to +500, with the tones between −2 and +2, inclusive, being DC tones (i.e., 5 DC tones). In this example, the number of usable tones may be 996 (excluding the DC tones). The remaining tones may be guard tones (e.g., 12 guard tones on the left edge and 11 guard tones on the right edge).

In one or more implementations, the resource allocation for 80 MHz channel bandwidth can be obtained through multiple (e.g., four) duplications of the resource allocation for 20 MHz channel bandwidth or through duplications (e.g., two) of the resource allocation for 40 MHz channel bandwidth.

A first row 1205 illustrates usable tones. The usable tones may span tone indices −500 to +500 for the OFDMA case (excluding −3 to +3 for 7 DC tones) and tone indices −500 to +500 for the non-OFDMA case (excluding −2 to +2 for 5 DC tones). A usable tone may be utilized as a data/pilot tone or a reserved tone. A reserved tone may be referred to as a null tone.

A second row 1210 illustrates a resource allocation of the 80 MHz bandwidth into multiple resource units. In one or more implementations, the 80 MHz bandwidth may be allocated into a total of 37 resource units, having (a) 36 resource units that include 26 data/pilot tones each and (b) a center resource unit that includes 26 data/pilot tones and 7 DC tones. One reserved tone may be allocated between any two adjacent resource units, except between the center resource unit and the 26-tone resource units adjacent to the center resource unit. In one or more implementations, a STA that is allocated to the center resource unit may not be allocated to any of the other resource units.

An example of a resource allocation may be illustrated by the following shorthand resource allocation representation, in order from the lowest usable tone index (e.g., −500) to the highest usable tone index (+500) plus DC tones: 26-1-26-1-26-1-26-1-26-1-26-1-26-1-26-1-26-26-1-26-1-26-1-26-1-26-1-26-1-26-1-26-1-26-1-26-13-7-13-26-1-26-1-26-1-26-1-26-1-26-1-26-1-26-1-26-26-1-26-1-26-1-26-1-26-1-26-1-26-1-26-1-26. This example uses conventions similar to those described above. Each "26" represents 26 data/pilot tones, each "1" represents 1 reserved tone, each "13" represents 13 data/pilot tones, and the "7" represents 7 DC tones.

A third row 1215 illustrates a resource allocation of the 80 MHz bandwidth into fewer, but generally larger, resource units than the resource allocation illustrated in the second row 1210. In one or more implementations, the 80 MHz bandwidth may be allocated into a total of 21 resource units, having (a) 16 resource units that include 52 data/pilot tones each, (b) 4 resource units that include 26 data/pilot tones each, and (c) a center resource unit that includes 26 data/pilot tones and 7 DC tones. Two consecutive reserved tones may be allocated between at least some of two adjacent resource units. An example of a resource allocation may be illustrated by the following shorthand resource allocation representation, in order from the lowest usable tone index to the highest usable tone index plus DC tones: 52-2-52-2-26-2-52-2-52-2-52-52-2-52-2-2-26-2-52-2-52-13-7-13-52-2-52-2-26-2-52-2-52-52-2-52-2-26-2-52-2-52. This example uses conventions similar to those described above. Each "52" represents 52 data/pilot tones, each "26" represents 26 data/pilot tones, each "2" represents 2 reserved tones, each "13" represents 13 data/pilot tones, and the "7" represents 7 DC tones.

A fourth row 1220 illustrates a resource allocation of the 80 MHz bandwidth into fewer, but generally larger, resource units than the resource allocation illustrated in the third row 1215. In one or more implementations, the 80 MHz bandwidth may be allocated into a total of 13 resource units, having (a) 8 resource units that include 106 data/pilot tones each, (b) 4 resource units that include 26 data/pilot tones each, and (c) a center resource unit that includes 26 data/pilot tones and 7 DC tones. Two consecutive reserved tones may be allocated between some of two adjacent resource units, in a manner that duplicates the fourth row 1120 (excluding the DC tones). An example of a resource allocation may be illustrated by the following shorthand resource allocation representation, in order from the lowest usable tone index to the highest usable tone index plus DC tones: 106-2-26-2-106-106-2-26-2-106-13-7-13-106-2-26-2-106-106-2-26-2-106. This example uses conventions similar to those described above. Each "106" represents 206 data/pilot tones, each "26" represents 26 data/pilot tones, each "2" represents 2 reserved tones, each "13" represents 13 data/pilot tones, and the "7" represents 7 DC tones.

Alternatively, in one or more implementations, the 80 MHz bandwidth may be allocated into a total of 13 resource units, having (a) 8 resource units that include 108 data/pilot tones each, (b) 4 resource units that include 26 data/pilot tones each, and (c) a center resource unit that includes 26 data/pilot tones and 7 DC tones. In such implementations, no reserved tones are utilized. An example of a resource allocation may be illustrated by the following shorthand resource allocation representation, in order from the lowest usable tone index to the highest usable tone index plus DC tones: 108-26-108-108-26-108-13-7-13-108-26-108-108-26-108. This example uses conventions similar to those described above. Each "108" represents 108 data/pilot tones, each "26" represents 26 data/pilot tones, each "13" represents 13 data/pilot tones, and the "7" represents 7 DC tones.

A fifth row 1225 illustrates a resource allocation of the 80 MHz bandwidth into fewer, but generally larger, resource units than the resource allocation illustrated in the fourth row 1220. In one or more implementations, the 80 MHz bandwidth may be allocated into a total of 5 resource units, having (a) 4 resource units that include 242 data/pilot tones each and (b) a center resource unit that includes 26 data/pilot tones and 7 DC tones. In such implementations, no reserved tones are utilized. An example of a resource allocation may be illustrated by the following shorthand resource allocation representation, in order from the lowest usable tone index to the highest usable tone index plus DC tones: 242-242-13-7-13-242-242. This example uses conventions similar to those described above. Each "242" represents 242 data/pilot tones, each "13" represents 13 data/pilot tones, and the "7" represents 7 DC tones.

A sixth row 1230 illustrates a resource allocation of the 80 MHz bandwidth into fewer, but generally larger, resource units than the resource allocation illustrated in the fifth row 1225. In one or more implementations, the 80 MHz bandwidth may be allocated into a total of 3 resource units, having (a) 2 resource units that include 484 data/pilot tones each and (b) a center resource unit that includes 26 data/pilot tones and 7 DC tones. In such implementations, no reserved tones are utilized. An example of a resource allocation may be illustrated by the following shorthand resource allocation representation, in order from the lowest usable tone index to the highest usable tone index plus DC tones: 484-13-7-13-484. This example uses conventions similar to those described above. Each "484" represents 484 data/pilot tones, each "13" represents 13 data/pilot tones, and the "7" represents 7 DC tones.

A seventh row 1235 illustrates a resource allocation of the 80 MHz bandwidth into a single resource unit (e.g., non-OFDMA case). In some aspects, the non-OFDMA case utilizes 5 DC tones, and thus the single resource unit contains 996 non-DC tones.

In one or more implementations, a resource allocation for a 160 MHz channel bandwidth can be obtained through multiple (e.g., eight) duplications of the resource allocation for 20 MHz channel bandwidth, through multiple (e.g., four) duplications of the resource allocation for 40 MHz channel bandwidth, or through duplications (e.g., two) of the resource allocation for 80 MHz channel bandwidth.

In one or more implementations, a resource allocation for 80+80 MHz channel bandwidths can be obtained through multiple (e.g., eight) duplications of the resource allocation for 20 MHz channel bandwidth, through multiple (e.g., four) duplications of the resource allocation for 40 MHz channel bandwidth, or through duplications (e.g., two) of the resource allocation for 80 MHz channel bandwidth.

Examples of the number of maximum tones, the number of guard tones, the number of DC tones, the number of reserved tones, the number of pilot tones, and the number of data tones for each of the channel bandwidths are provided in the table below for a give spacing of 78.125 kHz. The table is provided as a non-limiting example.

| Channel Bandwidth | Spacing | No. of Maximum Tones | No. of Guard Tones | No. of DC Tones | No. of Used Tones (includes reserved tones, pilot tones, and data tones) |
|---|---|---|---|---|---|
| 20 MHz (non-OFDMA) | 78.125 kHz | 256 | 11 | 3 | 234 |
| 20 MHz (OFDMA) | 78.125 kHz | 256 | 11 | 7 | 238 |
| 40 MHz (non-OFDMA) | 78.125 kHz | 512 | 23 | 5 | 484 |
| 40 MHz (OFDMA) | 78.125 kHz | 512 | 23 | 5 | 484 |
| 80 MHz (non-OFDMA) | 78.125 kHz | 1024 | 23 | 7 | 994 |
| 80 MHz (OFDMA) | 78.125 kHz | 1024 | 23 | 5 | 996 |
| 160 MHz (non-OFDMA) | 78.125 kHz | 2048 | 46 | 14 | 1988 |
| 160 MHz (OFDMA) | 78.125 kHz | 2048 | 46 | 10 | 1992 |

For each of the 20 MHz, 40 MHz, 80 MHz, 160 MHz, and 80+80 MHz HE channel bandwidths, various phrase rotation blocks may be utilized. Although examples of phase rotation block options are provided below, other phase rotation block options are possible and may be utilized instead.

A rotation of tones may be referred to as a phase rotation, a phase rotation operation, a tone rotation, a tone rotation operation, a subcarrier rotation, or a subcarrier rotation operation. In one aspect, a phase rotation value may be a real or complex value (e.g., +1, −1, j, −j). In one aspect, a phase rotation operation involves multiplying a real or complex value to the LTF sequence.

In some aspects, a phase rotation operation involves multiplying a subset of elements of the LTF sequence that are consecutive in the frequency domain. The subset of elements is associated with a set of tone indices or, equivalently, a frequency band corresponding to the set of tone indices. The set of tone indices over which a phase rotation operation is applied may be referred to as a block, a phase rotation block, a tone rotation block, or a subcarrier rotation block. In one or more implementations, consecutive phase rotation blocks that have the same phase rotation value may be consolidated into a single phase rotation block associated with the same phase rotation value.

Phase rotation may be applied to training sequences (e.g., HE LTF sequence) to reduce peak-to-average power ratio (PAPR). In one aspect, values utilized for phase rotation operations may be selected to allow for a reduction of the PAPR of the LTF OFDM symbols and/or the transmitted signal. In one or more implementations, a time domain representation of a waveform transmitted on frequency segment $i_{Seg}$ of transmit chain $i_{TX}$ may be, for example, similar to Equation (10) provided above, except that VHT is replaced with HE.

Examples of phase rotation blocks are provided as follows for a 20 MHz channel bandwidth.

For a 20 MHz channel bandwidth, a phase rotation may be applied in units of 5 MHz, corresponding to 64 tones. The phase rotation may be multiplied for each consecutive 64 tones, including guard tones. Accordingly, the four phase rotation blocks may be provided such that phase rotation block 1 includes tone indices {−122, −65}, phase rotation block 2 includes tone indices {−64, −1}, phase rotation block 3 includes tone indices {1, 64}, and phase rotation block 4 includes tone indices {65, 122} for 20 MHz bandwidth, where the notation {a,b} represents tone indices a to b, inclusive. The phase rotation values may be given by [$c_1$, $c_2$, $c_3$, $c_4$]. In this example, elements with tone indices −122 to −65 are multiplied by $c_1$, elements with tone indices −64 to −1 are multiplied by $c_2$, and so on. For example, the LTF field may utilize $VHTLTF_{-122,122}$ as the sequence and phase rotation values [+1, −1, −1, −1].

In one or more implementations, due to the modular resource allocation in OFDMA, the phase rotation blocks may be designed based on the OFDMA resource units (or resource unit allocation). In some aspects, phase rotation blocks may be provided based on the resource allocation provided in the second row 910 of FIG. 9. In one example, the phase rotation blocks may include the following tones, in order from the lowest usable tone index (e.g., −122) to the highest usable tone index (e.g., 122) plus DC tones:

phase rotation block 1 includes 26 data/pilot tones and 1 reserved tone;

phase rotation block 2 includes 26 data/pilot tones and 1 reserved tone;

phase rotation block 3 includes 26 data/pilot tones and 1 reserved tone;

phase rotation block 4 includes 26 data/pilot tones and 1 reserved tone;

phase rotation block 5 includes 13 data/pilot tones, 3 DC tones, and 13 data/pilot tones;

phase rotation block 6 includes 1 reserved tone and 26 data/pilot tones;

phase rotation block 7 includes 1 reserved tone and 26 data/pilot tones;

phase rotation block 8 includes 1 reserved tone and 26 data/pilot tones; and phase rotation block 9 includes 1 reserved tone and 26 data/pilot tones.

This example of the phase rotation blocks may be provided by the shorthand representation as follows, in order from the lowest usable tone index to the highest usable tone index plus DC tones: (26,1)+(26,1)+(26,1)+(26,1)+(13,3,13)+(1,26)+(1,26)+(1,26)+(1,26).

In another example, the phase rotation blocks may include the following tones, in order from the lowest usable tone index (e.g., −122) to the highest usable tone index (e.g., 122) plus DC tones:

phase rotation block 1 includes 26 data/pilot tones and 1 reserved tone;

phase rotation block 2 includes 26 data/pilot tones;

phase rotation block 3 includes 26 data/pilot tones and 1 reserved tone;

phase rotation block 4 includes 26 data/pilot tones;

phase rotation block 5 includes 13 data/pilot tones, 7 DC tones, and 13 data/pilot tones;

phase rotation block 6 includes 26 data/pilot tones;

phase rotation block 7 includes 1 reserved tone and 26 data/pilot tones;

phase rotation block 8 includes 26 data/pilot tones; and phase rotation block 9 includes 1 reserved tone and 26 data/pilot tones.

This example of the phase rotation blocks may be provided by the shorthand representation as follows, in order from the lowest usable tone index to the highest usable tone index plus DC tones: (1,26)+(26)+(1,26)+(26)+(13,7,13)+(26)+(26,1)+(26)+(26,1). This may be referred to as the "Shorthand Representation 20-2." In this example, the conventions used are as follows: The notation "+" is used to distinguish between the different phase rotation blocks. "( )" itself may represent a phase rotation block. The sum of the values within each "( )" may represent the number of tones for its respective phase rotation block. The summation of all of the number counts equals the total number of tones (e.g., data tone, pilot tone, reserved tone and DC tones). Further, each "26" represents 26 data/pilot tones, each "1" represents 1 reserved tone, each "13" represents 13 data/pilot tones, and the "3" represents 3 DC tones. Similar conventions may be used for other shorthand phase rotation block representations provided below, in that each "52" represents 52 data/pilot tones, each "58" represents 58 data/pilot tones, each "59" represents 59 data/pilot tones, each "62" represents 62 data/pilot tones, each "63" represents 63 data/pilot tones, each "64" represents 64 data/pilot tones, each "2" represents 2 reserved tones, each "14" represents 14 data/pilot tones, and the "5" represents 5 DC tones, and the "7" represents 7 DC tones. In the above example, there are a total of 9 phase rotation blocks, having (a) 8 phase rotation blocks that include 27 tones and (b) a central phase rotation block that includes 29 tones (including the 3 DC tones), for a total of 245 tones.

In some aspects, the phase rotation blocks may be provided based on the resource allocation illustrated in the second row 1010 or the third row 1015 of FIG. 10. In such implementations, the phase rotation block may include the following tones, in order from the lowest usable tone index (e.g., −122) to the highest usable tone index (e.g., 122) plus DC tones:

phase rotation block 1 includes 52 data/pilot tones and 1 reserved tones;

phase rotation block 2 includes 52 data/pilot tones and 1 reserved tones;

phase rotation block 3 includes 13 data/pilot tones, 7 DC tones, and 13 data/pilot tones;

phase rotation block 4 includes 1 reserved tones and 52 data/pilot tones; and phase rotation block 5 includes 1 reserved tones and 52 data/pilot tones.

This example of the phase rotation blocks may be provided by the shorthand representation of (1,52)+(1,52)+(13,7,13)+(52,1)+(52,1). In this example, there are 4 phase rotation blocks that include 54 tones and a center phase rotation block that includes 29 tones (including the 3 DC tones), for a total of 245 tones.

Examples of phase rotation blocks are provided as follows for a 40 MHz channel bandwidth.

In some aspects, two phase rotation blocks may be utilized (e.g., one phase rotation block for negative tone indices and one phase rotation block for positive tone indices).

In some aspects, eight phase rotation blocks may be utilized. As one example, the phase rotation blocks may include, in order from the lowest tone index (e.g., −244) to the highest tone index (e.g., 244), excluding guard tones: 58 tones, 63 tones, 63 tones, 58 tones, 5 DC tones, 58 tones, 63 tones, 63 tones, and 58 tones. A shorthand representation is as follows: (58), (63), (63), (58), (5 DC tones), (58), (63), (63) (58). In this example, the conventions used are as follows: "( )" represents a phase rotation block. The value within each "( )" represents the number of tones for its respective phase rotation block. Similar conventions may be used for other shorthand phase rotation block representations provided below As another example, the phase rotation blocks may include, in order, 59 tones, 62 tones, 62 tones, 59 tones, 5 DC tones, 59 tones, 62 tones, 62 tones, and 59 tones. A shorthand representation is as follows: (59), (62), (62), (59), (5 DC tones), (59), (62), (62) (59).

As another example, the phase rotation blocks may include, in order, 52 tones, 64 tones, 64 tones, 64 tones, 64 tones, 64 tones, 64 tones, and 53 tones, where DC tones are part of the phase rotation blocks. A shorthand representation is as follows: (52), (64), (64), (64), (64), (64), (64), (53), where DC tones are part of the phase rotation block.

In some aspects, the phase rotation blocks may be provided based on the resource allocation illustrated in the second row 1110 of FIG. 11. In such implementations, the phase rotation blocks may have 18 phase rotation blocks, and may include the following tones, in order from the lowest tone index (e.g., −244) to the highest tone index (e.g., 244), excluding guard tones: (1,26)+(26,1)+(1,26)+(26,1)+(26)+(1,26)+(26,1)+(1,26)+(26,1), {0, 0, 0, 0, 0}, (1,26)+(26,1)+(1,26)+(26,1)+(26)+(1,26)+(26,1)+(1,26)+(26,1).

The "{0, 0, 0, 0, 0}" represents the actual DC tone sequence values of 5 DC tones, and they are depicted above simply to show their locations, but the phase rotation blocks do not include the 5 DC tones. In other words, the 5 DC tones are not phase rotated. Each "26" represents a 26-tone resource unit (e.g., containing 26 data/pilot tones) and each "1" represents a reserved tone. The sum of the values within each "( )" represents the number of tones for its respective phase rotation block. For example, (26,1) represents 27 tones (e.g., 26 data/pilot tones followed by 1 reserved tone).

In some aspects, the phase rotation blocks may be provided based on the resource allocation illustrated in the third row 1115 of FIG. 11. In such implementations, the phase rotation block may include the following tones, in order from the lowest tone index (e.g., −244) to the highest tone index (e.g., 244), excluding guard tones: (1,52,1)+(1,52,1)+(26)+(1,52,1)+(1,52,1), {0, 0, 0, 0, 0}, (1,52,1)+(1,52,1)+(26)+(1,52,1)+(1,52,1). The 10 phase rotation blocks do not include the 5 DC tones, which are depicted within "{ }" simply to show their locations. The "52" represents a 52-tone resource unit and the "1" represents a reserved tone. The sum of the values within each "( )" represents the number of tones for its respective phase rotation block. For example, (1,52,1) represents 54 tones (e.g., 1 reserved tone followed by 52 data/pilot tones followed by 1 reserved tone).

Examples of phase rotation blocks are provided as follows for an 80 MHz channel bandwidth.

In some aspects, five phase rotation blocks may be utilized for the OFDMA case and the non-OFDMA case. For the OFDMA case, the phase rotation blocks may include the following tones, in order from the lowest tone index (e.g., −500) to the highest tone index (e.g., 500), excluding guard tones:

phase rotation block 1 includes 242 data/pilot tones;

phase rotation block 2 includes 242 data/pilot tones;

phase rotation block 3 includes 13 data/pilot tones, 7 DC tones, and 13 data/pilot tones;
    phase rotation block 4 includes 242 data/pilot tones; and
    phase rotation block 5 includes 242 data/pilot tones.
This example of the phase rotation blocks may be provided by the shorthand representation of (242)+(242)+(13,7,13)+(242)+(242). This example uses conventions similar to those describe above. The "242" represents 242 data/pilot tones, the "13" represents 13 data/pilot tones, and "7" represents 7 DC tones.

For the non-OFDMA case, the phase rotation blocks may include the following tones, in order from the lowest tone index (e.g., −500) to the highest tone index (e.g., 500), excluding guard tones:
    phase rotation block 1 includes 242 data/pilot tones;
    phase rotation block 2 includes 242 data/pilot tones;
    phase rotation block 3 includes 14 data/pilot tones, 5 DC tones, and 14 data/pilot tones;
    phase rotation block 4 includes 242 data/pilot tones; and
    phase rotation block 5 includes 242 data/pilot tones.
This example of the phase rotation blocks may be provided by the shorthand representation of (242)+(242)+(14,5,14)+(242)+(242). This example uses conventions similar to those describe above. The "242" represents 242 data/pilot tones, the "14" represents 14 data/pilot tones, and "5" represents 5 DC tones.

In some aspects, 16 phase rotation blocks may be utilized for the OFDMA case and the non-OFDMA case. For the OFDMA case, an example of the phase rotation blocks may be provided by the shorthand representation as follows, in order from the lowest tone index (e.g., −500) to the highest tone index (e.g., 500), excluding guard tones: (58), (63), (63), (58), (58), (63), (63), (58,13), (13,58), (63), (63), (58), (58), (63), (63), (58), which represents the 994 data/pilot tones but excludes the 7 DC tones. For the non-OFDMA case, an example of the phase rotation blocks may be provided by the shorthand representation of (58), (63), (63), (58), (58), (63), (63), (58,14), (14,58), (63), (63), (58), (58), (63), (63), (58), which represents the 996 data/pilot tones but excludes the 5 DC tones. These example use conventions similar to those describe above. Each number within "( )" represents the number of data/pilot tones.

In some aspects, the phase rotation blocks may be provided based on the resource allocation illustrated in the second row 1210 of FIG. 12. In such aspects, 37 phase rotation blocks may be utilized for the OFDMA case and the non-OFDMA case. For the OFDMA case, an example of the phase rotation blocks may be provided by the shorthand representation as follows, in order from the lowest tone index (e.g., −500) to the highest tone index (e.g., 500), excluding guard tones: (1,26)+(26,1)+(1,26)+(26,1)+26+(1,26)+(26,1)+(1,26)+(26,1),   (1,26)+(26,1)+(1,26)+(26,1)+26+(1,26)+(26,1)+(1,26)+(26,1),   (13,{0,0,0,0,0,0,0},13), (1,26)+(26,1)+(1,26)+(26,1)+26+(1,26)+(26,1)+(1,26)+(26,1), (1,26)+(26,1)+(1,26)+(26,1)+26+(1,26)+(26,1)+(1,26)+(26,1).
This example uses conventions similar to those describe above. In this example, each "26" represents a 26 tone resource unit, each "1" represents one reserve tone, and "(13,{0,0,0,0,0,0,0},13)" represents the center resource unit that includes, in order, 13 data/pilot tones, 7 DC tones, and 13 data/pilot tones. The "{0,0,0,0,0,0,0}" represents the actual DC tone sequence values of 7 DC tones. In one aspect, a phase rotation block includes the 7 DC tones.

For the non-OFDMA case, an example of the phase rotation blocks may be provided by the shorthand representation of: (1,26)+(26,1)+(1,26)+(26,1)+26+(1,26)+(26,1)+ (1,26)+(26,1), (1,26)+(26,1)+(1,26)+(26,1)+26+(1,26)+(26, 1)+(1,26)+(26,1),   (14,{0,0,0,0,0},14),   (1,26)+(26,1)+(1, 26)+(26,1)+26+(1,26)+(26,1)+(1,26)+(26,1),   (1,26)+(26, 1)+(1,26)+(26,1)+26+(1,26)+(26,1)+(1,26)+(26,1).
This example uses conventions similar to those describe above. In this example, each "26" represents a 26 tone resource unit, each "1" represents one reserve tone, and "(14,{0,0,0,0,0},14)" represents the center resource unit that includes, in order, 14 data/pilot tones, 5 DC tones, and 14 data/pilot tones. In one aspect, a phase rotation block includes the 5 DC tones.

In some aspects, the phase rotation blocks may be provided based on the resource allocation illustrated in the third row 1215 of FIG. 12. In such aspects, 21 phase rotation blocks may be utilized for the OFDMA case and the non-OFDMA case.

For the OFDMA case, an example of the phase rotation blocks may be provided by the shorthand representation of (1,52,1)+(1,52,1)+(26)+(1,52,1)+(1,52,1),   (1,52,1)+(1,52, 1)+(26)+(1,52,1)+(1,52,1)+(13,{0,0,0,0,0,0,0},13)+(1,52, 1)+(1,52,1)+(26)+(1,52,1)+(1,52,1),   (1,52,1)+(1,52,1)+ (26)+(1,52,1)+(1,52,1). This example uses conventions similar to those describe above. In this example, each "52" represents a 52 tone resource unit, each "2" represents two adjacent reserve tones, and "(13,{0,0,0,0,0,0,0},13)" represents the center resource unit that includes, in order, 13 data/pilot tones, 7 DC tones, and 13 data/pilot tones. In one aspect, a phase rotation block includes the 7 DC tones.

For the non-OFDMA case, an example of the phase rotation blocks may be provided by the shorthand representation of (1,52,1)+(1,52,1)+(26)+(1,52,1)+(1,52,1), (1,52, 1)+(1,52,1)+(26)+(1,52,1)+(1,52,1)+(14,{0,0,0,0,0},14)+(1, 52,1)+(1,52,1)+(26)+(1,52,1)+(1,52,1),   (1,52,1)+(1,52,1)+ (26)+(1,52,1)+(1,52,1). This example uses conventions similar to those described above. In this example, each "52" represents a 52 tone resource unit, each "1" represents a reserve tone, and "(14,{0,0,0,0,0},14)" represents the center resource unit that includes, in order, 14 data/pilot tones, 5 DC tones, and 14 data/pilot tones. In one aspect, a phase rotation block includes the 5 DC tones.

In one or more implementations, examples of phase rotation blocks for 160 MHz channel bandwidth can be obtained through multiple (e.g., eight) duplications of the phase rotation blocks for 20 MHz channel bandwidth, through multiple (e.g., four) duplications of the phase rotation blocks for 40 MHz channel bandwidth, or through duplications (e.g., two) of the phase rotation blocks for 80 MHz channel bandwidth.

In one or more implementations, a resource allocation for 80+80 MHz channel bandwidth can be obtained through multiple (e.g., eight) duplications of the phase rotation blocks for 20 MHz channel bandwidth, through multiple (e.g., four) duplications of the phase rotation blocks for 40 MHz channel bandwidth, or through duplications (e.g., two) of the phase rotation blocks for 80 MHz channel bandwidth.

In one or more implementations, a start tone index and an end tone index for a phase rotation block may be provided in different manners. These different manners may be due to the varying position and/or number of reserved indices. In one aspect, since no data/pilot is transmitted at these reserved indices, a phase rotation block that is applied to the reserved indices does not affect a PPDU transmission.

When there is one reserved tone between two adjacent resource units, such reserved tone may be grouped with its adjacent phase rotation block to the left of the reserved tone. In another aspect, the reserved tone may be grouped with its adjacent phase rotation block to the right of the reserved tone. In yet another aspect, the reserved tone is not grouped with any of its adjacent phase rotation blocks.

When there are two reserved tones between two adjacent resource units, such reserved tones may be grouped with their adjacent phase rotation block to the left of the reserved tones. In another aspect, the reserved tones may be grouped with their adjacent phase rotation block to the right of the reserved tones. In yet another aspect, the left one of the two reserved tones may be grouped with its adjacent phase rotation block to the left of the left one of the two reserved tones; and the right one of the two reserved tones may be grouped with its adjacent phase rotation block to the right of the right one of the two reserved tones. In yet another aspect, the reserved tones are not grouped with any of its adjacent phase rotation blocks. Some of these are illustrated in more detail with respect to FIGS. 13A through 13C and 14A through 14C.

Figure 13A:
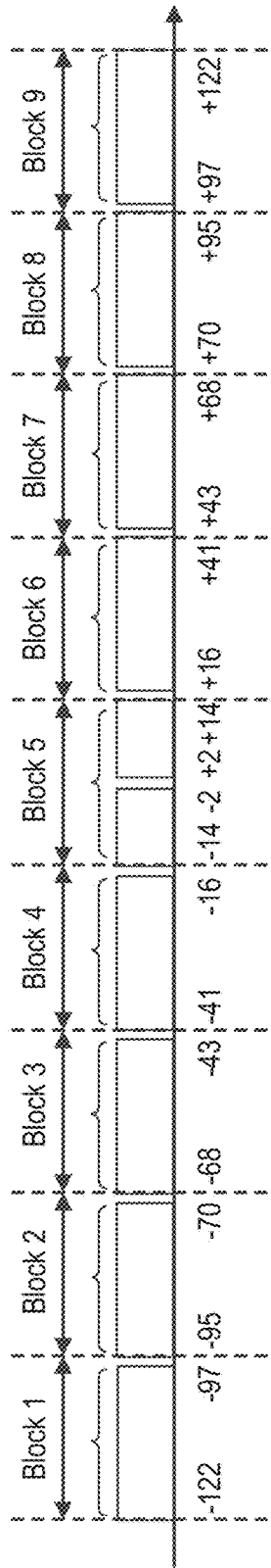
FIGS. 13A through 13C and 14A through 14C illustrate examples of different options for presenting a start tone index and an end tone index for each of the phase rotation blocks.
Figure 13B:
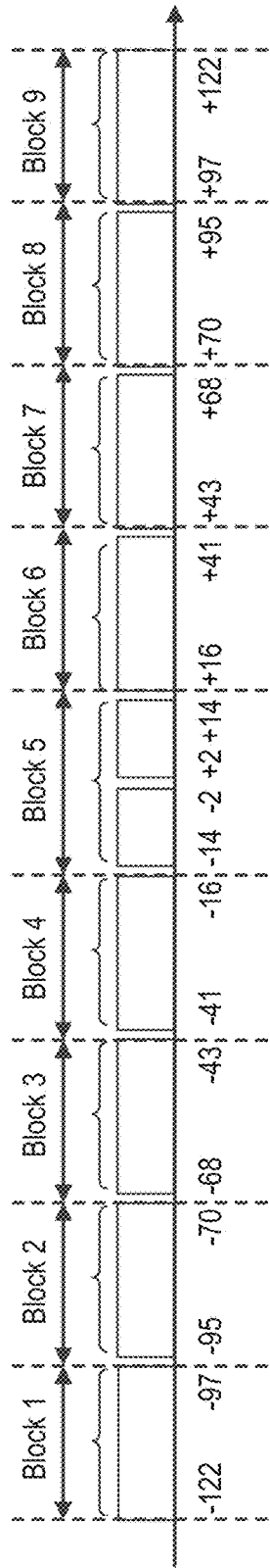
Figure 13C:
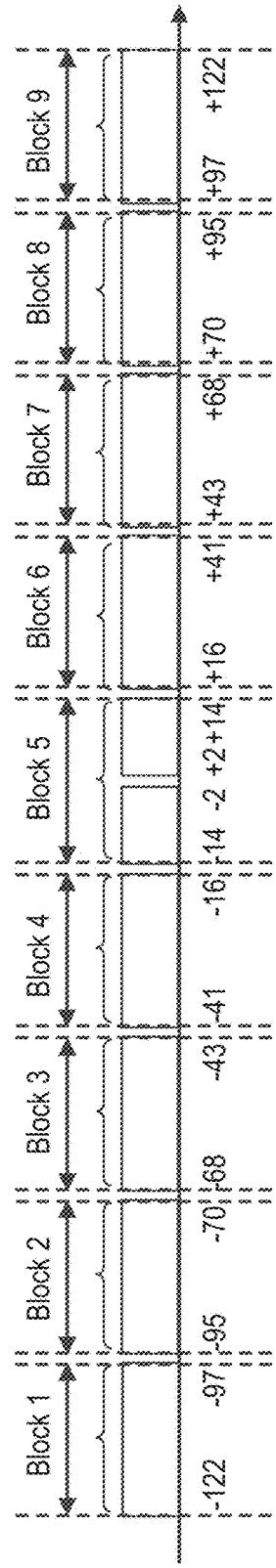

FIGS. 13A through 13C illustrate examples of different options by which to represent a start tone index and an end tone index for each of the phase rotation blocks. These different options may be utilized with the resource allocation provided in the second row 910 of FIG. 9 for example. The 9 phase rotation blocks are labeled "Block 1" through "Block 9" in FIGS. 13A through 13C and are applied to data/pilot tones, which are represented as rectangles that span a set of tones. A bracket denotes a phase rotation block. The start tone index and the end tone index of the phase rotation blocks are delineated by vertical dotted lines. The reserved tone indices (or null tone indices) are k=−96, −69, −42, −15, 15, 42, 69, and 96, and the DC tone indices are k=−1, 0, and 1.The reserved tones and DC tones are represented as gaps between the data/pilot tones.

FIG. 13A illustrates an example of a first option for representing the start and end tone indices for each of the phase rotation blocks:
  phase rotation block 1 include tone indices $-122 \leq k \leq -96$;
  phase rotation block 2 include tone indices $-95 \leq k \leq -70$;
  phase rotation block 3 include tone indices $-69 \leq k \leq -43$;
  phase rotation block 4 include tone indices $-42 \leq k \leq -17$;
  phase rotation block 5 include tone indices $-16 \leq k \leq 16$;
  phase rotation block 6 include tone indices $17 \leq k \leq 42$;
  phase rotation block 7 include tone indices $43 \leq k \leq 69$;
  phase rotation block 8 include tone indices $70 \leq k \leq 95$; and
  phase rotation block 9 include tone indices $96 \leq k \leq 122$,
where k denotes tone index. For simplicity, a shorthand representation is provided as follows: (1,26)+(26)+(1,26)+(26)+(13,7,13)+(26)+(26,1)+(26)+(26,1), which is the Shorthand Representation 20-2 described previously. This example uses conventions similar to those described above. Each "26" represents 26 data/pilot tones, each "1" represents 1 reserved tone, each "13" represents 13 data/pilot tones, and the "3" represents 3 DC tones. Each "( )" represents a phase rotation block. For the phase rotation blocks 1 through 4, each reserved tone is grouped with the phrase rotation block to the left of the reserved tone. For the phase rotation blocks 6 through 9, each reserved tone is grouped with the phrase rotation block to the right of the reserved tone.

FIG. 13B illustrates an example of a second option for representing the start and end tone indices for each of the phase rotation blocks:
  phase rotation block 1 include tone indices $-122 \leq k \leq -97$;
  phase rotation block 2 include tone indices $-96 \leq k \leq -70$;
  phase rotation block 3 include tone indices $-69 \leq k \leq -43$;
  phase rotation block 4 include tone indices $-42 \leq k \leq -16$;
  phase rotation block 5 include tone indices $-15 \leq k \leq 15$;
  phase rotation block 6 include tone indices $16 \leq k \leq 42$;
  phase rotation block 7 include tone indices $43 \leq k \leq 69$;
  phase rotation block 8 include tone indices $70 \leq k \leq 96$; and
  phase rotation block 9 include tone indices $97 \leq k \leq 122$.
For simplicity, a shorthand representation is as follows: (26)+(1,26)+(1,26)+(1,26)+(1,13,3,13,1)+(26,1)+(26,1)+(26,1)+(26). This example uses conventions similar to those describe above. No reserved tones are grouped with the phase rotation block 1 and phase rotation block 9.For phase rotation blocks 2 through 4, each reserved tone is grouped with the phrase rotation block to the right of the reserved tone. For the phase rotation blocks 6 through 8, each reserved tone is grouped with the phrase rotation block to the left of the reserved tone. Phase rotation block 5 includes both of its adjacent reserved tones.

FIG. 13C illustrates an example of a third option for representing the start and end tone indices for each of the phase rotation blocks:
  phase rotation block 1 include tone indices $-122 \leq k \leq -97$;
  phase rotation block 2 include tone indices $-95 \leq k \leq -70$;
  phase rotation block 3 include tone indices $-68 \leq k \leq -43$;
  phase rotation block 4 include tone indices $-41 \leq k \leq -16$;
  phase rotation block 5 include tone indices $-14 \leq k \leq 14$;
  phase rotation block 6 include tone indices $16 \leq k \leq 41$;
  phase rotation block 7 include tone indices $43 \leq k \leq 68$;
  phase rotation block 8 include tone indices $70 \leq k \leq 95$; and
  phase rotation block 9 include tone indices $97 \leq k \leq 122$.
For simplicity, a shorthand representation is as follows: (26) 1 (26) 1 (26) 1 (26) 1 (13,3,13) 1 (26) 1 (26) 1 (26) 1 (26). Each "26" represents 26 data/pilot tones, each "1" represents 1 reserved tone, each "13" represents 13 data/pilot tones, and the "3" represents 3 DC tones. Each "( )" represents a phase rotation block. In this example, none of the reserved tones is included into any phase rotation block. Thus, the reserved tones are not phase rotated.

Figure 14A:
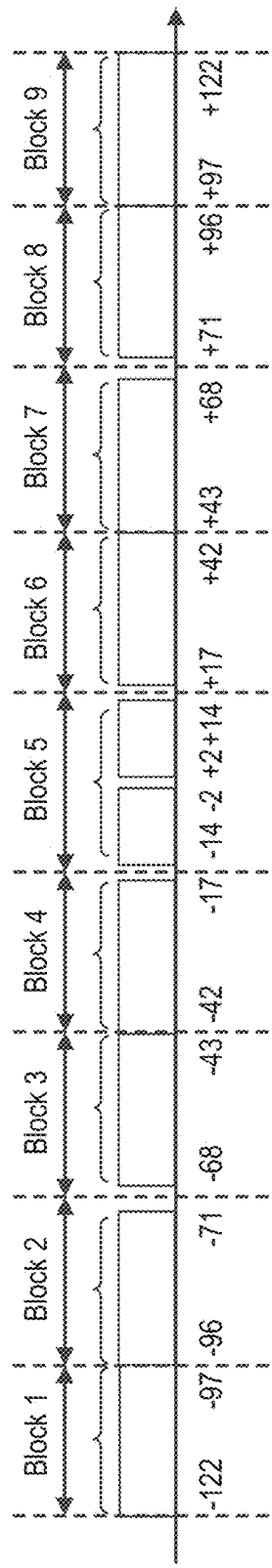
Figure 14B:
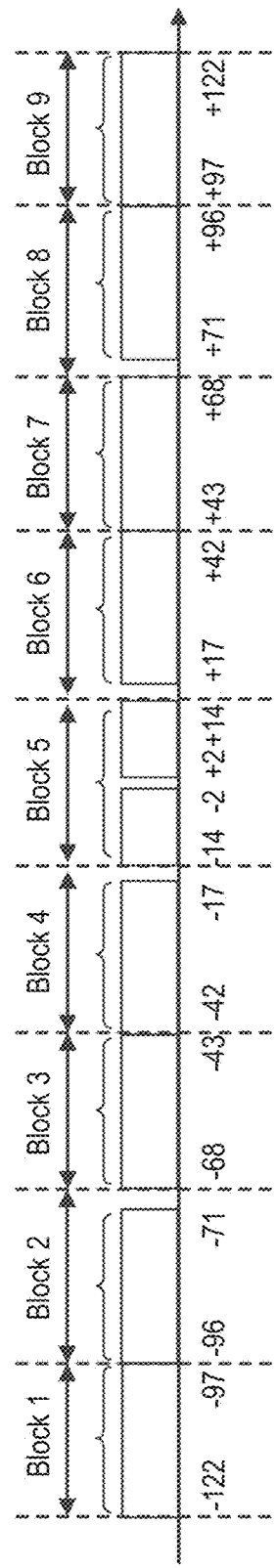
Figure 14C:
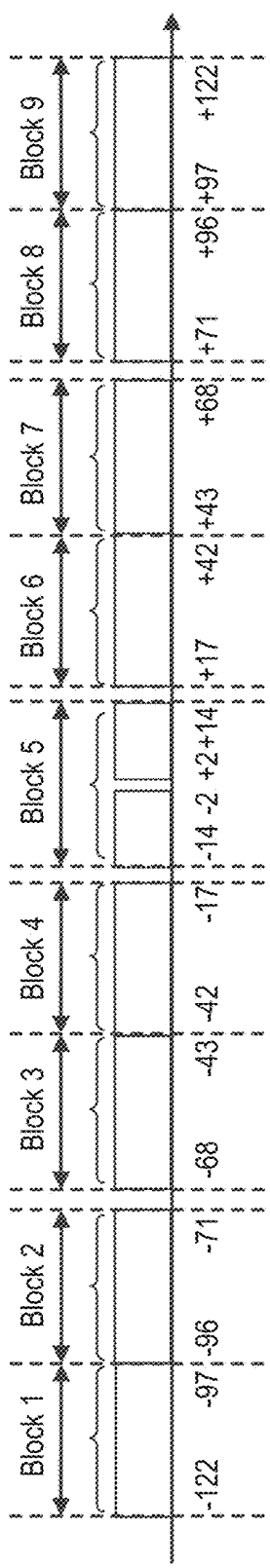

FIGS. 14A through 14C illustrate examples of different options by which to represent a start tone index and an end tone index for each of the phase rotation blocks. These different options may be utilized with the resource allocation provided in the second row 1010 of FIG. 10 for example. The 9 phase rotation blocks are labeled "Block 1" through "Block 9" in FIGS. 14A through 14C and are applied to data/pilot tones, which are represented as rectangles that span a set of tones. The start tone index and the end tone index are delineated by vertical dotted lines. The reserved tone indices (or null tone indices) are k=−70, −69, −16, −15, 15, 16, 69, and 70, and the DC tone indices are k=−1, 0, and 1.The reserved tones and DC tones are represented as gaps between the data/pilot tones.

FIG. 14A illustrates an example of a first option for representing the start and end tone indices for each of the phase rotation blocks:
  phase rotation block 1 include tone indices $-122 \leq k \leq -97$;
  phase rotation block 2 include tone indices $-96 \leq k \leq -70$;
  phase rotation block 3 include tone indices $-69 \leq k \leq -43$;
  phase rotation block 4 include tone indices $-42 \leq k \leq -16$;
  phase rotation block 5 include tone indices $-15 \leq k \leq 15$;
  phase rotation block 6 include tone indices $16 \leq k \leq 42$;
  phase rotation block 7 include tone indices $43 \leq k \leq 69$;
  phase rotation block 8 include tone indices $70 \leq k \leq 96$; and
  phase rotation block 9 include tone indices $97 \leq k \leq 122$.
For simplicity, a shorthand representation is provided as follows: (26)+(26,1)+(1,26)+(26, 1)+(1,13,3,13,1)+(1,26)+(26,1)+(1,26)+(26). This example uses conventions similar to those described above. This example depicts four 2-consecutive reserved tones. The left one of each of the 2-consecutive reserved tones is grouped with the phase rotation block to the left of the left one. The right one of each of the reserved tones is grouped with the phase rotation block to the right of the right one of the reserved tones.

FIG. 14B illustrates an example of a second option for representing the start and end tone indices for each of the phase rotation blocks:
phase rotation block 1 include tone indices $-122 \leq k \leq -97$;
phase rotation block 2 include tone indices $-96 \leq k \leq -69$;
phase rotation block 3 include tone indices $-68 \leq k \leq -43$;
phase rotation block 4 include tone indices $-42 \leq k \leq -15$;
phase rotation block 5 include tone indices $-14 \leq k \leq 14$;
phase rotation block 6 include tone indices $15 \leq k \leq 42$;
phase rotation block 7 include tone indices $43 \leq k \leq 68$;
phase rotation block 8 include tone indices $69 \leq k \leq 96$; and
phase rotation block 9 include tone indices $97 \leq k \leq 122$.
For simplicity, a shorthand representation is provided as follows: (26)+(26,2)+(26)+(26, 2)+(13,3,13)+(2,26)+(26)+(2,26)+(26). This example uses conventions similar to those described above. This example depicts four 2-consecutive reserved tones. Two-consecutive reserved tones are grouped either with the phase rotation block to the left of the reserved tones or to the right of the reserved tones.

FIG. 14C illustrates an example of a third option for representing the start and end tone indices for each of the phase rotation blocks:
phase rotation block 1 include tone indices $-122 \leq k \leq -97$;
phase rotation block 2 include tone indices $-96 \leq k \leq -71$;
phase rotation block 3 include tone indices $-68 \leq k \leq -43$;
phase rotation block 4 include tone indices $-42 \leq k \leq -17$;
phase rotation block 5 include tone indices $-14 \leq k \leq 14$;
phase rotation block 6 include tone indices $17 \leq k \leq 42$;
phase rotation block 7 include tone indices $43 \leq k \leq 68$;
phase rotation block 8 include tone indices $71 \leq k \leq 96$; and
phase rotation block 9 include tone indices $97 \leq k \leq 122$.
For simplicity, a shorthand representation is provided as follows: (26) (26) 2 (26) (26) 2 (13,3,13) 2 (26) (26) 2 (26) (26). This example uses conventions similar to those described above. Each "26" represents 26 data/pilot tones, each "2" represents 2 consecutive reserved tones, each "13" represents 13 data/pilot tones, and the "3" represents 3 DC tones. Each "( )" represents a phase rotation block. In this example, none of the reserved tones is included into any phase rotation block. Thus, the reserved tones are not phase rotated.

FIGS. 13A through 13C and FIGS. 14A through 14C illustrate examples by which to represent the start and end tone indices of the phase rotation blocks. Other manners by which to represent the start and end tone indices of the phase rotation blocks may also be utilized. In some aspects, due to the use of 1 or 2 reserved tones between adjacent resource units, the tone indices at one or both boundaries may fluctuate by 2.

In one aspect, a phase rotation block includes one or more resource units without any reserved tone. In another aspect, a phase rotation block includes one or more resource units with one reserved tone (e.g., as either the leftmost tone or the rightmost tone of the phase rotation block). In another aspect, a phase rotation block includes one or more resource units with two reserved tones (e.g., as the two leftmost tones, as the two rightmost tones, or as one leftmost tone and one rightmost tone of the phase rotation block).

In one or more implementations, hierarchical phase rotation may be utilized to apply phase rotation. The 40 MHz phase rotation may be provided such that the phase rotation utilized for 20 MHz, denoted as $\gamma_{20\ MHz}$, is maintained and an additional phase rotation, denoted as $\gamma_{40\ MHz}$, is applied on top of each 20 MHz phase rotation. Accordingly, for 40 MHz, the product of two phase rotation values (e.g., $\gamma_{20\ MHz} \cdot \gamma_{40\ MHz}$) may be applied for each phase rotation block. Similarly, the 80 MHz phase rotation may be provided such that the phase rotation utilized for 20 MHz and 40 MHz are maintained and an additional phase rotation, denoted as $\gamma_{80\ MHz}$, is applied on top of each 20 MHz and 40 MHz phase rotation.

FIG. 15 illustrates examples of applying phase rotation hierarchically. A first graph 1505 illustrates applying four phase rotation values to their respective phase rotation blocks utilized for a 20 MHz channel bandwidth. A bracket denotes a phase rotation block, and a value above a bracket denotes the phase rotation value for the phase rotation block. A phase rotation value is multiplied to each respective element of a sequence within the bracket (or the phase rotation block). A second graph 1510 illustrates applying two-tier phase rotations to the phase rotation blocks. The first tier applies eight phase rotation values to two sets of the phase rotation blocks utilized for the 20 MHz channel bandwidth (e.g., created by duplicating the 20 MHz phase rotation blocks). The second tier applies four phase rotation values to four phase rotation blocks after the eight phase rotations are applied. Alternatively, the two-tier phase rotations can be performed by first obtaining a product of the two-tier phase rotations and then applying the product to the underlying phase rotation blocks (e.g., multiplying each of the second tier phase rotation values to a respective one of the first tier phase rotation values, and then multiplying each resulting product to a respective element of the eight phase rotation blocks).

A third graph 1515 illustrates applying three-tier phase rotations to the phase rotation blocks. The first tier applies sixteen phase rotation values to four sets (e.g., four duplicated sets) of the phase rotation blocks utilized for the 20 MHz channel bandwidth (or two duplicated sets of the phase rotation blocks utilized for the 40 MHz channel bandwidth). The second tier applies eight phase rotation values to the eight phase rotation blocks. The third tier applies four phase rotation values to the four phase rotation blocks as grouped consecutively. Alternatively, the three-tier phase rotations can be performed by first obtaining a product of the three-tier phase rotations and then applying the product to the underlying phase rotation blocks (e.g., multiplying the three tier phase rotation values, the second tier phase rotation values, and the first tier phase rotation values, and then multiplying the resulting product to the four sets of the phase rotation blocks).

For the third graph 1515, the 80 MHz channel bandwidth includes a set of tones 1518 not part of the duplication of the 20 and 40 MHz channel bandwidths. The set of tones 1518 is associated with only the third tier phase rotation, and is not associated with any of the lower tier phase rotation. Thus, a portion of the third tier phase rotation values applicable to the set of tones 1518 is applied to the set of tones 1518.

Although FIG. 15 illustrates an example in which each tier of the hierarchy (e.g., going from the first graph 1505 to the second graph 1810, and going from the second graph 1810 to the third graph 1515) utilizes the same phase rotation blocks of [+1, −1, −1, −1], different phase rotation blocks may be utilized between tiers and within each tier of the hierarchy. Furthermore, fewer or more phase rotation blocks may be utilized. Furthermore, additional one or more tiers of phase rotation may be applied.

FIGS. 16A through 16C illustrate examples of applying phase rotations hierarchically. The description from FIG. 15 also applies to FIGS. 16A through 16C, with the differences between FIG. 15 and FIGS. 16A through 16C described herein. FIG. 16A illustrates the resource allocation provided in the second row 910 of FIG. 9 with phase rotation block implementation provided by phase rotation block option 2 for 20 MHz (e.g., (26,1)+(26,1)+(26,1)+(26,1)+(13,3,13)+(1,26)+(1,26)+(1,26)+(1,26)). Phase rotation values [+1, −1, −1, −1] may be applied to the first four phase rotation blocks, and the same phase rotation values [+1, −1, −1, −1] may be applied to the last four phase rotation blocks. The reserved tones (1's) may be allocated to different phase rotation blocks or not allocated to any phase rotation block, as described in more detail above.

In one or more implementations, consecutive phase rotation blocks that have the same multiplication value may be consolidated into a single phase rotation block. For example, the second, third, and fourth phase rotation blocks (each having a phase rotation value of −1) for the 20 MHz chancel bandwidth may be formulated and/or implemented as one phase rotation block (having a phase rotation value of −1).

FIG. 16B illustrates an example of a 40 MHz channel bandwidth resource allocation obtained by creating two duplicated sets of the resource allocation of FIG. 16A (but without the DC tones of FIG. 16A). See, e.g., the phase rotation block option 3 for the 40 MHz channel bandwidth, which is (26,1)+(26,1)+(26,1)+(26,1)+(26)+(1,26)+(1,26)+(1,26)+(1,26), {0, 0, 0, 0, 0}, (26,1)+(26,1)+(26,1)+(26,1)+(26)+(1,26)+(1,26)+(1,26)+(1,26). The reserved tones (1's) may be allocated to different phase rotation blocks or not allocated to any phase rotation block, as described in more detail above.

Two-tier phase rotation may be applied. The first tier phase rotation can use two duplicated sets of the phase rotation values used for FIG. 16A. No first tier phase rotation is applied to the resource units 1610 and 1615 and the 5 DC tones. The second tier phase rotation can use phase rotation values [+1, −1, −1, −1] applied over four phase rotation blocks. No second tier phase rotation is applied to the 5 DC tones. As described with respect to FIG. 15, the first and second tier phase rotations can be multiplied together and then applied to the underlying 16 phase rotation blocks.

In some aspects, a portion of resource unit 1610 is associated with the first one of the phase rotation blocks at the second tier (e.g., +1 phase rotation) and the remaining portion of the resource unit 1610 is associated with the second one of the phase rotation blocks at the second tier (e.g., −1 phase rotation). Similarly, a portion of resource unit 1615 is associated with a third one of the phase rotation blocks at the second tier (e.g., +1 phase rotation) and the remaining portion of the resource unit 1615 is associated with a fourth one of the phase rotation blocks at the second tier (e.g., −1 phase rotation).

FIG. 16C illustrates an example of an 80 MHz channel bandwidth resource allocation obtained by creating four sets of the resource allocation of FIG. 16A (but without the DC tones of FIG. 16A). See, e.g., the phase rotation block option 3 for the OFDMA 80 MHz channel bandwidth, which is: (26,1)+(26,1)+(26,1)+(26,1)+26+(1,26)+(1,26)+(1,26)+(1,26), (26,1)+(26,1)+(26,1)+(26,1)+26+(1,26)+(1,26)+(1,26)+(1,26), (13,{0,0,0,0,0,0,0},13), (26,1)+(26,1)+(26,1)+(26,1)+26+(1,26)+(1,26)+(1,26)+(1,26), (26,1)+(26,1)+(26,1)+(26,1)+26+(1,26)+(1,26)+(1,26)+(1,26).

The reserved tones (1's) may be allocated to different phase rotation blocks or not allocated to any phase rotation block, as described in more detail above.

The three-tier phase rotation described with respect to the third graph 1505 may be applied in a similar manner. The phase rotation illustrated in FIGS. 16A and 16B may be duplicated for each of the four 242-tone resource units shown in FIG. 16C. The resource allocation of FIG. 16C also includes an additional 26 data/pilot tones in the center resource unit 1620. In one aspect, the center resource unit 1620 may be associated with one or more phase rotation blocks/values introduced at the third-tier phase rotation (e.g., the second and third phase rotation blocks/values at the third-tier phase rotation), and is not associated with any lower tier phase rotation blocks/values. See, e.g., the set of tones 1518 in FIG. 15.

In one or more implementations, HE LTF sequences of longer lengths may be obtained based on duplications of shorter length LTF sequences (e.g., subblocks or sub-sequences). With reference to examples in FIG. 9, a sequence length of 26 and 52 may be designed for the 26-tone resource unit and the 52-tone resource unit, respectively. Multiple sub-sequences (e.g., 26-length sequences) may form a longer sequence (e.g., a 242-length sequence; or a 245-length sequence that includes 3 elements associated with DC tones).

In one or more aspects, a PAPR associated with a training sequence (e.g., HE LTF sequence) is generally designed to be lower than a PAPR associated with random data. In one or more aspects, a PAPR of an HE LTF sequence may be 6.5 dB or lower (e.g., 6 dB, 5.5 dB, 5 dB, 4.5 dB). In one or more aspects, a PAPR for an HE LTF sequence may be 5 dB or lower. In one or more aspects, each of one or more sub-sequences of an HE LTF sequence is associated with a PAPR that is 6.5 dB or lower. In one or more aspects, each of one or more sub-sequences of an HE LTF sequence is associated with a PAPR that is 5 dB or lower. In one aspect, an HE LTF sequence consists of one or more sub-sequences. In one aspect, a sub-sequence may correspond to a subblock or a resource unit. In one aspect, a sub-sequence includes elements associated with a set of data/pilot tones or with a set of usable tones. In one aspect, a sub-sequence includes successive elements. In one aspect, a sub-sequence is associated with a set of contiguous tones.

It may be difficult to design long sequences with good PAPR properties. For example, while a 52-length sequence may be constructed by concatenating two identical 26-length sequences, the 52-length sequence constructed in this manner may have PAPR properties that are not as low as a specifically designed 52-length sequence. However, certain length 26 sequences, which have low PAPR by themselves and also have low PAPR when utilized to construct a 52-length sequence, may be used to form a 52-length sequence by concatenating the two 26-length sequences.

FIGS. 17A through 17D illustrate examples of duplication of a 26-tone sequence for a channel bandwidth 20 MHz resource allocation illustrated in FIG. 10. In FIGS. 17A through 17D, "A" may represent a 26-length LTF sequence associated with 26 data/pilot tones and "B" may represent a 29 length LTF sequence associated with, in order, 13 data/pilot tones, 3 DC tones, and 13 data/pilot tones. Although the LTF sequences utilized in FIGS. 17A through 17D are constructed using duplications of the "A" sequence, other manners by which to construct the LTF sequences may be utilized. In some aspects, a respective phase rotation may be applied to each "A" sequence and the "B" sequence. In some aspects, instead of duplicating the "A" sequence, one or more different 26-tone LTF sequences may be utilized.

Figure 17A:
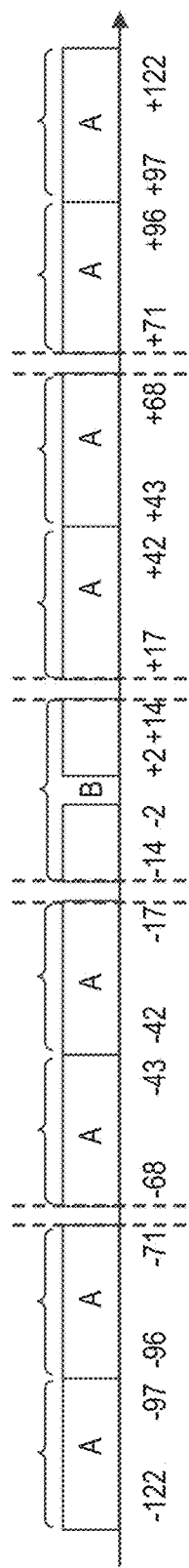
FIGS. 17A through 17D illustrate examples of duplication of a 26-tone sequence for the channel bandwidth 20 MHz resource allocation illustrated in FIG. 10.

FIG. 17A illustrates an example of duplication of a 26-tone sequence for the resource allocation illustrated in the second row 1010 of FIG. 10. The "A" sequence may be utilized for each of the 26-tone resource units.

Figure 17B:
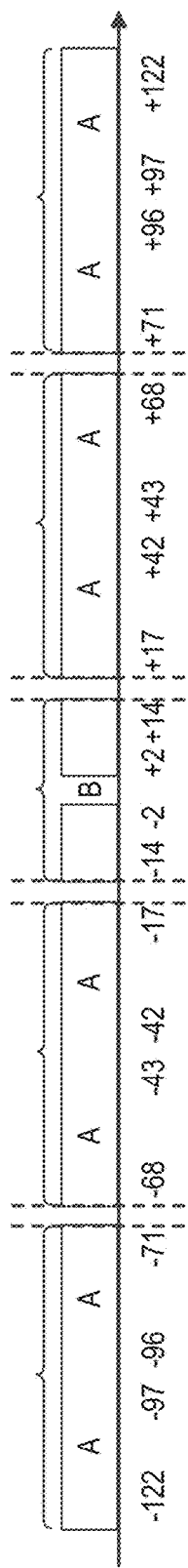

FIG. 17B illustrates an example of duplication of a 26-tone sequence for the resource allocation illustrated in the third row 1015 of FIG. 10. Two "A" sequences may be duplicated to form a 52-tone sequence that fills each of the 52-tone resource units.

Figure 17C:
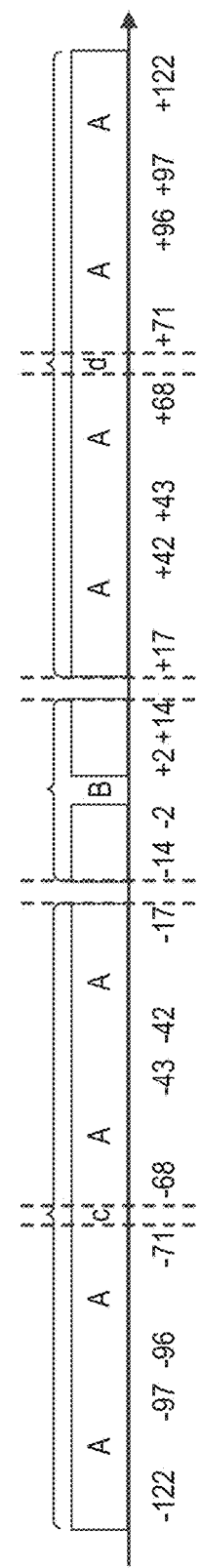

FIG. 17C illustrates an example of duplication of a 26-tone sequence for the resource allocation illustrated in the fourth row 1020 of FIG. 10. In FIG. 17C, 106-tone resource units are utilized. Four "A" sequences may be duplicated to form 104 tones of each of the 106-tone resource units. The notations c and d indicate additional tones to fill the 106-tone resource units. The "c" has two tones, and the "d" has two tones. The $c=\{c_1, c_2\}$ and the $d=\{d_1, d_2\}$ are length two sequences that are utilized to fill the gaps between two "A" sequences. Each of $c_1$, $c_2$, $d_1$, and $d_2$ may be +1 or −1, and each may be selected to form a 106-tone sequence associated with lower PAPR.

Figure 17D:
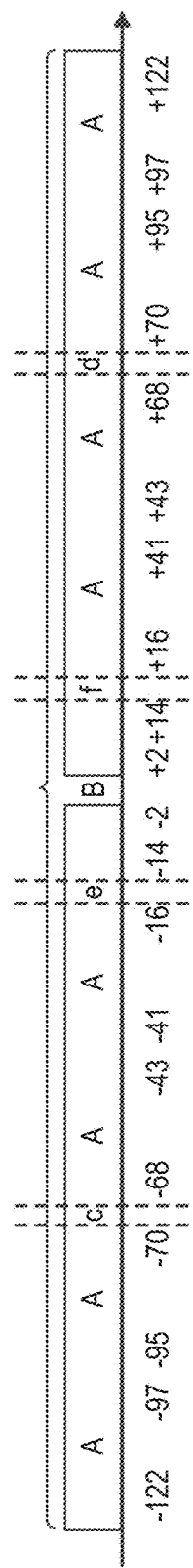

FIG. 17D illustrates an example of duplication of a 26-tone sequence for the resource allocation illustrated in the fifth row 1025 of FIG. 10. In FIG. 17D, a single 242-tone resource unit is utilized. The 242-tone resource unit may include, in order, two "A" sequences, a length two sequence c, two "A" sequences, a length two sequence e, a "B" sequence, a length two sequence f, two "A" sequences, a length two sequence d, and two "A" sequences. The $c=\{c_1, c_2\}$, $d=\{d_1, d_2\}$, $e=\{e_1, e_2\}$, and $f=\{f_1, f_2\}$ are length two sequences that are utilized to fill the gaps resulting from the duplication of the A sequence, which is a 26-length LTF sequence. Each of $c_1$, $c_2$, $d_1$, $d_2$, $e_1$, $e_2$, $f_1$, and $f_2$ may be +1 or −1, and each may be selected to form a 242-tone plus 3 DC-tone sequence associated with lower PAPR. In one aspect, each of $c_1$, $c_2$, $d_1$, $d_2$, $e_1$, $e_2$, $f_1$, and $f_2$ may be a data/pilot tone, and each may be considered as a gap filler.

FIGS. 18A through 18D illustrate examples of duplication of a 26-tone sequence for the channel bandwidth 40 MHz resource allocation illustrated in FIG. 11. In FIGS. 18A through 18D, "A" may represent a 26-length LTF sequence associated with 26 data/pilot tones. In some aspects, a respective phase rotation may be applied to each "A" sequence. In some aspects, instead of duplicating the "A" sequence, one or more different 26-tone LTF sequences may be utilized. Tone indices −2 to +2 represent a 5 DC-tone sequence in each of FIGS. 18A through 18D.

Figure 18A:
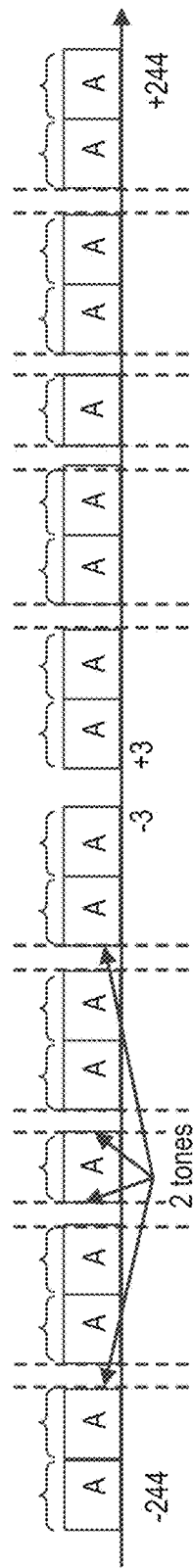
FIGS. 18A through 18D illustrate examples of duplication of a 26-tone sequence for the channel bandwidth 40 MHz resource allocation illustrated in FIG. 11.

FIG. 18A illustrates an example of duplication of a 26-tone sequence for the resource allocation illustrated in the second row 1110 of FIG. 11. The "A" sequence may be utilized for each of the 26-tone resource units. Each of the 26 tone resource units is associated with a respective phase rotation block.

Figure 18B:
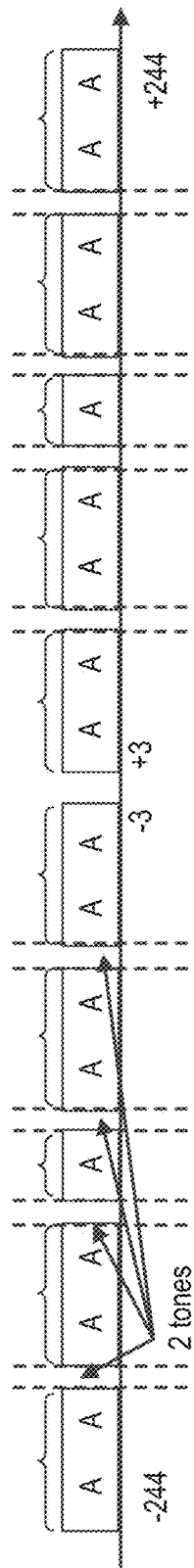

FIG. 18B illustrates an example of duplication of a 26-tone sequence for the resource allocation illustrated in the third row 1115 of FIG. 11. Two "A" sequences may be duplicated to form a 52-tone sequence that fills each of the 52-tone resource units. Each of the 52-tone resource units and each of the 26-tone resource units are associated with a respective phase rotation block.

Figure 18C:
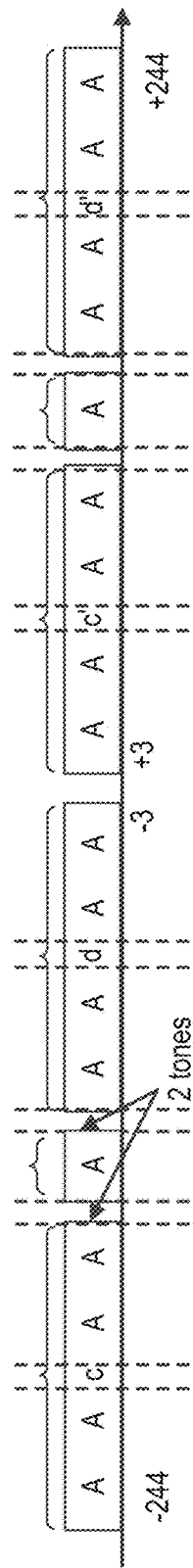

FIG. 18C illustrates an example of duplication of a 26-tone sequence for the resource allocation illustrated in the fourth row 1120 of FIG. 11. Four "A" sequences may be duplicated to form each 106-tone resource unit, with length two sequences $c=\{c_1, c_2\}$, $d=\{d_1, d_2\}$, $c'=\{c_1', c_2'\}$, and $d'=\{d_1', d_2'\}$ utilized to fill the gaps resulting from the duplication of the "A" sequence. Each element in c, d, c', and d' may be +1 or −1, and each may be selected to form a 106-tone sequence associated with lower PAPR. Each of the 106-tone resource units and each of the 26-tone resource units are associated with a respective phase rotation block.

Figure 18D:
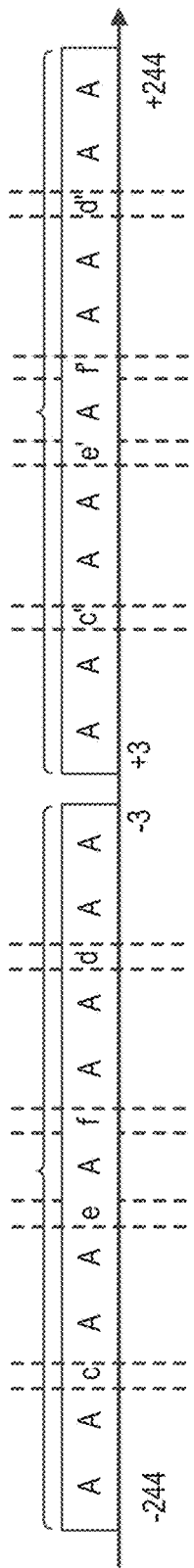

FIG. 18D illustrates an example of duplication of a 26-tone sequence for the resource allocation illustrated in the fifth row 1125 of FIG. 11. Nine "A" sequences may be duplicated to form each 242-tone resource unit, with length two sequences $c=\{c_1, c_2\}$, $d=\{d_1, d_2\}$, $e=\{e_1, e_2\}$, $f=\{f_1, f_2\}$, $c'=\{c_1', c_2'\}$, $d'=\{d_1', d_2'\}$, $e'=\{e_1', e_2'\}$, and $f'=\{f_1', f_2'\}$ utilized to fill the gaps resulting from the duplication of the "A" sequence. Each of c, d, e, f, c', d', e', and f' may be +1 or −1, each may be a data/pilot tone, each may be considered a gap filler, and each may be selected to form a 242-tone sequence associated with lower PAPR. Each of the 242-tone resource units is associated with a respective phase rotation block.

Figure 19A:
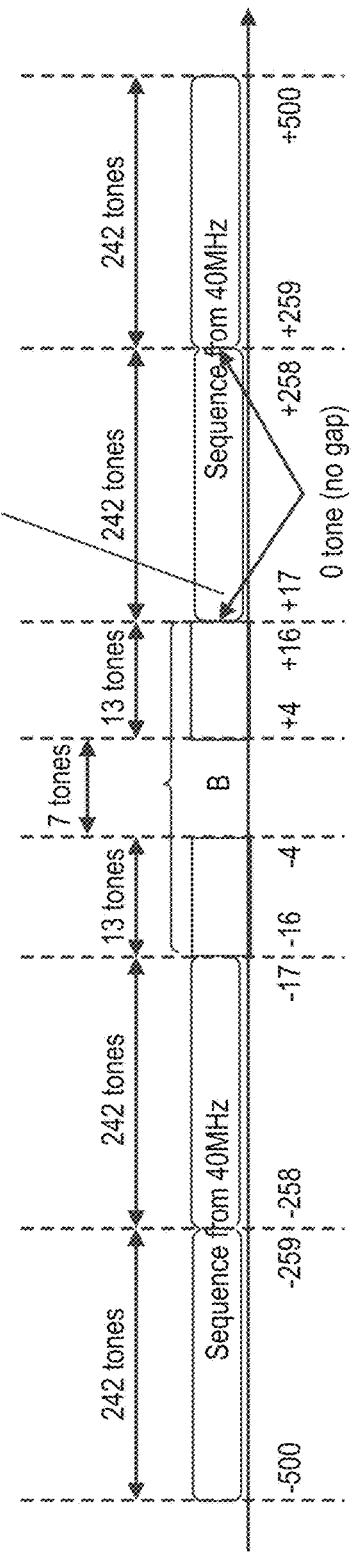
FIG. 19A illustrate an example of an LTF for an 80 MHz channel bandwidth constructed using LTF sequences for a 20 MHz channel bandwidth.

FIG. 19A illustrates an example of an LTF sequence for an 80 MHz channel bandwidth constructed using LTF sequences for a 40 MHz channel bandwidth. A resource allocation for the 80 MHz channel bandwidth may be the resource allocation described for the fifth row 1225 in FIG. 12. The LTF sequence for 80 MHz channel bandwidth may include four 20 MHz sequences (e.g., 242-tone LTF sequences) and a 33-tone center resource unit. In some aspects, one or more of the 20 MHz sequences may be used as shown in FIG. 17D, except with the DC tones (shown in FIG. 17) removed.

Figure 19B:
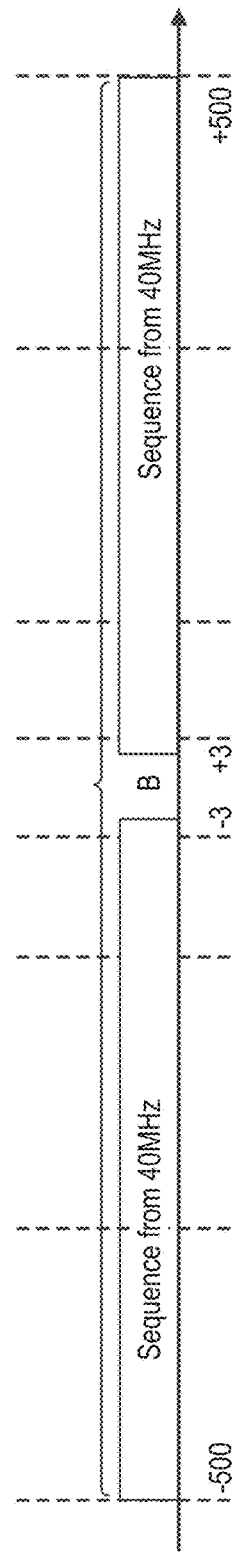
FIG. 19B illustrate an example of an LTF for an 80 MHz channel bandwidth constructed using LTF sequences for a 40 MHz channel bandwidth.

FIG. 19B illustrates an example of an LTF sequence for an 80 MHz channel bandwidth constructed using LTF sequences for a 40 MHz channel bandwidth. A resource allocation for the 80 MHz channel bandwidth may be the resource allocation described for the seventh row 1235 in FIG. 12. The LTF for 80 MHz channel bandwidth may include two 40 MHz sequences (e.g., 484-tone LTF sequences), two 14-tone sequences, and one 5-DC tone sequence. The 80 MHz channel bandwidth may be utilized for non-OFDMA cases.

For each of the 20 MHz, 40 MHz, and 80 MHz HE PPDU, different LTF sequences may be provided. The LTF sequence may be selected based on PAPR. Generally, the LTF sequences associated lower PAPR are desirable. Although examples of sequence options are provided below, other sequence options are possible and may be utilized instead.

In some aspects, a portion or an entirety of a VHT LTF sequence may be utilized to construct the HE LTF sequence. For example, a 20 MHz HE PPDU transmission may utilize the 80 MHz VHT LTF sequence $VHTLTF_{-122,122}$ as the 20 MHz HE PPDU HE LTF sequence, where $VHTLTF_{-122,122}$ is provided in Equations (7) and (8).

In some aspects, the 20 MHz HE PPDU transmission may utilize the following LTF sequence:

$$HELTF_{2a} = \{[HELTF_{26}, a_1], [HELTF_{26}, a_2], \\ [HELTF_{26}, a_3], [HELTF_{26}, a_4], [HELTF_{26, 1:13}, \\ 0, 0, 0, HELTF_{26, 14:26}], [a_5, HELTF_{26}], [a_6, \\ HELTF_{26}], [a_7, HELTF_{26}], [a_8, HELTF_{26}]\} \quad \text{Equation (16)}$$

where $HELTF_{26, 1:13}$ corresponds to the left 13 elements of the $HELTF_{26}$ sequence, $HELTF_{26, 14:26}$ corresponds to the right 13 elements of $HELTF_{26}$ sequence. $a_1$ through $a_8$ are values for reserved tones, and they are real values of either +1 or −1.The $HELTF_{26}$ sequence can be $LTF_{left}$, $LTF_{right}$, or other binary phase shift keying (BPSK) sequence. See Equations (2) and (3) for $LTF_{left}$ and $LTF_{right}$, respectively. The $HELTF_{26}$ sequence and the $a_1$ through $a_8$ may be selected for use in the $HELTF_{2a}$ sequence presented by Equation (16) based on a resulting PAPR of the $HELTF_{2a}$ sequence. For example, the $HELTF_{26}$ sequence and the $a_1$ through $a_8$ may be selected so as to minimize or reduce the resulting PAPR of the $HELTF_{2a}$ sequence. In some aspects, a different sequence for $HELTF_{26}$ may be utilized for each occurrence of $HELTF_{26}$ in Equation (16). This sequence option may be utilized with phase rotation block option 2 for 20 MHz, with the positions of the $a_1$ through $a_8$ coinciding with the positions of the reserved tones.

In some aspects, the 20 MHz HE PPDU transmission may utilize the following LTF sequence:

$$HELTF_{3a}=\{[c_1, HELTF_{52}, c_2], [c_3, HELTF_{52}, c_4],$$
$$[HELTF_{26, 1:13}, 0, 0, 0, HELTF_{26, 14:26}], [c_5,$$
$$HELTF_{52}, c_6], [c_7, HELTF_{52}, c_8]\} \quad \text{Equation (17)}$$

where $HELTF_{52}$ can be $\{LTF_{left}, LTF_{left}\}$, $\{LTF_{right}, LTF_{right}\}$, $\{LTF_{left}, LTF_{right}\}$, or a 52-length BPSK sequence. The $c_1$ through $c_8$ are values for reserved tones, and they are real values of either +1 or −1. The $HELTF_{52}$ sequence and the $c_1$ through $c_8$ may be selected for use in the $HELTF_{3a}$ sequence presented by Equation (17) based on a resulting PAPR of the $HELTF_{2a}$ sequence. For example, the $HELTF_{52}$ sequence and the $c_1$ through $c_8$ may be selected so as to minimize or reduce the resulting PAPR of the $HELTF_{3a}$ sequence. In some aspects, a different sequence for $HELTF_{52}$ may be utilized for each occurrence of $HELTF_{52}$ in Equation (17). This sequence option may be utilized with phase rotation block option 3 for 20 MHz, with the positions of the $c_1$ through $c_8$ coinciding with the positions of the reserved tones.

In one or more implementations, a base sequence for the 40 MHz HE LTF sequence may be constructed using a portion or an entirety of a VHT LTF sequence. The base sequence may be provided by:

$$HELTF_{242}=\{LTF_{left}, 1, LTF_{right}, -1, -1, -1, 1, 1, -1,$$
$$1, -1, 1, 1, -1, LTF_{left}, 1, LTF_{right}, 1, -1, 1, -1,$$
$$1, -1, -1, 1, LTF_{left}, 1, LTF_{right}, -1, -1, -1, 1,$$
$$1, -1, 1, -1, 1, -1, 1, 1, -1, LTF_{left}, 1,$$
$$LTF_{right}\} \quad \text{Equation (18)}$$

The $HELTF_{242}$ of Equation (18) includes the 80 MHz VHT LTF sequence $VHTLTF_{-122,122}$ of Equations (7) and (8) without the center three zeros values, which were mapped to DC tones. The total length of the $HELTF_{242}$ sequence is 242, while the total length of the $VHTLTF_{-122,122}$ sequence is 245.

In some aspects, the 40 MHz HE PPDU transmission may utilize the following sequence: $\{HELTF_{242}, 0, 0, 0, 0, 0, HELTF_{242}\}$. This sequence option may be utilized with phase rotation block option 1 for 40 MHz.

In some aspects, the 40 MHz HE PPDU transmission may utilize the following LTF sequence:

$$HELTF_{484A}=\{[a_1, HELTF_{26}], [HELTF_{26}, a_2], [a_3,$$
$$HELTF_{26}], [HELTF_{26}, a_4], [HELTF_{26}], [a_5,$$
$$HELTF_{26}], [HELTF_{26}, a_6], [a_7, HELTF_{26}],$$
$$[HELTF_{26}, a_8], [0,0,0,0,0], [a_1, HELTF_{26}],$$
$$[HELTF_{26}, a_2], [a_3, HELTF_{26}], [HELTF_{26}, a_4],$$
$$[HELTF_{26}], [a_5, HELTF_{26}], [HELTF_{26}, a_6], [a_7,$$
$$HELTF_{26}], [HELTF_{26}, a_8]\} \quad \text{Equation (19)}$$

In some aspects, the 40 MHz HE PPDU transmission may utilize the following LTF sequence:

$$HELTF_{484A}=\{[a_1, HELTF_{26}], [HELTF_{26}, a_2], [a_3,$$
$$HELTF_{26}], [HELTF_{26}, a_4], [HELTF_{26}], [a_5,$$
$$HELTF_{26}], [HELTF_{26}, a_6], [a_7, HELTF_{26}],$$
$$[HELTF_{26}, a_8], [0,0,0,0,0], [a_9, HELTF_{26}],$$
$$[HELTF_{26}, a_{10}], [a_{11}, HELTF_{26}],$$
$$[HELTF_{26}, a_{12}], [HELTF_{26}], [a_{13}, HELTF_{26}],$$
$$[HELTF_{26}, a_{14}], [a_{15}, HELTF_{26}],$$
$$[HELTF_{26}, a_{16}]\} \quad \text{Equation (20)}$$

In Equations (19) and Equation (20), $HELTF_{26}$ can be $\{LTF_{left}\}$, $\{LTF_{right}\}$, or a 26-length sequence (e.g., associated with low PAPR). $a_1$ through $a_{16}$ are values for reserved tones, and they are real values of either +1 or −1. The sequences of Equations (19) and (20) may be utilized with phase rotation block option 3 for 40 MHz, with the positions of the $a_1$ through $a_8$ for Equation (19) and $a_1$ through $a_{16}$ for Equation (20) coinciding with the positions of the reserved tones.

In some aspects, the 40 MHz HE PPDU transmission may utilize the following LTF sequence:

$$HELTF_{484B}=\{[c_1, HELTF_{52}, c_2], [c_3, HELTF_{52}, c_4],$$
$$[HELTF_{26}], [c_5, HELTF_{52}, c_6], [c_7,$$
$$HELTF_{52}, c_8], [0, 0, 0, 0, 0], [c_1, HELTF_{26}, c_2],$$
$$[c_3, HELTF_{52}, c_4], [HELTF_{26}], [c_5, HELTF_{52},$$
$$c_6], [c_7, HELTF_{52}, c_8]\} \quad \text{Equation (21)}$$

In some aspects, the 40 MHz HE PPDU transmission may utilize the following LTF sequence:

$$HELTF_{484B}=\{[c_1, HELTF_{52}, c_2], [c_3, HELTF_{52}, c_4],$$
$$[HELTF_{26}], [c_5, HELTF_{52}, c_6], [c_7, HELTF_{52},$$
$$c_8], [0, 0, 0, 0, 0], [c_9, HELTF_{26}], [c_{11},$$
$$HELTF_{52}, c_{12}], [HELTF_{26}], [c_{13}, HELTF_{52},$$
$$c_{14}], [c_{15}, HELTF_{52}, c_{16}]\} \quad \text{Equation (22)}$$

In Equations (21) and Equation (22), $HELTF_{26}$ can be $\{LTF_{left}\}$, $\{LTF_{right}\}$, or a 26-length sequence (e.g., associated with low PAPR). $c_1$ through $c_{16}$ are values for reserved tones, and they are real values of either +1 or −1. The sequences of Equations (21) and (22) may be utilized with phase rotation block option 4 for 40 MHz, with the positions of the $c_1$ through $c_8$ for Equation (21) and $c_1$ through $c_{16}$ for Equation (22) coinciding with the positions of the reserved tones.

For 80 MHz HE PPDU transmission, the LTF sequence utilized for the OFDMA case and the non-OFDMA case may differ.

In some aspects, for the OFDMA case, the 80 MHz HE PPDU transmission may utilize the following LTF sequence:

$$HELTF_{994}=\{[HELTF_{242}], [HELTF_{242}],$$
$$[HELTF_{26,1:13}, 0,0,0,0,0,0,0, HELTF_{26,14:26}],$$
$$[HELTF_{242}], [HELTF_{242}]\} \quad \text{Equation (23)}$$

where $HELTF_{242}$ is provided in Equation (18).

In some aspects, for the non-OFDMA case, the 80 MHz HE PPDU transmission may utilize the following LTF sequence:

$$HELTF_{996}=\{[HELTF_{242}], [HELTF_{242}],$$
$$[HELTF_{28,1:14}, 0,0,0,0,0, HELTF_{28,15:28}],$$
$$[HELTF_{242}], [HELTF_{242}]\} \quad \text{Equation (24)}$$

Each of the sequences of Equations (23) and (24) may be utilized with phase rotation block option 1 for 80 MHz.

In some aspects, the 80 MHz HE PPDU transmission may utilize the following LTF sequence:

$$\{[HELTF_{484A}], [HELTF_{26,1:13}], [0,0,0,0,0],$$
$$[HELTF_{26,14:26}], [HELTF_{484A}]\} \quad \text{Equation (25)}$$

where $HELTF_{484A}$ is provided by Equations (19) and (20), but the 5 DC tones in Equations (19) and (20) are not part of $HELTF_{484A}$ when utilized in Equation (25).

In some aspects, the 80 MHz HE PPDU transmission may utilize the following LTF sequence:

$$\{[HELTF_{484B}], [HELTF_{26,1:13}], [0,0,0,0,0],$$
$$[HELTF_{26,14:26}], [HELTF_{484B}]\} \quad \text{Equation (26)}$$

where $HELTF_{484B}$ is provided by Equations (21) and (22), but the 5 DC tones in Equations (21) and (22) are not part of $HELTF_{484B}$ when utilized in Equation (26).

In one or more implementations, examples of an LTF sequence for 160 MHz channel bandwidth can be obtained through multiple (e.g., eight) duplications of an LTF sequence for 20 MHz channel bandwidth, through multiple (e.g., four) duplications of an LTF sequence for 40 MHz channel bandwidth, or through duplications (e.g., two) of an LTF sequence for 80 MHz channel bandwidth. The DC tone sequences for each of the 20 MHz, 40 MHz, and 80 MHz channel bandwidth are removed and not copied into an LTF sequence for 160 MHz channel bandwidth.

In one or more implementations, examples of an LTF sequence for 80+80 MHz channel bandwidth can be obtained through multiple (e.g., eight) duplications of an LTF sequence for 20 MHz channel bandwidth, through multiple (e.g., four) duplications of an LTF sequence for 40 MHz channel bandwidth, or through duplications (e.g., two) of an LTF sequence for 80 MHz channel bandwidth. The DC tone sequences for each of the 20 MHz and 40 MHz channel bandwidth are removed and not copied into an LTF sequence for 80+80 MHz channel bandwidth.

For the 20 MHz, 40 MHz, 80 MHz, 160 MHz, and 80+80 MHz HE PPDU transmission, in one aspect, LTF sequences are generated based on 26-length, 52-length, 106-length, and/or 108-length LTF sequences and reserved tone locations/values.

FIGS. 20 through 31 illustrate examples of PAPR values obtained for various LTF sequences utilized for a 20 MHz channel bandwidth. A horizontal dimension represents tone indices from −122 to +122. Data/pilot tones are represented as rectangles that span a set of tones. Gaps located in the center of each graph represent DC tones. Other gaps represent reserved tones. Each PAPR value represents a PAPR value of its respective resource unit (or its respective resource allocation block). A PAPR value is represented in decibel (dB). A base LTF sequence is depicted within a dotted boundary in its respective figure of FIGS. 20 through 31. The other sequences in a given figure may utilize the same base sequence, except that the differences may be where/whether reserved tones and gap fillers are used (see, e.g., FIGS. 17A through 18D). In one or more aspects, a reserved tone may be +1, −1 or j.

In one or more implementations, a 26-length LTF sequence may be constructed. For example, the 26-length LTF sequence may be utilized or otherwise associated with a 26-tone resource unit.

In one or more implementations, the 26-length LTF sequence may be provided as follows:

$$\text{LTF}ah_{-16:15} = \{0, 0, 0, 1, -1, 1, -1, -1, 1, -1, 1, 1,\\ -1, 1, 1, 1, 0, -1, -1, -1, 1, -1, -1, -1, 1, -1,\\ 1, 1, 1, -1, 0, 0\} \quad \text{Equation (27)}$$

from which the following portion of the $\text{LTFah}_{31\ 16:15}$ may be obtained:

$$\text{LTF}ah_{-13:13} = \{1, -1, 1, -1, -1, 1, -1, 1, 1, -1, 1, 1,\\ 1, 0, -1, -1, -1, 1, -1, -1, -1, 1, -1, 1, 1, 1,\\ -1\} \quad \text{Equation (28)}$$

The $\text{LTFah}_{left} = \text{LTFah}_{-13:13}$ (1:13) sequence, referring to the first 13 elements of the $\text{LTFah}_{-13:13}$ sequence, and the $\text{LTFah}_{right} = \text{LTFah}_{-13:13}$ (15:27) sequence, referring to the last 13 elements of the $\text{LTFah}_{-13:13}$ sequence, may be provided.

As a first example, a 26-length LTF sequence may be provided by $\text{HELTF}_{26} = \{\text{LTFah}_{left}, \text{LTFah}_{right}\}$. With reference to the resource allocation illustrated in the second row 910 of FIG. 9, the 26-length LTF sequence may be followed by or preceded by a reserved tone. In such a case, a portion of the resource allocation in the second row 910 of FIG. 9 may include $\{\text{HELTF}_{26}, 1, \text{HELTF}_{26}, 1, \ldots\}$, where the "1" represents a reserved tone. With reference to the resource allocation illustrated in the second row 1010 of FIG. 10, the 26-length LTF sequence may be followed by or preceded by two reserved tones. In such a case, a portion of the resource allocation illustrated in the second row 1010 of FIG. 10 may include $\{\text{HELTF}_{26}, \text{HELTF}_{26}, 1, 1, \text{HELTF}_{26}, \text{HELTF}_{26}, 1, 1, \ldots\}$.

Figure 20:
FIGS. 20 through 31 illustrate examples of peak-to-average power ratio (PAPR) for various resource allocations.
Figure 21:

FIG. 20 illustrates an example of the PAPR for each resource allocation, utilizing the $\{\text{HELTF}_{26}, 1, \text{HELTF}_{26}, 1, \ldots\}$ sequence. No phase rotation has been applied. FIG. 21 illustrates an example of the PAPR for each resource allocation, utilizing the $\{\text{HELTF}_{26}, \text{HELTF}_{26}, 1, 1, \text{HELTF}_{26}, \text{HELTF}_{26}, 1, 1, \ldots\}$ sequence. No phase rotation has been applied.

Figure 22:

As a second example, a 27-length LTF sequence may be provided by $\text{HELTF}_{27} = \{\text{LTFah}_{left}, 1, \text{LTFah}_{right}\}$, with the rightmost element of $\text{HELTF}_{27}$ removed to obtain $\text{HELTF}_{26}$. Other manners by which to obtain $\text{HELTF}_{26}$ may be utilized, such as removing a leftmost element of $\text{HELTF}_{27}$. FIG. 22 illustrates an example of the PAPR for each resource allocation, utilizing the $\text{HELTF}_{26}$ obtained through removing a rightmost element of $\text{HELTF}_{27} = \{\text{LTFah}_{left}, 1, \text{LTFah}_{right}\}$. No phase rotation has been applied.

As a third example, a 26-length LTF sequence may be provided by $\text{HELTF}_{26} = \text{LTF}_{left}$ or $\text{HELTF}_{26} = \text{LTF}_{right}$, and $\text{HELTF}_{26center} = \{\text{LTFah}_{left}, 0,0,0, \text{LTFah}_{right}\}$ for the center resource unit. With reference to the resource allocation illustrated in the second row 910 of FIG. 9, the 26-length LTF sequence may be followed by or preceded by a reserved tone. In such a case, a portion of the resource allocation in the second row 910 of FIG. 9 may include $\{\text{HELTF}_{26}, 1, \text{HELTF}_{26}, 1, \ldots\}$, where the "1" represents a reserved tone. With reference to the resource allocation illustrated in the second row 1010 of FIG. 10, the 26-length LTF sequence may be followed by or preceded by two reserved tone. In such a case, a portion of the resource allocation illustrated in the second row 1010 of FIG. 10 may include $\{\text{HELTF}_{26}, \text{HELTF}_{26}, 1, 1, \text{HELTF}_{26}, \text{HELTF}_{26}, 1, 1, \ldots\}$.

Figure 23:
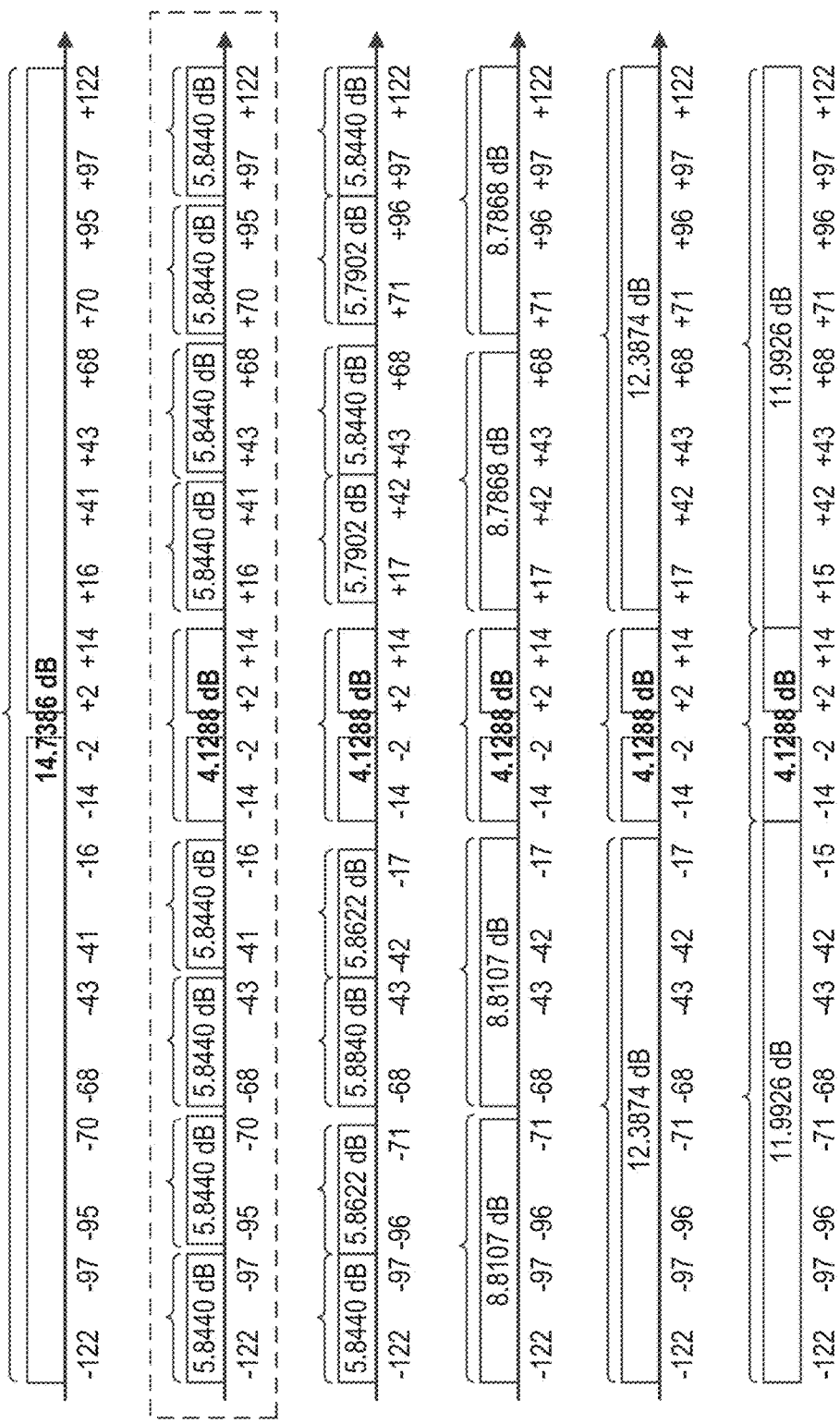
Figure 24:
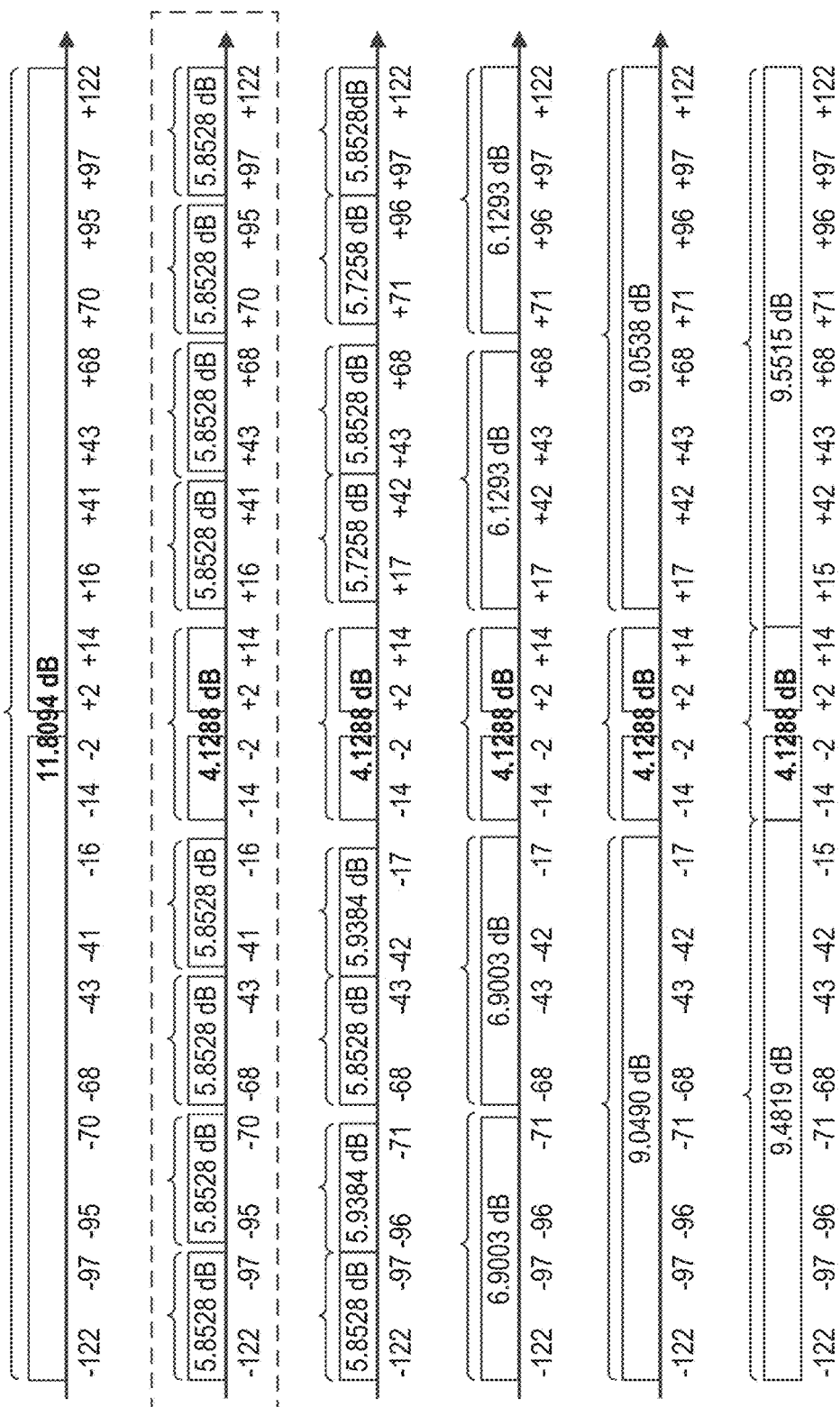

FIG. 23 illustrates an example of the PAPR for each resource allocation, utilizing the $\{\text{LTF}_{left}, 1, \text{LTF}_{left}, 1, \ldots\}$ sequence and $\text{HELTF}_{26center} = \{\text{LTFah}_{left}, 0,0,0, \text{LTFah}_{right}\}$ for the center resource unit. No phase rotation has been applied. FIG. 24 illustrates an example of the PAPR for each resource allocation, utilizing the $\{\text{LTF}_{right}, 1, \text{LTF}_{right}, 1, \ldots\}$ sequence and $\text{HELTF}_{26center} = \{\text{LTFah}_{left}, 0,0,0, \text{LTFah}_{right}\}$ for the center resource unit. No phase rotation has been applied.

Figure 25:
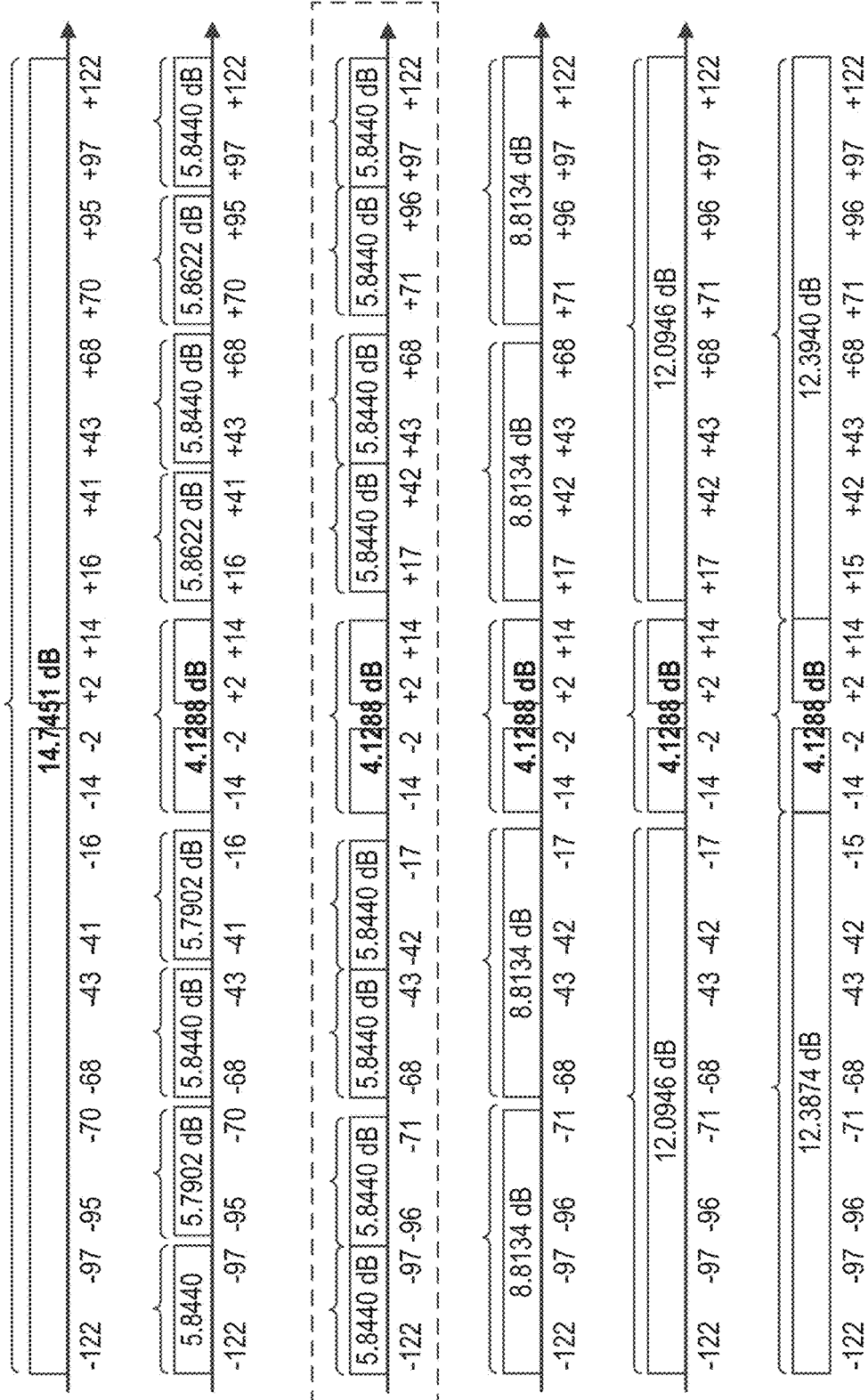
Figure 26:
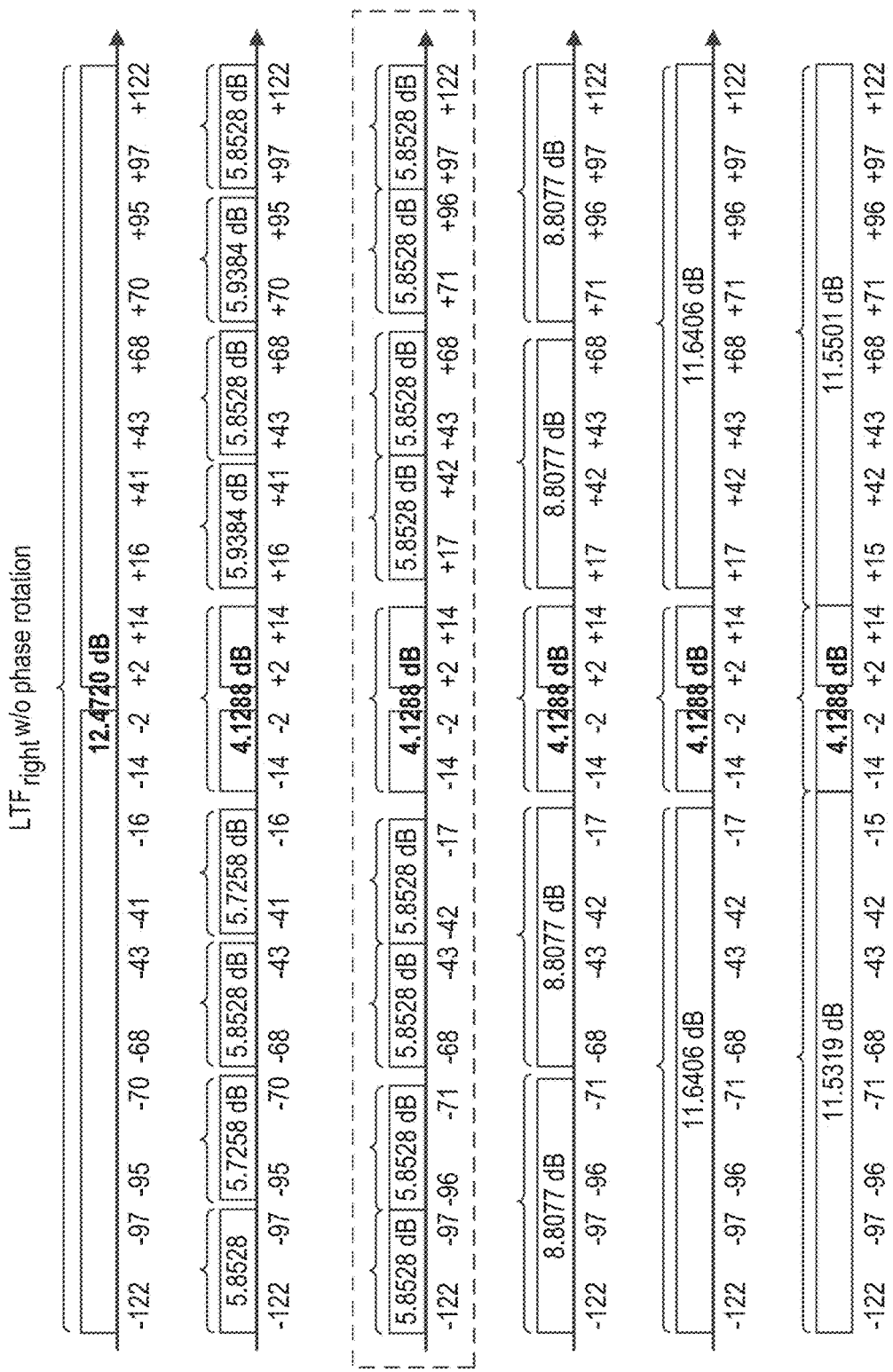

FIG. 25 illustrates an example of the PAPR for each resource allocation, utilizing the $\{\text{LTF}_{left}, \text{LTF}_{left}, 1, 1, \text{LTF}_{left}, \text{LTF}_{left}, 1, 1, \ldots\}$ sequence and $\text{HELTF}_{26center} = \{\text{LTFah}_{left}, 0,0,0, \text{LTFah}_{right}\}$ for the center resource unit. No phase rotation has been applied. FIG. 26 illustrates an example of the PAPR for each resource allocation, utilizing the $\{\text{LTF}_{right}, \text{LTF}_{right}, 1, 1, \text{LTF}_{right}, \text{LTF}_{right}, 1, 1, \ldots\}$ sequence and $\text{HELTF}_{26center} = \{\text{LTFah}_{left}, 0,0,0, \text{LTFah}_{right}\}$ for the center resource unit. No phase rotation has been applied.

As a fourth example, a 26-length LTF sequence may be provided by $\text{HELTF}_{26} = \text{LTF}_{left}$ for odd resource units, $\text{HELTF}_{26} = \text{LTF}_{right}$ for even resource units, and $\text{HELTF}_{26center} = \{\text{LTFah}_{left}, 0,0,0, \text{LTFah}_{right}\}$ for the center resource unit. The resource units may be numbered using consecutive integers, with the leftmost (e.g., lowest usable tone index) resource unit numbered as resource unit #1. With reference to the resource allocation illustrated in the second row 910 of FIG. 9, the 26-length LTF sequence may be followed by or preceded by a reserved tone. In such a case, a portion of the resource allocation in the second row 910 of FIG. 9 may include $\{\text{LTF}_{left}, 1, \text{LTF}_{right}, 1, \ldots\}$, where the "1" represents a reserved tone. With reference to the resource allocation illustrated in the second row 1010 of FIG. 10, the 26-length LTF sequence may be followed by or preceded by two reserved tone. In such a case, a portion of the resource allocation illustrated in the second row 1010 of FIG. 10 may include {$LTF_{left}$, $LTF_{right}$, 1, 1, $LTF_{left}$, $LTF_{right}$, 1, 1, . . . }.

In each of the $HELTF_{26}$ sequences provided above, a "−1" may be used in place of "1" for each of the reserve tone positions.

In one or more implementations, different LTF sequences may be applied for different resource unit location (e.g., tone indices). As a previously provided example, a 26-length LTF sequence may be provided by $HELTF_{26}=LTF_{left}$ for odd resource units, $HELTF_{26}=LTF_{right}$ for even resource units, and $HELTF_{26center}=\{LTFah_{left}, 0,0,0, LTFah_{right}\}$ for the center resource unit.

A different LTF sequence may be applied for the center resource unit, which may have a different tone mapping due to the DC tones. As an example, for 26-tone resource units that are not located in the center (e.g., these 26 tone resource units are not the center resource unit), an $LTF_{26}$ sequence (e.g., $HELTF_{26}$) may be mapped. For the center resource unit, an $LTF_{center}$ sequence that has 26 data/pilot tones and 3 zeros at the DC tones may be utilized. For example, $LTF_{center}=\{LTFah_{-13:13}(1:13), 0, 0, 0, LTFah_{-13:13}(15:27)\}$ may be mapped in the center resource unit.

In one or more implementations, a 52-length LTF sequence may be obtained by extending a length 26 sequence (e.g., by concatenating two identical 26-length sequences). Alternatively, a 52-length LTF sequence may be constructed using existing 20 MHz IEEE 802.11ac LTF sequences. An example $HELTF_{52}$ sequence can be provided by $HELTF_{52}=\{LTF_{left}, LTF_{right}\}$.

For 52 tone resource units, an $LTF_{52}$ sequence may be mapped, but for the center resource unit, an $LTF_{center}$ sequence may be used. An example resource allocation may be provided by {1, $HELTF_{52}$, 1, 1, $HELTF_{52}$, 1, $LTFah_{left}$, 1, 1, 0, 0, 0, 1, 1, $LTFah_{right}$, 1, $HELTF_{52}$, 1, 1, $HELTF_{52}$, 1}, where $LTF_{center}=\{LTFah_{left}, 0, 0, 0, 0, 0, LTFah_{right}\}$ and "1" is utilized at the reserved tones.

Figure 27:
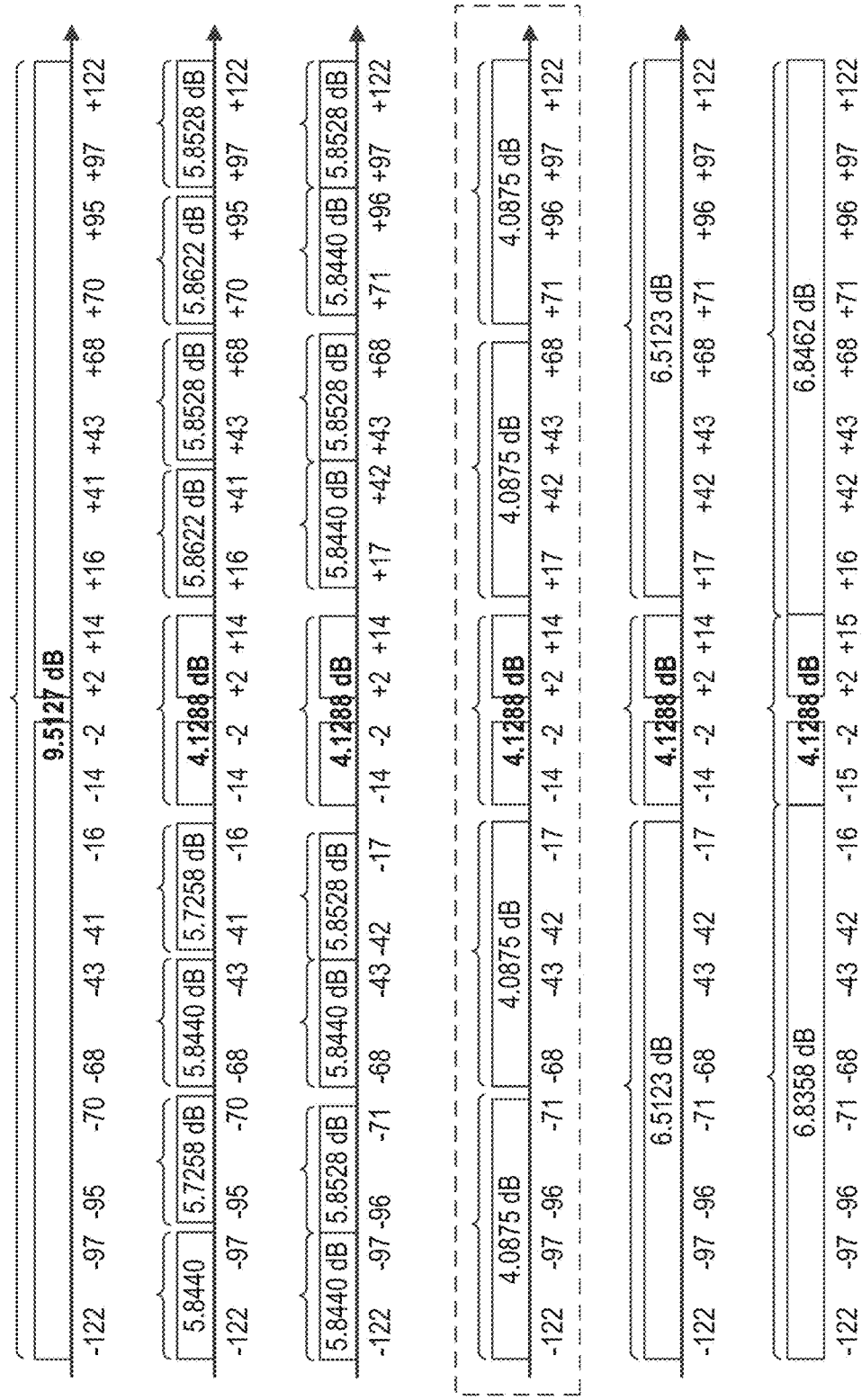

FIG. 27 illustrates an example of the PAPR for each resource allocation, utilizing the {$HELTF_{52}$, 1, 1, $HELTF_{52}$, 1, 1, $LTFah_{left}$, 0, 0, 0, $LTFah_{right}$, 1, 1, $HELTF_{52}$, 1, 1, $HELTF_{52}$} sequence. For a 26-tone resource unit (e.g., smaller than 52 tones), 26 tones of the {$HELTF_{52}$, 1, 1, $HELTF_{52}$, 1, 1, $LTFah_{left}$, 0, 0, 0, $LTFah_{right}$, 1, 1, $HELTF_{52}$, 1, 1, $HELTF_{52}$} sequence that correspond to the tone indices of the 26-tone resource unit to be filled may be utilized to for the 26-tone resource unit. For a 106-tone resource unit, 106 tones of the {$HELTF_{52}$, 1, 1, $HELTF_{52}$, 1, 1, $LTFah_{left}$, 0, 0, 0, $LTFah_{right}$, 1, 1, $HELTF_{52}$, 1, 1, $HELTF_{52}$} sequence that correspond to the tone indices of the 106-tone resource unit to be filled may be utilized to for the 26-tone resource unit. No phase rotation has been applied.

For 106 tone resource units, $LTF_{106}$ may be mapped, but for the center resource unit, an $LTF_{center}$ for the center resource unit is utilized.

Figure 28:
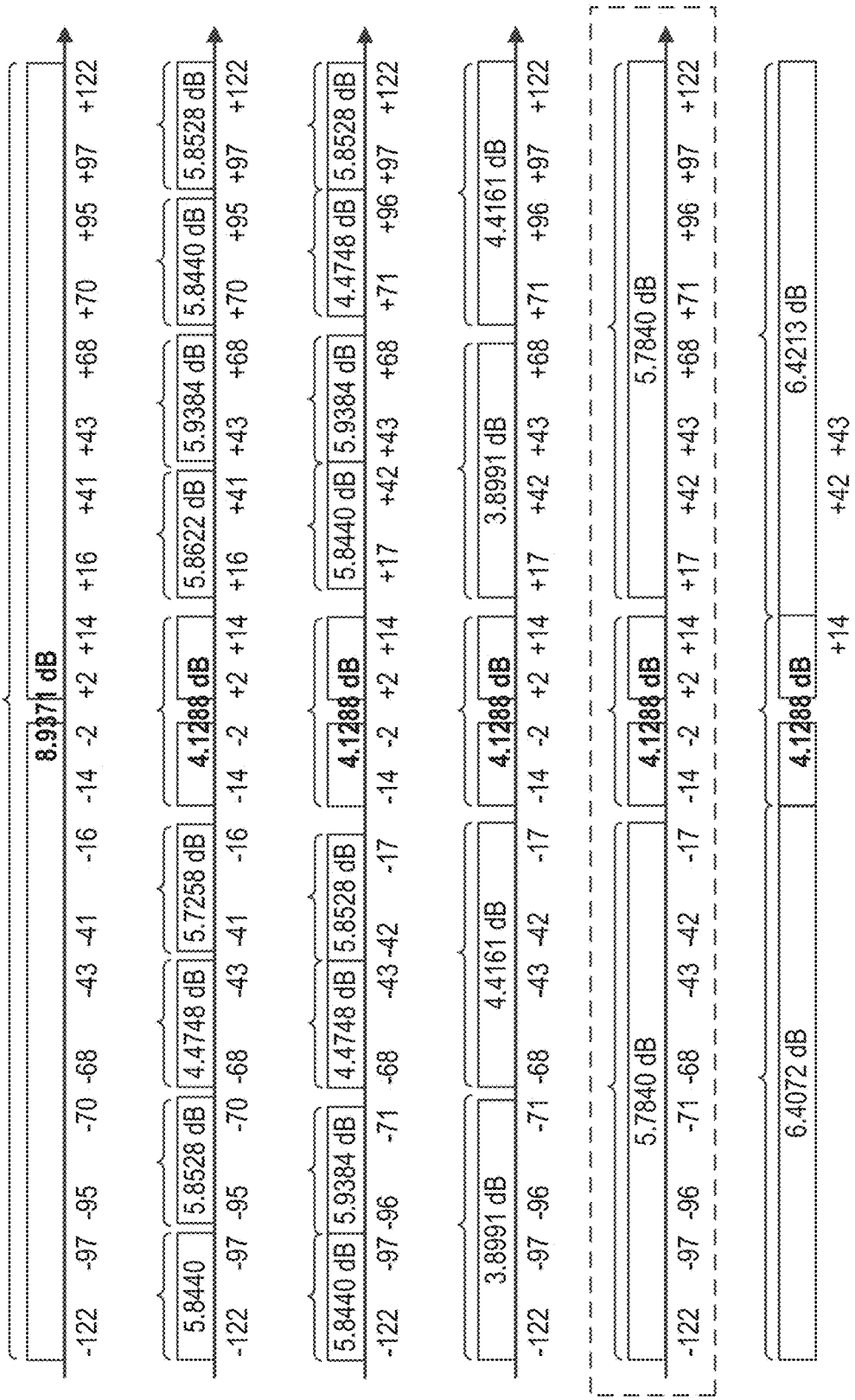

As a first example, a resource allocation may utilize $HELTF_{106}=\{LTF_{left}, 1, LTF_{right}, LTF_{left}, -1, LTF_{right}\}$ and a center resource allocation $LTF_{center}=\{LTFah_{left}, 0, 0, 0, LTFah_{right}\}$. FIG. 28 illustrates an example of the PAPR for each resource allocation, utilizing the $HELTF_{106}=\{LTF_{left}, 1, LTF_{right}, LTF_{left}, -1, LTF_{right}\}$ and $LTF_{center}=\{LTFah_{left}, 0, 0, 0, LTFah_{right}\}$ sequences. No phase rotation has been applied.

Figure 29:

As a second example, a resource allocation may utilize $HELTF_{106}=\{1, LTF_{left}, LTF_{right}, LTF_{left}, LTF_{right}, -1\}$ and a center resource allocation $LTF_{center}=\{LTFah_{left}, 0, 0, 0, LTFah_{right}\}$. FIG. 29 illustrates an example of the PAPR for each resource allocation, utilizing the $HELTF_{106}=\{1,$ $LTF_{left}, LTF_{right}, LTF_{left}, LTF_{right}, -1\}$ and $LTF_{center}=\{LTFah_{left}, 0, 0, 0, LTFah_{right}\}$ sequences. No phase rotation has been applied.

For 108-tone resource units, $LTF_{108}$ may be mapped, but for the center resource unit, an $LTF_{center}$ for the center resource unit is utilized.

Figure 30:
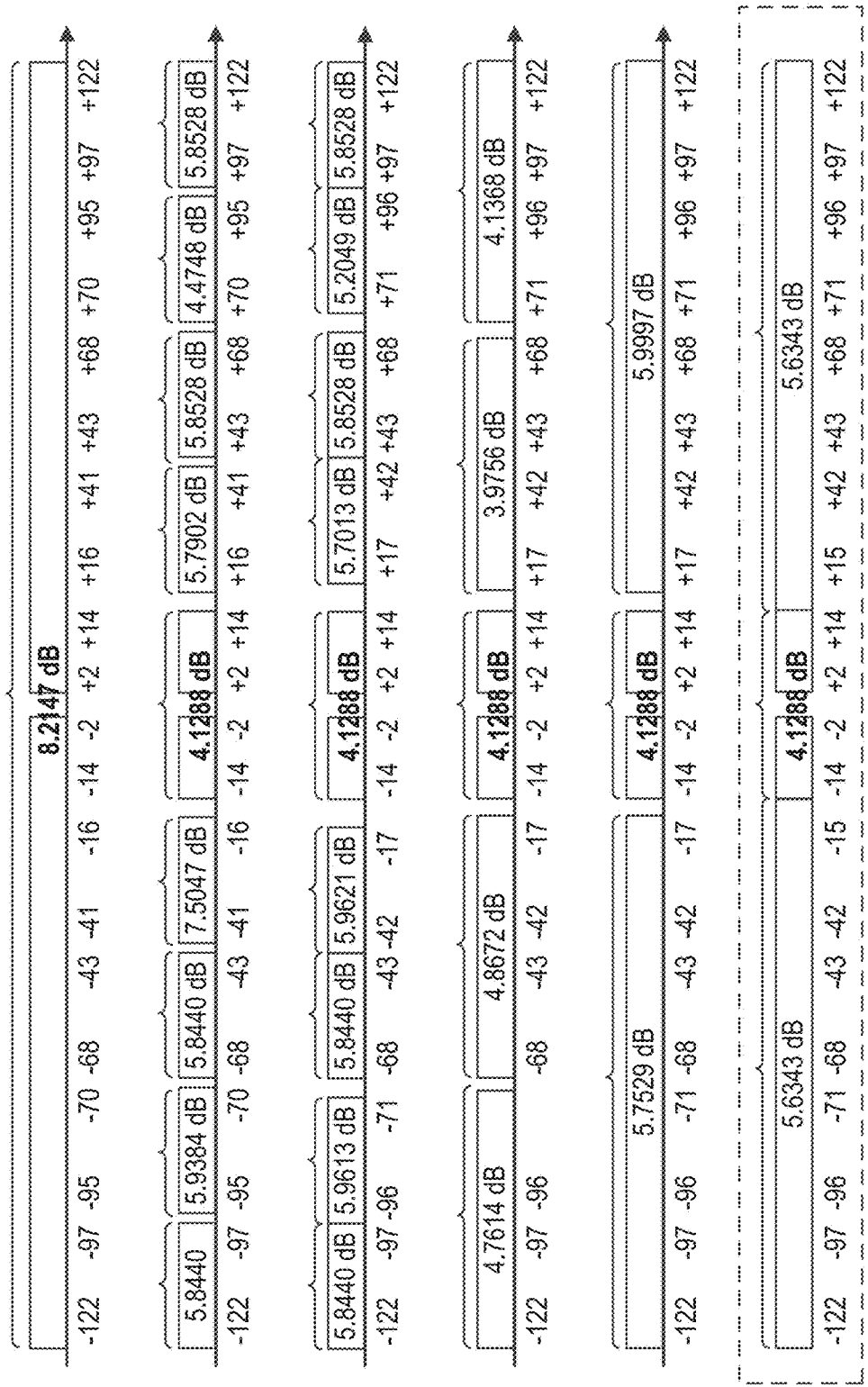

As a first example, a resource allocation may utilize $HELTF_{108}=\{LTF_{left}, 1, 1, LTF_{right}, LTF_{left}, -1, -1, LTF_{right}\}$ and a center resource allocation $LTF_{center}=\{LTFah_{left}, 0, 0, 0, LTFah_{right}\}$. FIG. 30 illustrates an example of the PAPR for each resource allocation, utilizing the $HELTF_{108}=\{LTF_{left}, 1, 1, LTF_{right}, LTF_{left}, -1, -1, LTF_{right}\}$ and $LTF_{center}=\{LTFah_{left}, 0, 0, 0, LTFah_{right}\}$ sequences. No phase rotation has been applied.

Figure 31:

As a second example, a resource allocation may utilize $HELTF_{108}=\{1, 1, LTF_{left}, LTF_{right}, LTF_{left}, LTF_{right}, -1, -1\}$ and a center resource allocation $LTF_{center}=\{LTFah_{left}, 0, 0, 0, LTFah_{right}\}$. FIG. 31 illustrates an example of the PAPR for each resource allocation, utilizing the $HELTF_{108}=\{1, 1, LTF_{left}, LTF_{right}, LTF_{left}, LTF_{right}, -1, -1\}$ and $LTF_{center}=\{LTFah_{left}, 0, 0, 0, LTFah_{right}\}$ sequences. No phase rotation has been applied.

In one or more implementations, a center tone optimization may be performed on a number of the center tones for an LTF sequence such that the PAPR of the LTF sequence is reduced for a center resource unit, e.g., the 26 tone center resource unit illustrated in the second row 910, third row 915, and fourth row 920 of FIG. 9.

For example, the center 11 tones for the $VHTLTF_{-122,122}$ sequence provided in Equation (7) are {1, −1, 1, −1, 0, 0, 0, 1, −1, −1, 1}. A $HELTF_{-122,122}$ sequence may be provided by:

$$HELTF_{-122,122}=\{LTF_{left}, 1, LTF_{right}, -1, -1, -1, 1,$$
$$1, -1, 1, -1, 1, 1, -1, LTF_{left}, 1,$$
$$LTF_{right}, x_0, x_1, x_2, x_3, 0, 0, 0, x_4, x_5, x_6, x_7,$$
$$LTF_{left}, 1, LTF_{right}, -1, -1, -1, 1, 1, -1, 1, -1,$$
$$1, -1, 1, 1, -1, LTF_{left}, 1, LTF_{right}\} \quad \text{Equation (29)}$$

where the $HELTF_{-122,122}$ sequence is the same as the $VHTLTF_{-122,122}$ sequence except that $x_0, x_1, x_2, x_3, x_4, x_5, x_6$, and $x_7$ are to be determined. Each of $x_0, x_1, x_2, x_3, x_4, x_5, x_6$, and $x_7$ may be +1 or −1, and may be selected such that the resulting $HELTF_{-122,122}$ sequence has a reduced PAPR.

Figure 32:
FIGS. 32 through 34 illustrate examples of center tone optimization.
Figure 33:
Figure 34:

FIGS. 32 through 34 illustrate examples of center tone optimization. These figures illustrate examples of PAPR values obtained for various LTF sequences, with different center tone optimization, utilized for a 20 MHz channel bandwidth. A horizontal dimension represents tone indices from −122 to +122. Data/pilot tones are represented as rectangles that span a set of tones. Gaps located in the center of each graph represent DC tones. Other gaps represent reserved tones. Each PAPR value represents a PAPR value of its respective resource unit (or its respective resource allocation block). A PAPR value is represented in dB.

FIG. 32 illustrates an example of the PAPR associated with the $VHTLTF_{-122,122}$ sequence of Equation (7) without any phase rotation applied. FIG. 33 illustrates an example of the PAPR associated with the $VHTLTF_{-122,122}$ sequence of Equation (7) with the [1, −1, −1, −1] phase rotation of Equations (13) and (14) applied. The vertical line in FIG. 33 is at tone index k=−64.

FIG. 34 illustrates an example of the PAPR associated with the $HELTF_{-122,122}$ sequence of Equation (29) with the [1, −1, −1, −1] phase rotation of Equations (13) and (14) applied. The values of $x_0, x_1, x_2, x_3, x_4, x_5, x_6$, and $x_7$ are −1, −1, 1, 1, 1, 1, −1, −1, respectively. The vertical line in FIG. 34 is at tone index k=−64. The PAPR values for the center resource unit in FIG. 34 are lower compared to the PAPR values for the center resource units in FIG. 32 and FIG. 33. For example, the PAPR values shown in FIG. 34 for the center resource unit are around 4.4 dB, whereas the PAPR values shown in FIGS. 32 and 33 are around 7.6 dB.

Although eight values (e.g., $x_0$, $x_1$, $x_2$, $x_3$, $x_4$, $x_5$, $x_6$, $x_7$) around the DC tones are selected for optimization in the example above, additional, fewer, or different elements in the $VHTLTF_{-122,122}$ sequence may be selected for optimization. Other values of $x_0$, $x_1$, $x_2$, $x_3$, $x_4$, $x_5$, $x_6$, and/or $x_7$ may be utilized.

Since each OFDM symbol duration that utilizes 78.125 kHz tone spacing is 12.8 µs long, regular LTF symbols may have a large overhead when transmitting short frames. In one or more implementations, an LTF symbol duration shorter than 12.8 µs may be utilized. In some aspects, the shorter LTF symbol duration may be implemented by utilizing a smaller base Fast Fourier Transform (FFT) size. For example, the FFT size may be 128 FFT in 20 MHz, compared to 256 FFT in 20 MHz for 78.125 kHz tone spacing. In some aspects, the shorter LTF symbol duration may be implemented by mapping an LTF sequence in a subset of the tones.

In one or more implementations, 2xLTF transmission may be utilized to generate two identical 6.4 µs time domain signal replicas (e.g., half of 12.8 µs). In 2xLTF transmission, the shorter LTF symbol duration may utilize 78.125 KHz subcarrier spacing and mapping for every other tone (e.g., even tones or odd tones). The LTF sequence mapping may be on even tones or odd tones. The 2xLTF sequence may be generated by subsampling a regular LTF sequence. A regular LTF sequence may be referred to as a 4xLTF sequence. In an aspect, 2xLTF may be referred to as 2x HE LTF. In an aspect, 4xLTF may be referred to as 4x HE LTF.

In one or more aspects, a 2xLTF sequence may be a subsampled sequence. A subsampled sequence may include successive elements, where each of the successive elements is associated with a data tone, a pilot tone, or a reserved tone. In one aspect, an element of a sub sampled sequence is not associated with a DC tone.

In one or more implementations, a certain number of DC tones may be utilized to reduce issues with channel estimation from local oscillator (LO) leakage. For example, a carrier frequency offset (CFO) of 40 parts-per-million (ppm) in 5 GHz may involve at least 7 central DC tones while a CFO of 40 ppm in 2.4 GHz may involve at least 3 central DC tones. In some aspects, without a sufficient number of DC tones, a receiver may be configured not to use send data/pilot using the tones near the DC, which may have been effected by LO leakage interference.

In one or more implementations, for a 26-tone center resource unit, the subsampling may leave 12, 13, or 14 tones (e.g., due to presence of DC tones). A 26-length LTF sequence may be utilized as a starting point for constructing a sequence of 12, 13, or 14 tones. Examples of 26-length LTF sequences that may be utilized (e.g., for 26-tone resource units) include $LTF_{left}$, $LTF_{right}$, or $LTF_{ah}$.

Figure 35A:
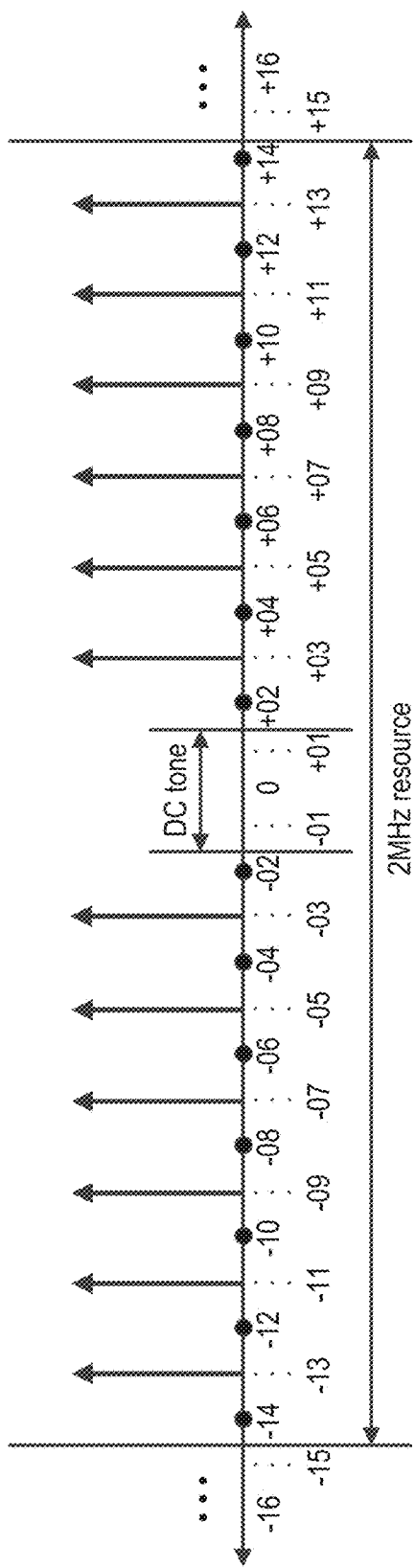
FIGS. 35A and 35B illustrate examples of an odd sub-sampling of a 26-length sequence.
Figure 35B:
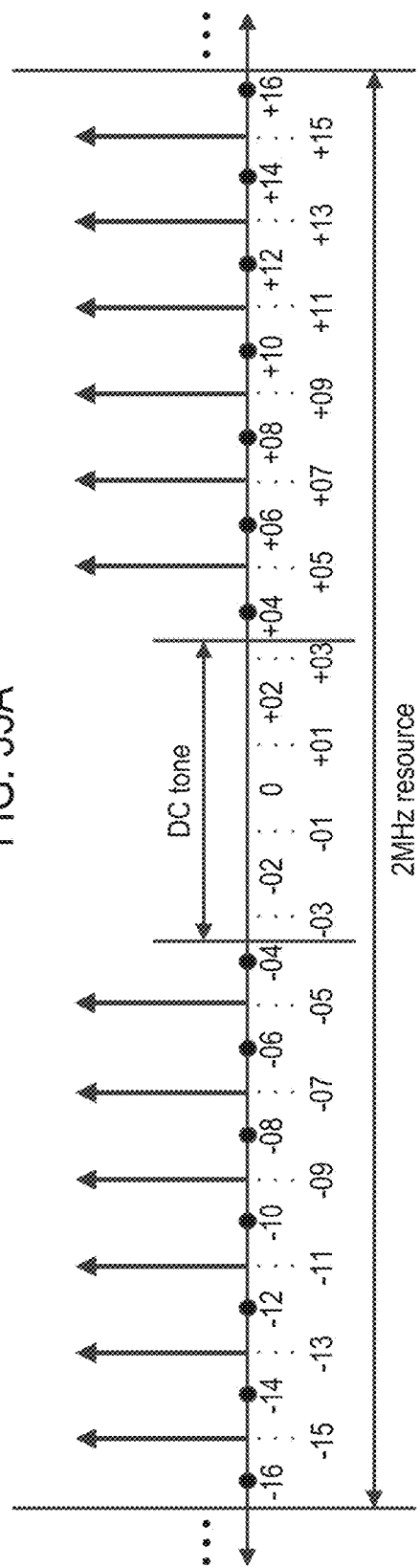

FIGS. 35A and 35B illustrate examples of an odd subsampling of a 26-length sequence. FIG. 35A illustrates an odd subsampling which may be utilized for a 20 MHz channel bandwidth. FIG. 35B illustrates an odd subsampling which may be utilized for an 80 MHz OFDMA channel bandwidth. The odd subsampling results in a 2xLTF sequence with 12 non-DC tones. These non-DC tones may be data/pilot tones. In one or more implementations, the 12-tone LTF sequence may be generated by subsampling the odd tones for a 26-length LTF sequence to generate a 13-tone LTF sequence, and then truncating one element from the 13-tone LTF sequence to generate the 12-tone LTF sequence. In some aspects, the truncated element may be a first element or a last element of the 13-tone LTF sequence.

FIGS. 36A and 36B illustrate examples of an even subsampling of a 26-length sequence. FIG. 36A illustrates an even subsampling which may be utilized for a 20 MHz channel bandwidth. FIG. 36B illustrates an even subsampling which may be utilized for an 80 MHz OFDMA channel bandwidth. The odd subsampling results in a 2xLTF sequence with 14 non-DC tones. These non-DC tones may be data/pilot tones. In one or more implementations, the 14-tone LTF sequence may be generated by subsampling the even tones for a 26-length LTF sequence to generate a 13-tone LTF sequence, and then adding one element of +1 or −1 to the 13-tone LTF sequence to generate the 14-tone LTF sequence. In some aspects, the added element may be added before a first element or after a last element of the 13-tone LTF sequence.

Figure 37:
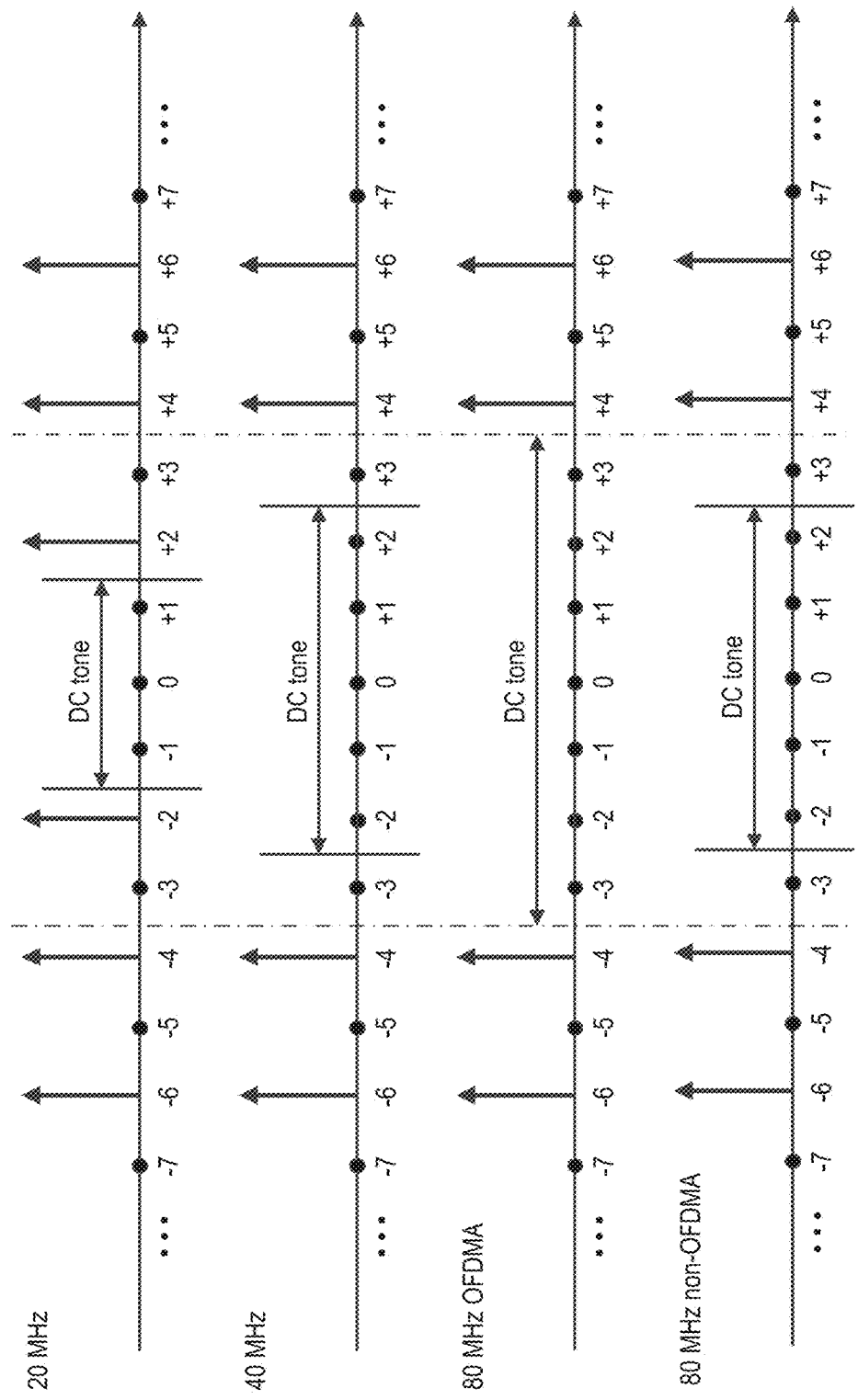
FIGS. 37 through 40 illustrate examples of LTF tone subsampling for different channel bandwidths.

FIGS. 37 through 40 illustrate examples of LTF tone subsampling for different channel bandwidths. In FIG. 37, the LTF tone subsampling is performed such that only even tones at tone indices outside of the DC tones associated with the different channel bandwidths (e.g., 20 MHz, 40 MHz, 80 MHz OFDMA, 80 MHz non-OFDMA) are mapped. For 40 MHz transmission, the 2xLTF signal may avoid being affected by LO leakage, which generally affects the tones between k=−3 and k=+3. The total number of LTF tones for the center 26 resource allocation in 20 MHz and 80 MHz is identically 14 modulated symbols for 2xLTF. Furthermore, the number of non-OFDMA and OFDMA transmission have in total the same number of LTF modulated symbols.

Figure 38:
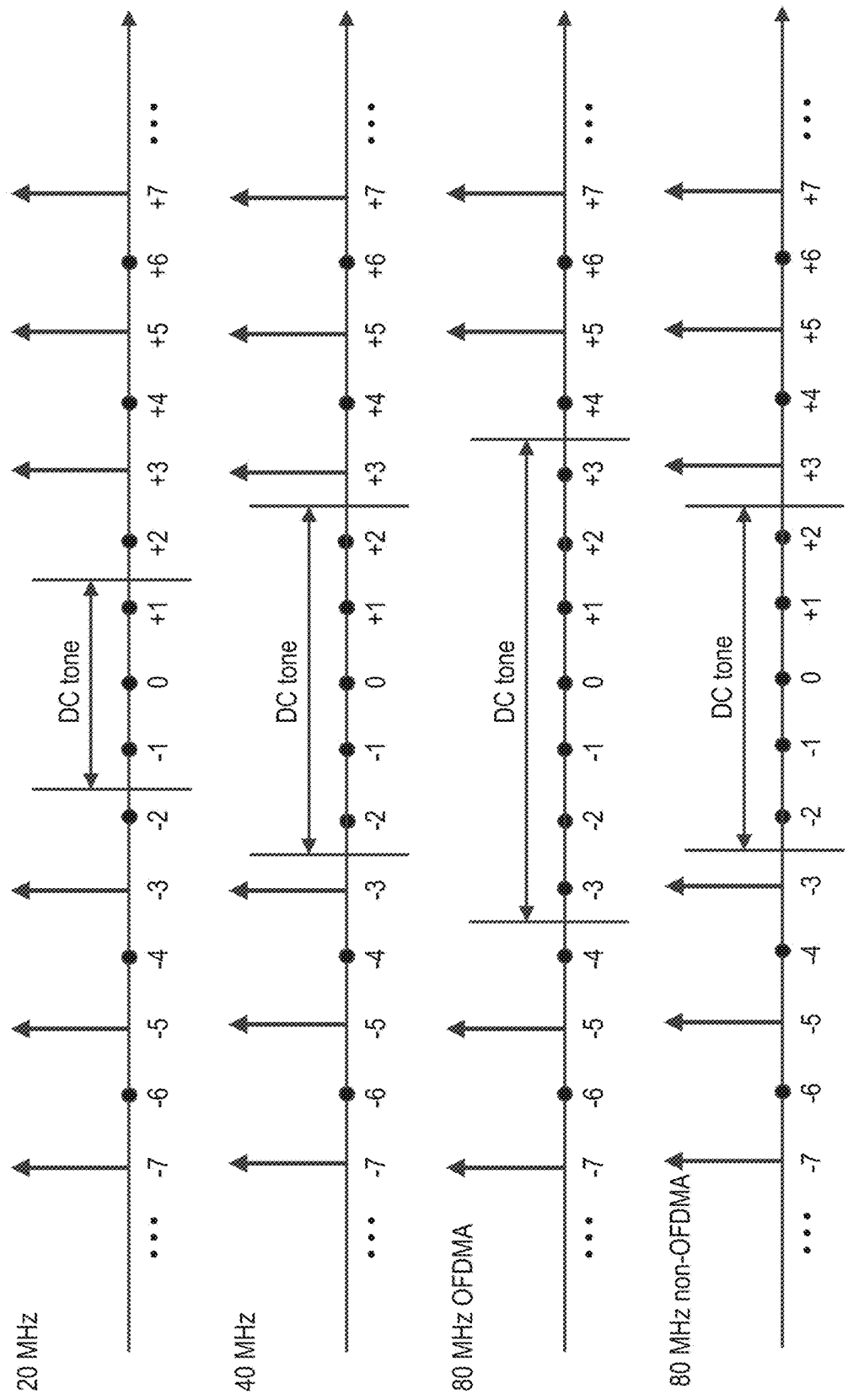

In FIG. 38, the LTF tone subsampling is performed such that only odd tones at tone indices outside of the DC tones associated with the different channel bandwidths are mapped (or utilized) for 2xLTF. The subsampling of FIG. 38 may allow identical mapping of LTF sequences for 2xLTF across all channel bandwidths. The subsampling may also allow more LTF modulated symbols for the 80 MHz non-OFDMA, which may improve channel estimation performance for 80 MHz non-OFDMA transmission.

Figure 39:
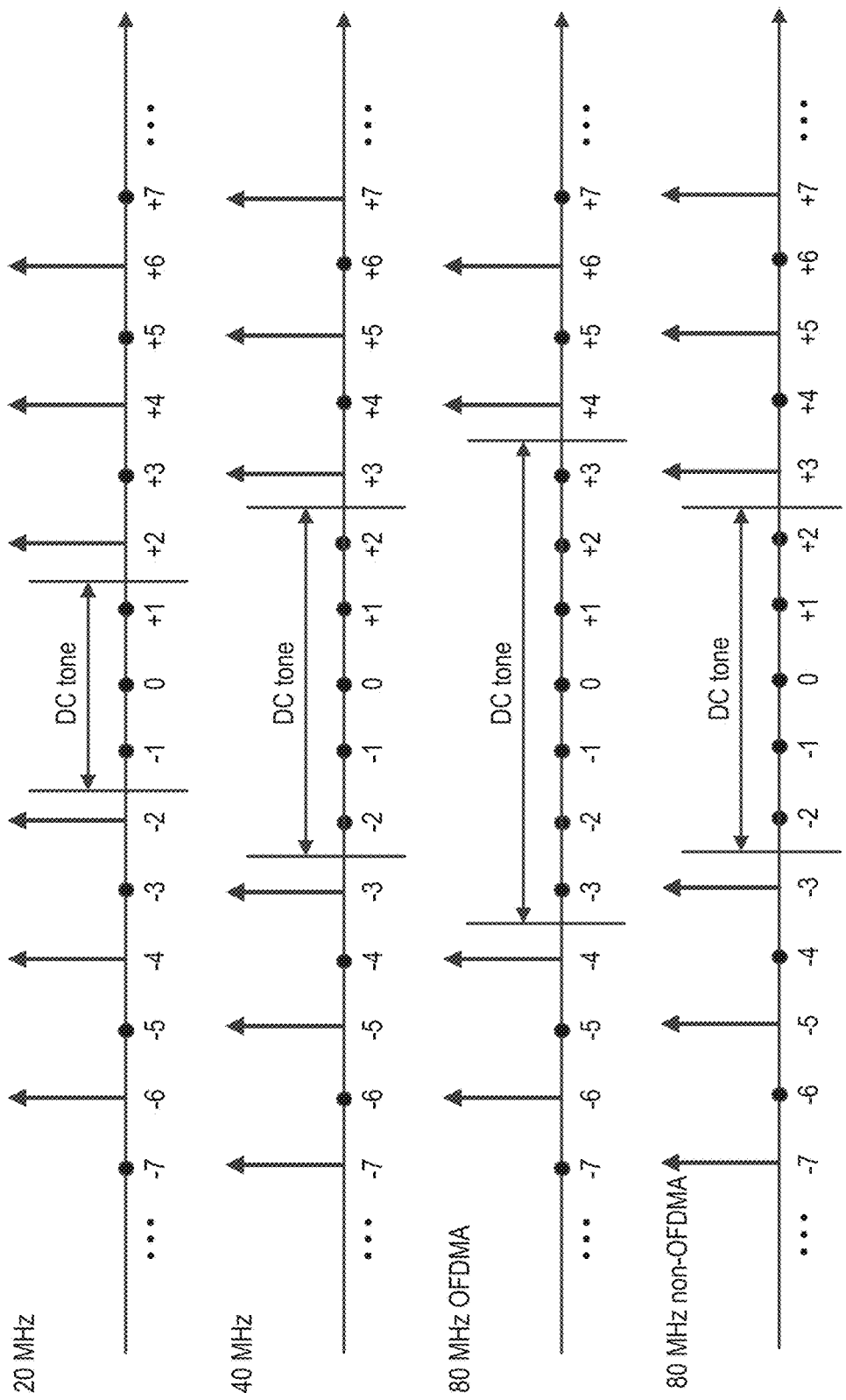

In FIG. 39, the LTF tone subsampling is performed such that LTF modulated symbols are adjacent to DC tones for each channel bandwidth. In other words, a 2xLTF sequence is generated in a manner so that the tones immediately adjacent to DC tones are included in the 2xLTF sequence. This subsampling may allow better channel estimation at the center of the channel bandwidth, assuming that LO leakage is generally confined to the DC tones.

Figure 40:
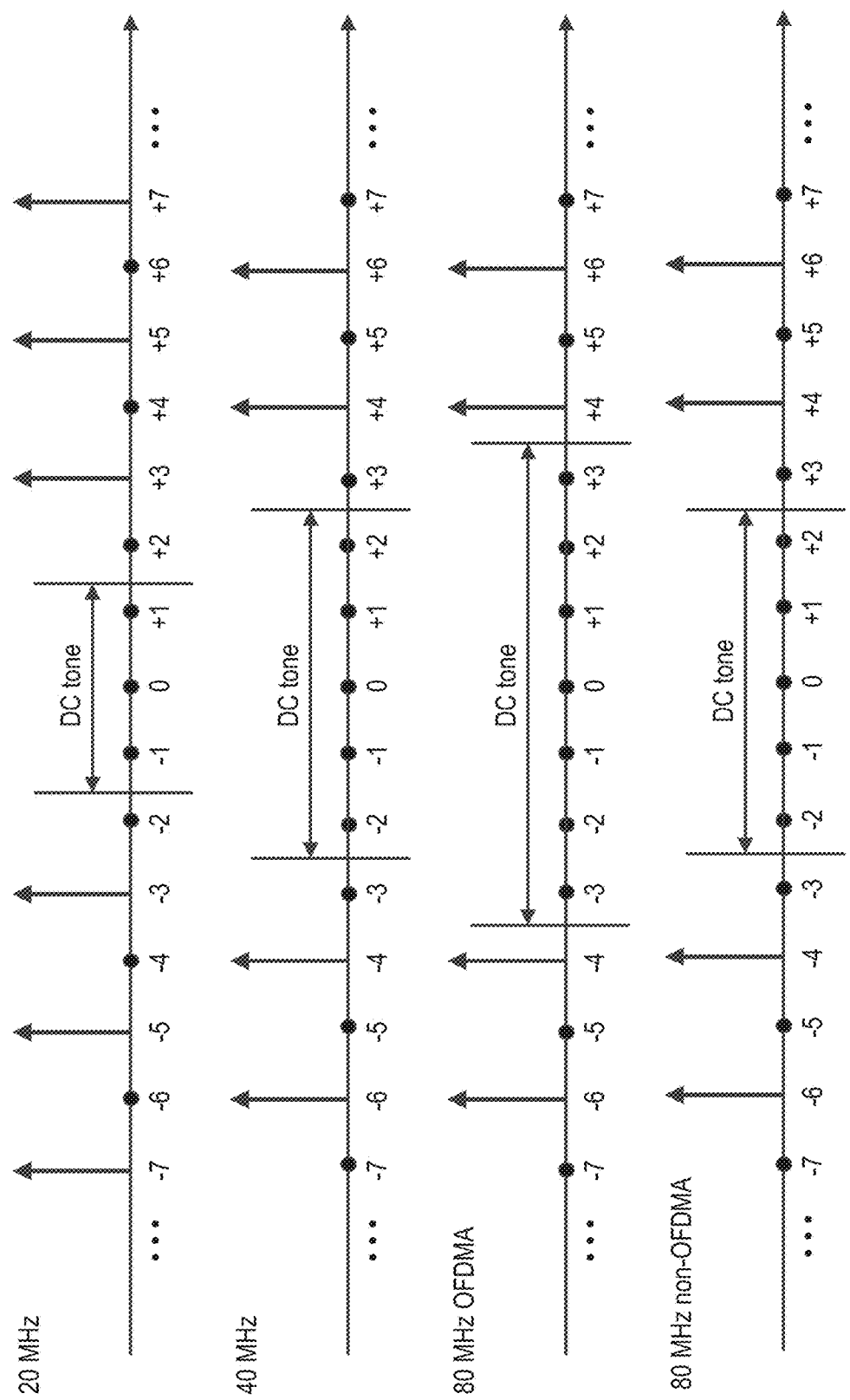

In FIG. 40, the LTF tone subsampling is performed such that an LTF modulated symbol is non-adjacent in tone index to the DC tones, except for the 80 MHz OFDMA case. Except for the 80 MHz OFDMA case, a null tone exists between the LTF modulated symbols closest to the DC tones and the DC tones. This may help reduce or avoid an effect of LO leakage interference on the LTF modulated symbols. For the 80 MHz OFDMA case, the LTF modulated symbols may be mapped right next to the DC tones due to the higher number of DC tones (e.g., 7) associated with the 80 MHz OFDMA case.

Figure 41:
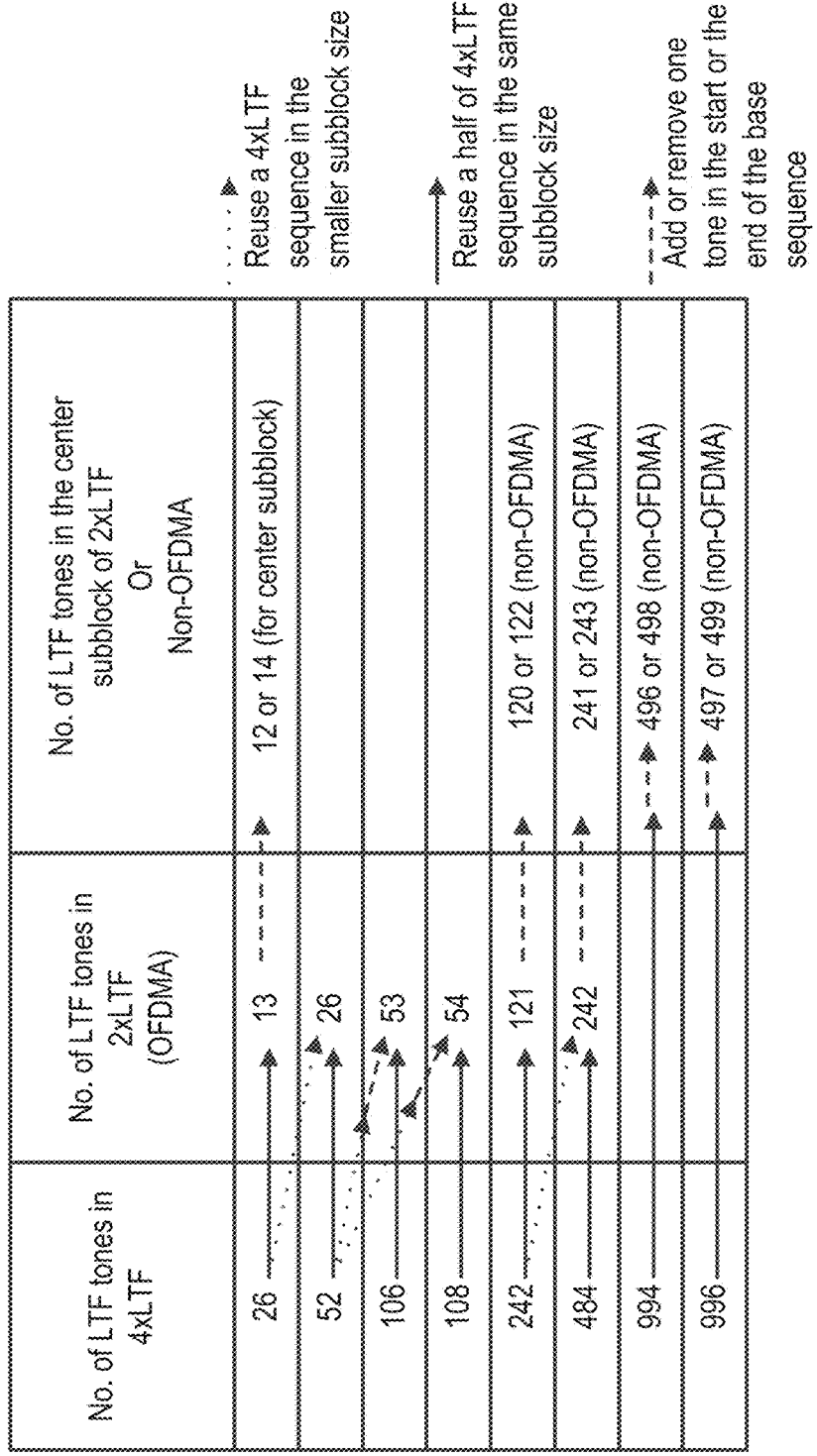
FIG. 41 illustrates an example of a chart for 2×LTF tones associated with sub sampling.

FIG. 41 illustrates a chart for 2xLTF tones. In one or more aspects, subsampling can be provided by reusing a 4xLTF sequence, reusing half of a 4xLTF, and/or adding or removing one or tones. In some aspects, a 2xLTF may be provided by reusing (retrieving) half of the elements of a 4xLTF sequence. For example, in FIG. 41, half of "26" tones of a 4xLTF are reused as "13" tones of a 2xLTF; in other words, in one aspect, a 2xLTF having 13 elements (corresponding to 13 tones) are formed by subsampling or obtaining half of 26 elements of a 4xLTF sequence (corresponding to 26 tones).

In some aspects, a 2xLTF sequence may reuse (or retrieve) a 4xLTF sequence of the same size. For example, in FIG. 41, "26" tones of a 4xLTF are reused as "26" tones of a 2xLTF; in other words, a 2xLTF having 26 elements (corresponding to 26 tones) are formed by obtaining or retrieving a 4xLTF sequence having 26 elements (corresponding to 26 tones).

In some aspects, one element (corresponding to one tone) may be added or removed to form a 2xLTF sequence. For example, one element may be added or removed in the beginning or the end of a 2xLTF sequence as it is being formed. In some aspects, such as for a center resource unit (also referred to as a center subblock) or non-OFDMA, a 2xLTF sequence may be formed by adding or subtracting one element (corresponding to one tone) after obtaining half of elements of a 4xLTF sequence (see, e.g., forming "496" or "498" from "994"). In some aspects, a 2xLTF may be formed by adding one or more elements to a 4xLTF sequence (see, e.g., forming "53" or "54" from "52").

Examples of LTF sequences for 2xLTF are provided below. The subscript 2x below represents a 2xLTF sequence. For example, $LTF_{13,2x}$ is a 2xLTF sequence having 13 elements (or having a length of 13). The subscript 4x below represents a 4xLTF sequence, which is a regular LTF sequence. For example, $LTF_{26,4x}$ is a regular LTF sequence having 26 elements (or having a length of 26). The notation (a:b) represents tone indices a to b, inclusive. For example, (1:13) represents tone indices 1 to 13, inclusive. $LTF_{26,4x}$ (1:13) represents the first 13 elements of a regular 26-length LTF sequence; in other words, $LTF_{26,4x}$ (1:13) represents a regular HE $LTF_{26}$ sequence that is on tone indices 1 to 13.

Examples of 2xLTF of length 13 are provided as follows:

$LTF_{13,2x}=LTF_{26,4x}(1:13)$ or $LTF_{26,4x}(14:26)$ where half of $LTF_{26,4x}$ can be used for $LTF_{13,2x}$; or $LTF_{13,2x}=LTF_{26,4x}$(odd indices) or $LTF_{26,4x}$(even indices), where every other value in $LTF_{26,4x}$ can be used for $LTF_{13,2x}$.

Examples of 2xLTF of length 14 are provided as follows:

$LTF_{14,2x}=\{LTF_{13,2x}, 1\}$ or $\{1, LTF_{13,2x}\}$ or $\{LTF_{13,2x}, -1\}$ or $\{-1, LTF_{13,2x}\}$ where a 1 or −1 is inserted at a start or an end of $LTF_{13,2x}$; or $LTF_{14,2x}=\{LTF_{13,2x}(1:6), [1$ or $-1], LTF_{13,2x}(7:13)\}$ or $\{LTF_{13,2x}(1:7), [1\ $ or $-1], LTF_{13,2x}(8:13)$ where a 1 or −1 is inserted in a middle of $LTF_{13,2x}$.

Examples of 2xLTF of length 12 are provided as follows:

$LTF_{12,2x}=LTF_{13,2x}(1:12)$ or $LTF_{13,2x}(2:13)$ where a last value or first value of $LTF_{13,2x}$ is removed; or $LTF_{12,2x}=\{LTF_{13,2x}(1:6), LTF_{13,2x}(8:13)\}$ where a middle value can be removed from $LTF_{13,2x}$.

Examples of 2xLTF of length 26 are provided as follows:

$LTF_{26,2x}=LTF_{26}$, where the LTF sequence for 4xLTF is reused;

$LTF_{26,2x}=LTF_{52,4x}(1:26)$ or $LTF_{52,4x}(27:52)$ where a half of $LTF_{52,4x}$ is used for $LTF_{26,2x}$; or $LTF_{26,2x}=LTF_{52,4x}$(odd indices) or $LTF_{52,4x}$(even indices)

where every other value in $LTF_{52,4x}$ is used for $LTF_{26,2x}$.

Examples of 2xLTF of length 53 are provided as follows:

$LTF_{53,2x}=\{LTF_{52,4x}, 1\}$ or $\{1, LTF_{52,4x}\}$ or $\{LTF_{52,4x}, -1\}$ or $\{-1, LTF_{52,4x}\}$ where a 1 or −1 is inserted at a start or an end of $LTF_{52,2x}$;

$LTF_{53,2x}=LTF_{106,4x}(1:53)$ or $LTF_{106,4x}(54:106)$ where a half of $LTF_{106,4x}$ is used for $LTF_{53,2x}$; or $LTF_{53,2x}=LTF_{106,4x}$(odd indices) or $LTF_{106,4x}$(even indices)

where every other value in $LTF_{106,4x}$ is used for $LTF_{53,2x}$.

Examples of 2xLTF of length 54 are provided as follows:

$LTF_{54,2x}=LTF_{108,4x}(1:54)$ or $LTF_{108,4x}(55:108)$ where a half of $LTF_{108,4x}$ is used for $LTF_{54,2x}$;

$LTF_{54,2x}=LTF_{108,4x}$(odd indices) or $LTF_{108,4x}$(even indices)

where every other value in $LTF_{108,4x}$ is used for $LTF_{54,2x}$;

$LTF_{54,2x}=\{LTF_{52,4x}, [1$ or $-1], [1$ or $-1]\}$ or $\{[1$ or $-1], [1$ or $-1], LTF_{52,4x}\}$ or $\{[1$ or $-1], LTF_{52,4x}, [1$ or $-1]\}$ where additional 1 or −1 may be added to $LTF_{52,4x}$; or $LTF_{54,2x}=\{LTF_{53,2x}, [1$ or $-1]\}$ or $\{[1$ or $-1], LTF_{53,4x}\}$ where additional 1 or −1 may be added to $LTF_{53,4x}$.

An example of 2xLTF of length 121 is provided as follows:

$LTF_{121,2x}=LTF_{242,4x}$(odd indices) or $LTF_{242,4x}$(even indices)

where every other value in $LTF_{242,4x}$ can be used for $LTF_{121,2x}$.

Another example of 2xLTF of length 121 is to reuse a first or second half of $LTF_{242,4x}$. For example, if $LTF_{242,4x}=\{VHT_{-122,122, left}, VHT_{-122,122, right}\}$, then $LTF_{2x,121}=VHT_{-122,122, left}$ or $VHT_{122,122, right}$, where $VHT_{-122,122, left}=VHTLTF_{-122,122}(1;121)$ and $VHT_{-122,122,right}=VHTLTF_{-122,122}(122;245)$.

Examples of 2xLTF of length 120 are provided as follows:

$LTF_{120,2x}=LTF_{121,2x}(1:120)$ or $LTF_{121,2x}(2:121)$ where a first or last value of $LTF_{121,2x}$ is removed; or $LTF_{120,2x}=\{LTF_{121,2x}(1:60), LTF_{121,2x}(62:121)\}$ where a middle value of $LTF_{121,2x}$ is removed.

Examples of 2xLTF of length 122 are provided as follows:

$LTF_{122,2x}=\{LTF_{121,2x}, 1\}$ or $\{1, LTF_{121,2x}\}$ or $\{LTF_{121,2x}, -1\}$ or $\{-1, LTF_{121,2x}\}$ where a 1 or −1 is added at a start or an end of $LTF_{121,2x}$;

$LTF_{122,2x}=\{LTF_{121,2x}(1:60), [1$ or $-1], LTF_{121,2x}(61:121)\}$ or $\{LTF_{121,2x}(1:61), [1$ or $-1], LTF_{121,2x}(62:121)\}$ where a 1 or −1 is added in a middle of $LTF_{121,2x}$; or $LTF_{122,2x}=\{LTF_{120,2x}, [1$ or $-1], [1$ or $-1]\}$ or $\{[1$ or $-1], [1$ or $-1], LTF_{120,2x}\}$ or $\{[1$ or $-1], LTF_{120,2x}, [1$ or $-1]\}$ where additional 1 or −1 may be added to $LTF_{120,2x}$.

Examples of 2xLTF of length 242 are provided as follows:

$LTF_{242,2x}=LTF_{242,4x}$ where the LTF sequence for 4xLTF can be reused;

$LTF_{242,2x}=LTF_{484,4x}(1:242)$ or $LTF_{484,4x}(243:484)$ where a half of $LTF_{484,4x}$ is used for $LTF_{242,2x}$; or $LTF_{242,2x}=LTF_{484,4x}$(odd indices) or $LTF_{484,4x}$(even indices)

where every other value in $LTF_{484,4x}$ can be used for $LTF_{242,2x}$.

Examples of 2xLTF of length 241 are provided as follows:

$LTF_{241,2x}=LTF_{242,2x}(1:241)$ or $LTF_{242,2x}(2:242)$ where a first or last value of $LTF_{242,2x}$ is removed; or $LTF_{241,2x}=\{LTF_{242,2x}(1:120), LTF_{242,2x}(122:242)\}$ or $\{LTF_{242,2x}(1:121), LTF_{242,2x}(123:242)\}$ where a middle value of $LTF_{242,2x}$ is removed.

Examples of 2xLTF of length 243 are provided as follows:

$LTF_{243,2x}=\{LTF_{242,2x}, 1\}$ or $\{1, LTF_{242,2x}\}$ or $\{LTF_{242,2x}, -1\}$ or $\{-1, LTF_{242,2x}\}$ where a 1 or −1 is inserted at a start or an end of $LTF_{242,2x}$; or $LTF_{243,2x}=\{LTF_{242,2x}(1:121), [1 \text{ or } -1], LTF_{242,2x}(122:242)\}$ where a 1 or −1 is inserted in a middle of $LTF_{242,2x}$.

Examples of 2xLTF of length 497 are provided as follows:

$LTF_{497,2x}=LTF_{994,4x}(1:497)$ or $LTF_{994,4x}(498:994)$ where half of $LTF_{994,4x}$ is used for $LTF_{497,2x}$;

$LTF_{497,2x}=LTF_{994,4x}$(odd indices) or $LTF_{994,4x}$(even indices)

where every other value of $LTF_{994,4x}$ is used for $LTF_{497,2x}$;

$LTF_{497,2x}=LTF_{498,2x}(1:497)$ or $LTF_{498,2x}(2:498)$ where a first or last value of $LTF_{498,2x}$ is removed; or $LTF_{497,2x}=\{LTF_{498,2x}(1:248), LTF_{498,2x}(250:498)\}$ or $\{LTF_{498,2x}(1:249), LTF_{498,2x}(251:498)\}$ where a middle value of $LTF_{498,2x}$ is removed.

Examples of 2xLTF of length 496 are provided as follows:

$LTF_{496,2x}=LTF_{497,2x}(1:496)$ or $LTF_{497,2x}(2:497)$ where a first or last value of $LTF_{497,2x}$ is removed; or $LTF_{496,2x}=\{LTF_{497,2x}(1:248), LTF_{497,2x}(250:497)\}$ where a middle value of $LTF_{497,2x}$ is removed.

Examples of 2xLTF of length 498 are provided as follows:

$LTF_{498,2x}=\{LTF_{497,2x}, [1 \text{ or } -1]\}$ or $\{[1 \text{ or } -1], LTF_{497,2x}\}$ where a 1 or −1 is inserted at a start or an end of $LTF_{497,2x}$;

$LTF_{498,2x}=\{LTF_{497,2x}(1:248), [1 \text{ or } -1], LTF_{497,2x}(249:497)\}$ or $\{LTF_{497,2x}(1:249), (1 \text{ or } -1), LTF_{497,2x}(250:497)\}$ where a 1 or −1 is inserted in a middle of $LTF_{497,2x}$;

$LTF_{498,2x}=LTF_{996,4x}(1:498)$ or $LTF_{996,4x}(499:996)$ where half of $LTF_{996,4x}$ is used for $LTF_{498,2x}$; or $LTF_{498,2x}=LTF_{996,4x}$(odd indices) or $LTF_{996,4x}$(even indices)

where every other value in $LTF_{996,4x}$ is used for $LTF_{498,2x}$.

Examples of 2xLTF of length 499 are provided as follows:

$LTF_{499,2x}=\{LTF_{498,2x}, [1 \text{ or } -1]\}$ or $\{[1 \text{ or } -1], LTF_{498,2x}\}$ where a 1 or −1 is inserted at a start or an end of $LTF_{498,2x}$; or $LTF_{499,2x}=\{LTF_{498,2x}(1:249), [1 \text{ or } -1], LTF_{498,2x}(250:498)\}$ where a 1 or −1 is inserted in a middle of $LTF_{498,2x}$.

In the examples provided above, in one aspect, $LTF_{26,4x}$ is $HELTF_{26}$ (or $LTF_{26}$). In one aspect, $HELTF_{26}$ (or $LTF_{26}$) can be $LTF_{left}$, $LTF_{right}$, or other binary phase shift keying (BPSK) sequence. In one aspect, $LTF_{52,4x}$ is $HELTF_{52}$. In one aspect, $LTF_{106,4x}$ is $HELTF_{106}$. In one aspect, $LTF_{108,4x}$ is $HELTF_{108}$. In one aspect, $LTF_{242,4x}$ is $HELTF_{242}$. In one aspect, $LTF_{484,4x}$ is $HELTF_{484A}$ or $HELTF_{484B}$. In one aspect, $LTE_{994,4x}$ is $HELTF_{994}$. In one aspect, $LTF_{996,4x}$ is $HELTF_{996}$.

In one or more implementations, an HT LTF sequence may be provided for downlink-OFDMA (DL-OFDMA) and uplink-OFDMA (UL-OFDMA). In DL-OFDMA, a STA (e.g., an AP 111 of FIG. 1) may transmit the HE LTF sequences for all corresponding STAs (e.g., 112-115 of FIG. 1) and the AP may transmit one or more resources to the STAs. In UL-OFDMA, a STA may transmit an HE LTF sequence (or a portion thereof) that corresponds only to those resources for which the STA has been assigned. The transmitted signals from multiple STAs may make up the whole LTF sequence (or symbols) at the receiver (e.g., AP 111). In one or more implementations, a STA that is allocated to a center resource unit may not be allocated to any of the other resource units (e.g., STA4 in FIG. 42).

In one or more implementations, an HE LTF sequence length that is utilized is based on the operating bandwidth of OFDMA. The operating bandwidth may be the transmission bandwidth of the legacy preamble portion or the bandwidth that encompasses all the allocated resources of OFDMA. In one aspect, an operating bandwidth may be a channel bandwidth.

FIG. 42 illustrates an example of an HE LTF transmission for UL-OFDMA and DL-OFDMA. In UL-OFDMA, each STA (e.g., STA1 through STA5) transmits only a subset of the LTF sequence defined over the entire operating bandwidth. As shown in FIG. 42, STAs 1 through 5 are allocated with 48, 24, 24, 24, and 102 data subcarriers (or data tones), respectively, that are located within tone indices between −122 and −71, between −68 and −43, between −42 and −17, between −14 to −2 & +2 to +14 (without 3 DC tones at −1, 0, +1), and between +17 and +122, respectively. Each STA transmits an LTF sequence for only those tones allocated to the STA.

In one aspect, in DL-OFDMA, the AP transmits an HE LTF sequence only over the allocated resources (or the allocated tones). For example, although an HE LTF sequence for 20 MHz may be provided for 242 usable tones, the AP transmits an HE LTF sequence associated with only those tones allocated for the STAs (e.g., STAs that participate in the communication) and omits the remaining tones (e.g., reserved tones) from transmission. In this example, the AP (e.g., IFT 284 of the AP) uses/modulates symbols associated with the data/pilot tones allocated to the STAs for transmission but does not use the DC tones or the reserved tones for transmission.

FIG. 43 illustrates an example of an LTF transmission for UL-OFDMA and DL-OFDMA. The UL-OFDMA operates similarly to that illustrated in FIG. 42. In DL-OFDMA, the AP transmits an HE LTF sequence over the entire occupied data/pilot tones and reserved tones. In this example, the AP (e.g., IFT 284 of the AP) uses/modulates symbols (elements of a sequence) associated with the data/pilot tones allocated to the stations as well as the reserved tones for transmission, but does not use the DC tones for transmission.

Figure 44:
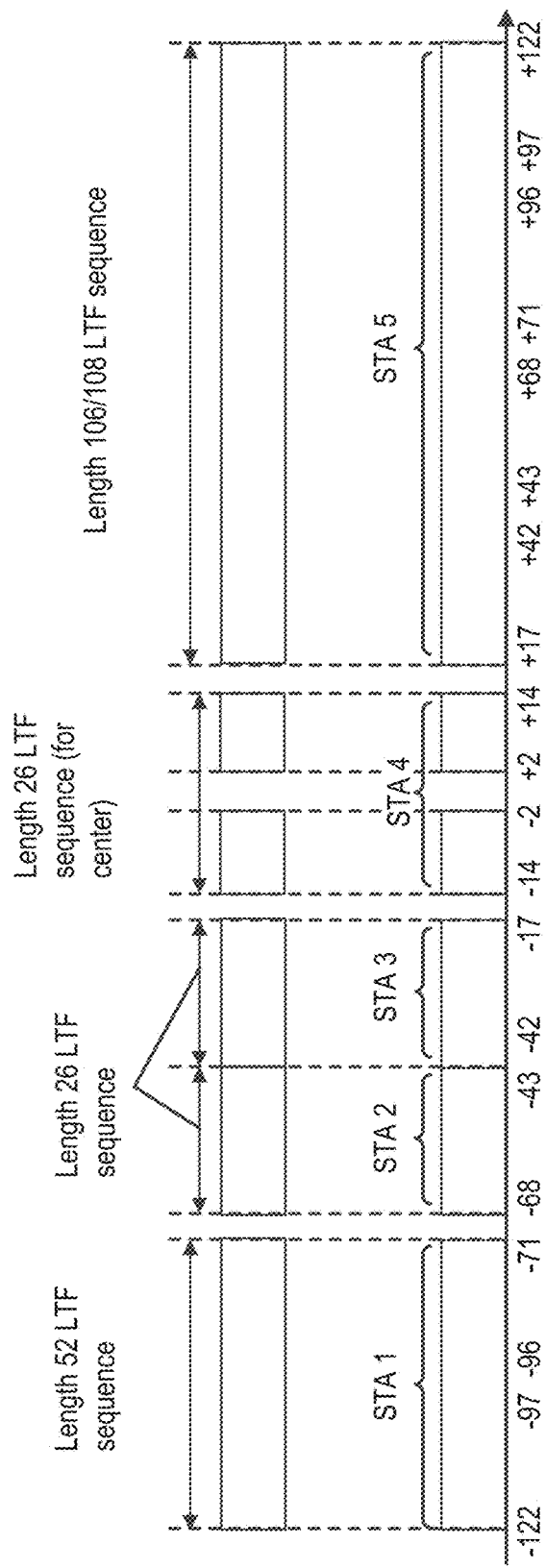

FIG. 44 illustrates an example of an LTF transmission for UL-OFDMA and DL-OFDMA. The LTF sequence length that is utilized by a STA is based on the allocated resource size of OFDMA. An LTF sequence may be provided for each resource allocation size, such as 26, 52, 106 (or 108), and 242 for 20 MHz operations.

In a UL-OFDMA case, each STA transmits only the LTF sequence provided for its allocated resource size. In some aspects, the number of tones (or an LTF sequence length) allocated to one STA may be different from that of another STA. In some aspects, the number of tones allocated to two or more STAs may be the same. In one aspect, tones allocated to a STA may be referred to as a subband allocated to the STA. In FIG. 44, STA1 is allocated with an LTF sequence having 52 elements (or having a length of 52), which may be referred to as a 52-length LTF sequence. In one aspect, the elements are associated with tones or data/pilot tones. STA2 is allocated with a 26-length LTF sequence. STA3 is allocated with a 26-length LTF sequence. STA4 is allocated with a 26-length LTF sequence for a center resource unit, where the 3 DC tones are not used for transmission. STA5 is allocated with a 106-length LTF sequence or a 108-length LTF sequence. A STA (e.g., IFT 284 of the STA) may use/modulate symbols (elements of a sequence) associated with tones allocated to the STA (e.g., data/pilot tones allocated to the station as well as any reserved tones allocated to the station).

In a DL-OFDMA case, the AP concatenates, into one downlink LTF sequence, the LTF sequences associated with all of the STAs that participate in the communication. In this example, the AP concatenates the LTF sequences of STA1, STA2, STA3, STA4, and STA5. In other words, in one aspect, the AP concatenates the 52-length LTF sequence, the 26-length LTF sequence, the 26-length LTF sequence, the 26-length LTF sequence for the center resource unit, and the 106/108-length LTF sequence. In one aspect, an AP aggregates the LTF sequences allocated to the stations into a downlink LTF sequence.

In some aspects, in the DL-OFDMA case, phase rotation may be multiplied per allocated contiguous resource. For example, a phase rotation value for each of the 52-tone subblock, the 26-tone subblock, the 26-tone subblock, the 26-tone center subblock, and the 106/108-tone subblock may be multiplied to a respective element of the sequences. The phase rotation may allow for a reduction in the transmission PAPR. In this example, each LTF sequence assigned to a STA may be considered to be a phase rotation block, and phase rotation may be applied to each such block. In addition, in this example each LTF sequence assigned to a STA is associated with a resource unit.

In one or more implementations, the DL-OFDMA and UL-OFDMA may utilize different LTF sequence transmission methods. For example, the DL-OFDMA may utilize the DL-OFDMA LTF transmission illustrated in FIG. 43 whereas the UL-OFDMA may utilize the UL-OFDMA LTF transmission illustrated in FIG. 44.

In one or more implementations, in DL, the AP may transmit the whole HE LTF sequence in the entire operating bandwidth. For example, even in a case where only one STA is present and is allocated to a single subband, where the single subband is smaller than the entire operating bandwidth, the AP may transmit the HE LTF sequence for the entire operating bandwidth. In UL, in one aspect, each STA may transmit only its LTF sequence corresponding to the allocated subband. For a STA, utilization of different LTF sequences depending on the allocated subband size may allow for a reduction of PAPR. For example, a STA may get a UL allocation in a 26-tone subband, in which case it may use a 26-length LTF sequence separately designed for length 26. When a STA gets a UL allocation in a 52-tone subband and/or a 106-tone (or 108-tone) subband, the STA may use a 52-length LTF sequence and/or a 106-length (or 108-length) LTF sequence separately designed for the respective length.

A subband is a portion of a channel bandwidth. For example, a 40 MHz channel bandwidth may have eighteen 26-tone subbands. An 80 MHz channel bandwidth may have four 242-tone subbands and one 26-tone subband.

In one aspect, a subband may correspond to a resource unit. In one aspect, the size of a subband may be the size of a resource unit size, or the bandwidth of a resource unit (e.g., 26-tones, 52-tones, 106-tones, 108-tones, 242-tones, 484-tones, 994-tones, or 996-tones). In another aspect, a subband may have a size, or a bandwidth, different from the size of a resource unit.

In one or more aspects, each STA may be allocated with (or associated with) a respective one of the subbands, and the STA's HE LTF sequence is associated with the respective one of the subbands. For example, when an allocated subband for a STA is a 52-tone subband, the STA's HE LTF sequence is a 52-length sequence (associated with 52 tones). Such 52-length sequence may be specifically designed to have a low PAPR for that length.

Examples of HE LTF sequences for differently-sized subbands are provided below. In one aspect, each of the examples provided below may be used as an HE LTF sequence for a UL frame. In another aspect, one or more examples provided below may be used as one or more subblocks of an HE LTE sequence for a UL frame. In another aspect, one or more examples provided below may be used as one or more subblocks of an HE LTE sequence for a DL frame. In one or more aspects, a subblock may correspond to a resource unit and vice versa.

An example of a 26-tone sequence for a center subblock can be $HELTF_{26center} = \{LTFah_{left}, 0, 0, 0, LTFah_{right}\}$. Note that 26-tone may be referred to as 26-length. The number of DC tones may vary depending on the channel bandwidth. For example, for 40 MHz, $HELTF_{26center} = \{LTFah_{left}, 0, 0, 0, 0, 0, LTFah_{right}\}$, whereas for 80 MHz OFDMA, $HELTF_{26center} = \{LTFah_{left}, 0, 0, 0, 0, 0, 0, 0, LTFah_{right}\}$.

Examples of a 26-tone sequence for other subblocks (e.g., non-center subblocks) can be:

$HELTF_{26} = \{LTFah_{left}, LTFah_{right}\};$ $HELTF_{26} = \{LTF_{left}\};$ or $HELTF_{26} = \{LTF_{right}\}.$ In some cases, $HELTF_{26}$ may be changed depending on the tone indices of a subblock. For example, even subblocks may utilize $LTF_{left}$ whereas odd subblocks may utilize $LTF_{right}$. In some aspects, orthogonality may be maintained with different size of subblocks in overlapping BSS (OBSS).

In the above examples, the length 13 sequences that are utilized are the $LTFah_{left}$ and $LTFah_{right}$. Other length 13 sequences may be utilized.

An example of a 52-tone sequence for a subblock can be $HELTF_{52} = \{LTF_{left}, LTF_{right}\}$.

Examples of a 106-tone LTF sequence for a subblock can be:

$HELTF_{106} = \{LTF_{left}, 1, LTF_{right}, LTF_{left}, -1, LTF_{right}\};$ $HELTF_{106} = \{1, LTF_{left}, LTF_{right}, LTF_{left}, LTF_{right}, -1\};$ or $HELTF_{106} = \{LTF_{left}, LTF_{right}, 1, -1, LTF_{left}, LTF_{right}\},$ where 1 and −1 are provided as examples.

Examples of a 108-tone LTF sequence for a subblock can be:

$HELTF_{108} = \{LTF_{left}, 1, 1, LTF_{right}, LTF_{left}, -1, -1, LTF_{right}\};$ $HELTF_{108} = \{1, 1, LTF_{left}, LTF_{right}, LTF_{left}, LTF_{right}, 31\ 1, -1\};$ $HELTF_{108} = \{LTF_{left}, LTF_{right}, 1, 1, LTF_{left}, -LTF_{right}, 1, -1\};$ or where 1 and −1 are provided as examples.

Examples of a 242-tone LTF sequence for a subblock can be:

$HELTF_{242} = \{VHT_{-122,122,\ left}, VHT_{-122,122,\ right}\};$ $HELTF_{242} = \{1, HELTF_{106}, 1, HELTF_{26}, -1, HELTF_{106}, -1\};$ or $HELTF_{242} = \{HELTF_{108}, HELTF_{26}, HELTF_{108}\}.$ A phase rotation may be applied for every one fourth of the $HELTF_{242}$ sequence. For example, a phase rotation of [1, −1, −1, −1] may be applied.

An example of a 484-tone LTF sequence for a subblock can be: $HELTF_{484} = \{HELTF_{242}, HELTF_{242}\}$. A phase rotation may be applied for the $HELTF_{484}$ sequence.

In one or more implementations, a 994-tone LTF sequence may be constructed by combinations of $HELTF_{242}$ and $HELTF_{26}$. For the 26-tone subblock, which is located in the center of 80 MHz, $LTF_{26center} = \{LTF_{26left}, 0, 0, 0, 0, 0, 0, 0, LTF_{26right}\}$ may be utilized as the LTF sequence, where $LTF_{26left}$ is the leftmost length 13 sequence in the $HELTF_{26}$ and $LTF_{26right}$ is the rightmost length 13 sequence in the $HELTF_{26}$.

A 994-tone LTF sequence, $HELTF_{994}$, may be generated using four $HELTF_{242}$ sequences and one $LTF_{26center}$ sequence. For example, $HELTF_{994} = \{HELTF_{242}, HELTF_{242}, LTF_{26center}, HELTF_{242}, HELTF_{242}\}$. A phase rotation may be applied to each of the $HELTF_{242}$ sequences and the $LTF_{26center}$ sequence. Applying a phase rotation of [1, −1, 1, −1, −1] results in $LTF_{994} = \{HELTF_{242}, -HELTF_{242}, LTF_{26center}, -HELTF_{242}, -HELTF_{242}\}$.

In one or more implementations, a 996-tone LTF sequence may be constructed by combinations of $HELTF_{242}$ and $HELTF_{26}$. For the 26-tone subblock, which is located in the center of 80 MHz, $LTF_{26center} = \{LTF_{26left}, 0, 0, 0, 0, 0, 0, 0, LTF_{26right}\}$ may be utilized as the LTF sequence.

A 996-tone LTF sequence, $HELTF_{996}$, may be generated using four $HELTF_{242}$ sequences, one $LTF_{26center}$ sequence, and additional two 1 or −1. Examples of 996-tone LTF sequence may be provided as follows:

$HELTF_{996} = \{HELTF_{242}, [1\ or\ -1], HELTF_{242}, LTF_{26center}, HELTF_{242}, [1\ or\ -1], HELTF_{242}\};$ $HELTF_{996} = \{[1\ or\ -1], HELTF_{242}, HELTF_{242}, LTF_{26center}, HELTF_{242}, HELTF_{242}, [1\ or\ -1]\};$ or $HELTF_{996} = \{HELTF_{242}, HELTF_{242}, [1\ or\ -1], LTF_{26center}, [1\ or\ -1], HELTF_{242}, HELTF_{242}\}$ For each of the example $LTF_{996}$ sequences, phase rotation may be applied.

In one or more aspects, an HE LTF sequence may be formed by duplicating one or more short sequences (e.g., duplicating one or more short sequences of resource units). For example, a 994 or 996-length LTF sequence may be formed by duplicating one or more shorter LTF sequences (e.g., 484-length sequence, 242-length sequence, 106/108-length sequence, 52-length sequence, and/or 26-length sequence). A 484-length LTF sequence may be formed by duplicating one or more shorter LTF sequences (e.g., 242-length sequence, 106/108-length sequence, 52-length sequence, and/or 26-length sequence). A 242-length LTF sequence may be formed by duplicating one or more shorter LTF sequences (e.g., 106/108-length sequence, 52-length sequence, and/or 26-length sequence). A 106 or 108-length LTF sequence may be formed by duplicating one or more shorter LTF sequences (e.g., 52-length sequence and/or 26-length sequence). A 52-length LTF sequence may be formed by duplicating one or more shorter LTF sequences (e.g., 26-length sequence).

In one aspect, a length may refer to the number of tones in a sequence, and vice versa. For example, a 52-length LTF sequence may refer to a 52-tone LTF sequence, an LTF sequence with 52 tones or vice versa. In one aspect, a length may refer to the number of data tones and pilot tones in a sequence. In another aspect, a length may refer to the number of data tones, pilot tones and reserved tones in a sequence. In another aspect, a length may refer to the number of data tones, pilot tones, reserved tones and DC tones in a sequence. In one aspect, a length may refer to the number of usable tones in a sequence. In another aspect, a length may refer to the number of usable tones and DC tones in a sequence. In one aspect, a length may refer to the number elements in a sequence.

In one or more aspects, a sequence (or an HE LTF sequence) includes or consists of elements. In one aspect, each element of a sequence is associated with a data tone or a pilot tone. In another aspect, each element of a sequence is associated with a data tone, a pilot tone, or a reserved tone. In another aspect, each element of a sequence is associated with a data tone, a pilot tone, a reserved tone, or a DC tone. In one aspect, each element of a sequence is associated with a tone. In one aspect, elements of a sequence are not associated with any guard tone. In one aspect, each element of a sequence is associated with a usable tone. In one aspect, each element of a sequence is associated with a usable tone or a DC tone. In one aspect, elements are sequential. In one aspect, elements are successive. In one aspect, elements are consecutive. In one aspect, an element of a sequence is referred to as a symbol, a modulated symbol, an LTF modulated symbol, or vice versa. In one aspect, a symbol is associated with a tone.

When a long sequence is formed by duplicating one or more short sequences, and when such short sequences contain DC tones, such DC tones in the short sequences are removed when forming the long sequence. Further, when a long sequence is formed by duplicating one or more short sequences, applicable DC tones (e.g., 3, 5 or 7 DC tones) may be added to the center portion of the long sequence. Further, when a long sequence is formed by duplicating one or more short sequences, applicable reserved tones may be added to form the long sequence.

In one or more aspects, an HE LTF sequence may be identified using a sequence including its associated DC tones or may be identified using a sequence without its associated DC tones. In one aspect, the notation $HELTF_x$ may refer to an HE LTF sequence having x number of usable tones, where x is a number such as 26, 52, 106, 108, 242, 484, 994, or 996. In another aspect, the notation $HELTF_x$ may refer to an HE LTF sequence having x number of usable tones plus its DC tones. In one aspect, $LTF_x$ may refer to $HELTF_x$. In one aspect, $HELTF_{484}$ may refer to a sequence of 484 usable tones or to a sequence of 484 usable tones plus its DC tones. In one aspect, $HELTF_{484A}$ may refer to an HE LTF sequence having 484 usable tones or to an HE LTF sequence having 484 usable tones plus its DC tones. In one aspect, $HELTF_{484B}$ may refer to an HE LTF sequence having 484 usable tones or to an HE LTF sequence having 484 usable tones plus its DC tones.

In one or more aspects, a sequence may refer to one or more sequences. In one or more aspects, a sequence may refer to a portion of a sequence, a subblock of a sequence, one or more subblocks of a sequence, a sub-sequence, one or more sub-sequences, or vice versa. In one aspect, a subblock is associated with a resource unit. In one aspect, when a sequence includes only one sub-sequence, the sequence and the sub-sequence may be the same.

In one or more aspects, a downlink is directed from at least one STA (e.g., an AP 111) to a plurality of STAs (e.g., 112-115), and an uplink is directed from the plurality of STAs (e.g., 112-115) to at least one STA (e.g., AP 111). In one or more implementations, a processor (e.g., 210, 215, or 280) of a STA (e.g., an AP or a non-AP STA) may determine a channel bandwidth. A processor may also generate, determine, and/or provide an HE LTF sequence. A processor may also generate or provide a frame (e.g., a downlink frame or a uplink frame) and facilitate transmission of the frame.

The processor may generate an HE LTF sequence based on certain information or may determine and/or retrieve the HE LTF sequence from storage (e.g., memory or register(s)) for usage. The processor may perform phase rotation. The HE LTF sequence may include a center subblock (or a center sub-sequence) that has been optimized for PAPR. In one aspect, such center sequence may be different from another subblock of the subsequence. The HE LTF sequence may include two or more subblocks that are the same.

The processor may subsample a first HE LTF sequence to generate a subsampled HE LTF sequence, where the subsampled HE LTF sequence has less number of elements than the number of elements of the first HE LTF sequence. In one aspect, subsampling may include reusing/retrieving one or more subblocks or reusing/retrieving one half of each of one or more subblocks of the first HE LTF sequence. In one aspect, sub sampling may include adding or removing one tone (e.g., at the beginning or at the end of the subsampled subblock).

In one aspect, to prepare for transmission, the processor may select only the portion(s) of the sequence associated with the data/pilot tones that are allocated to the STAs participating in the communication. In another aspect, the processor may select portion(s) of the sequence associated with the data/pilot tones allocated to the STAs and reserved tones. In yet another aspect, the processor may concatenate a set of sequences allocated to the STAs.

In one or more implementations, a processor (e.g., 210, 215, or 280) of a STA (e.g., a non-AP STA) may generate, determine or provide an HE LTF sequence having a length that is less than a channel bandwidth. In one aspect, the HE LTF sequence has a length of a resource unit.

Figure 45:
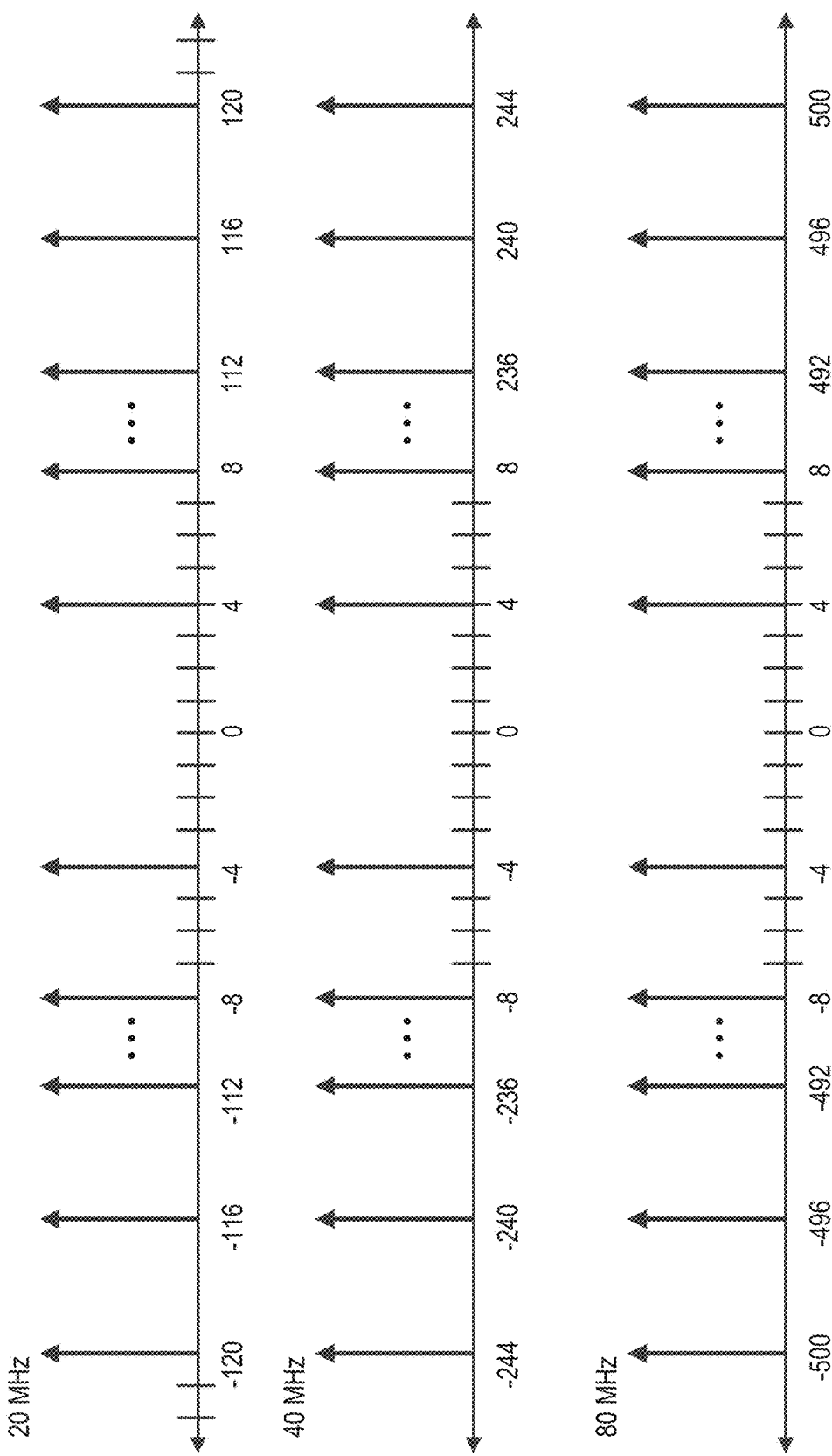
FIG. 45 shows examples of structures of high efficiency (HE) LTF sequences in 1×HE LTF mode for 20 MHz, 40 MHz, and 80 MHz channel bandwidths.

FIG. 45 shows examples of structures of HE LTF sequences in 1x HE LTF mode for 20 MHz, 40 MHz, and 80 MHz channel bandwidths. The HE-LTF sequences shown in FIG. 45 can be used for both non-OFDMA transmission and OFDMA transmission. In an aspect, 1x HE LTF may be referred to as 1xLTF.

The HE-LTF sequence for the 20 MHz channel bandwidth and the 1x HE-LTF mode may include zero values on subcarrier indices from −122 to −4 excluding every fourth subcarrier index from −122 to −4, non-zero values on every fourth subcarrier index from −122 to −4, zero values on subcarrier indices from −3 to −2, DC tones on subcarrier indices from −1 to 1, zero values on subcarrier indices from 2 to 3, non-zero values on every fourth subcarrier index from 4 to 122, and zero values on subcarrier indices from 4 to 122 excluding every fourth subcarrier index from 4 to 122.

For the HE-LTF sequence for the 20 MHz and the 1x HE-LTF mode, an non-limiting example of the sequence of non-zero values is as follows:

$$\{x_1, x_2, 1, 1, LTF_{left}, LTF_{right}, -1, -1, x_3, x_4\}$$

where $\{x_1, x_2, x_3, x_4\}$ can be determined based on PAPR. The $\{x_1, x_2, x_3, x_4\}$ may be the best four values (1 or −1) to minimize the maximum PAPRs for all possible pilot values. For example, $\{x_1, x_2, x_3, x_4\}$ may be equal to $\{1, 1, -1, 1\}$.

The HE-LTF sequence for the 40 MHz and the 1x HE-LTF mode may include zero values on subcarrier indices from −244 to −4 excluding every four subcarrier indices from −244 to −4, non-zero values on every four subcarrier indices from −244 to −4, a zero value on a subcarrier index of −3, DC tones on subcarrier indices from −2 to 2, a zero value on a subcarrier index of 3, non-zero values on every four subcarrier indices from 4 to 244, and zero values on subcarrier indices from 4 to 244 excluding every four subcarrier indices from 4 to 122.

For the HE-LTF sequence for the 40 MHz and the 1x HE-LTF mode, non-limiting examples of the sequences of non-zero values are as follows.

In a first example, $\{y_1, y_2, y_3, y_4, LTF_{left}, 1, LTF_{right}, -1, -1, -1, 1, -1, 1, 1, -1, LTF_{left}, 1, LTF_{right}, y_5, y_6, y_7, y_8\}$; and In a second example, $\{z_1, z_2, z_3, LTF_{left}, 1, LTF_{right}, -1, -1, -1, 1, z_4, z_5, -1, 1, 1, -1, LTF_{left}, 1, LTF_{right}, z_6, z_7, z_8\}$.

In the first and second examples, $\{y_1, y_2, y_3, y_4, y_5, y_6, y_7, y_8\}$ and $\{z_1, z_2, z_3, z_4, z_5, z_6, z_7, z_8\}$ can be determined based on PAPR. They may be the best values (1 or −1) to minimize the maximum PAPRs for all possible pilot values. For example, $\{y_1, y_2, y_3, y_4, y_5, y_6, y_7, y_8\}$ may be equal to $\{1, -1, -1, 1, -1, -1, 1, 1\}$, and $\{z_1, z_2, z_3, z_4, z_5, z_6, z_7, z_8\}$ may be equal to $\{1, 1, 1, -1, -1, 1, -1, -1\}$.

The HE-LTF sequence for the 80 MHz and the 1x HE-LTF mode may include zero values on subcarrier indices from −500 to −4 excluding every fourth subcarrier index from −500 to −4, non-zero values on every fourth subcarrier indices from −500 to −4, a zero value on a subcarrier index of −3, DC tones on subcarrier indices from −2 to 2, a zero value on a subcarrier index of 3, non-zero values on every fourth subcarrier index from 4 to 500, and zero values on subcarrier indices from 4 to 500 excluding every fourth subcarrier index from 4 to 500.

For the HE-LTF sequence for the 80 MHz and the 1xHE-LTF mode, non-limiting examples of the sequences of non-zero values are as follows.

In a first example, $\{p_1, p_2, p_3, p_4, LTF_{left}, 1, LTF_{right}, -1, -1, -1, 1, 1, -1, 1, -1, 1, 1, -1, LTF_{left}, 1, LTF_{right}, 1, -1, 1, -1, 1, -1, -1, 1, LTF_{left}, 1, LTF_{right}, -1, -1, -1, 1, 1, -1, 1, -1, 1, 1, -1, LTF_{left}, 1, LTF_{right}, p_5, p_6, p_7, p_8\}$; and In a second example, $\{q_1, q_2, q_3, LTF_{left}, 1, LTF_{right}, -1, -1, -1, 1, 1, -1, 1, -1, 1, 1, -1, LTF_{left}, 1, LTF_{right}, 1, -1, 1, -1, q_4, q_5, 1, -1, -1, 1, LTF_{left}, 1, LTF_{right}, -1, -1, -1, 1, 1, -1, 1, -1, 1, 1, -1, LTF_{left}, 1, LTF_{right}, q_6, q_7, q_8\}$.

In the first and second examples, $\{p_1, p_2, p_3, p_4, p_5, p_6, p_7, p_8\}$ and $\{q_1, q_2, q_3, q_4, q_5, q_6, q_7, q_8\}$ can be determined based on PAPR. They may be the best values (1 or −1) to minimize the maximum PAPRs for all possible pilot values. For example, $\{p_1, p_2, p_3, p_4, p_5, p_6, p_7, p_8\}$ may be equal to $\{-1, -1, -1, 1, -1, 1, -1, 1\}$, and $\{q_1, q_2, q_3, q_4, q_5, q_6, q_7, q_8\}$ may be equal to $\{-1, 1, -1, 1, -1, 1, 1, -1\}$.

FIGS. 46 through 49 illustrate flow charts of examples of operations facilitating wireless communication.

Figure 46:
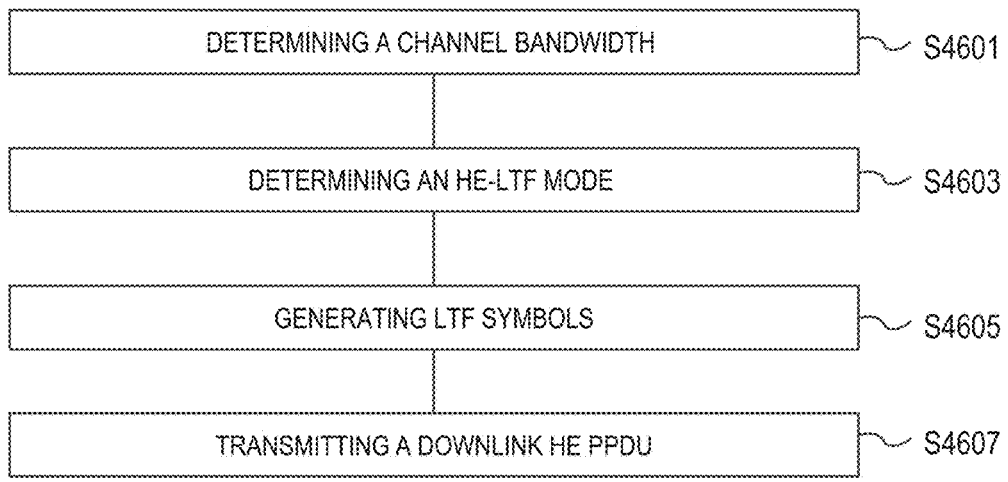
FIGS. 46 through 52 illustrate flow charts of examples of operations facilitating wireless communication.

FIG. 46 shows operations for facilitating transmission of a downlink HE PPDU by an AP station.

The AP station determines a channel bandwidth (S4601). The AP station may determine the channel bandwidth from among a plurality of bandwidths. The plurality of bandwidths may include 20 MHz, 40 MHz, 80 MHz, and 160 MHz.

The AP station determines an HE-LTF mode (S4603). The AP station may determine the HE-LTF mode from among a plurality of HE-LTF modes. The plurality of HE-LTF modes may include a 4x HE-LTF mode, a 2x HE-LTF mode, and a 1x HE-LTF mode.

The AP station generates one or more LTF symbols (S4605). The AP station may generate the LTF symbols, by using an HE-LTF sequence corresponding to the determined channel bandwidth and the determined HE-LTF mode. A duration of the LTF symbol excluding a guard interval can be 12.8 microseconds when the determined HE-LTF mode is 4x HE-LTF mode. A duration of the LTF symbol excluding a guard interval can be 6.4 microseconds when the determined HE-LTF mode is 2xHE-LTF mode. A duration of the LTF symbol excluding a guard interval can be 3.2 microseconds when the determined HE-LTF mode is 1x HE-LTF mode.

The HE-LTF sequence used for generating the LTF symbol may be one of a plurality of HE-LTF sequences for the plurality of bandwidths and the plurality of HE-LTF modes. For example, the plurality of HE-LTF sequences may include a first HE-LTF sequence for 20 MHz channel bandwidth and the 4x HE-LTF mode, a second HE-LTF sequence for 20 MHz channel bandwidth and the 2x HE-LTF mode, a third HE-LTF sequence for 40 MHz channel bandwidth and the 4x HE-LTF mode, a fourth HE-LTF sequence for 40 MHz channel bandwidth and the 2x HE-LTF mode, a fifth HE-LTF sequence for 80 MHz channel bandwidth and the 4x HE-LTF mode, a sixth HE-LTF sequence for 80 MHz channel bandwidth and the 2x HE-LTF mode, a seventh HE-LTF sequence for 20 MHz channel bandwidth and the 1x HE-LTF mode, an eighth HE-LTF sequence for 40 MHz channel bandwidth and the 1x HE-LTF mode, a ninth HE-LTF sequence for 80 MHz channel bandwidth and the 1x HE-LTF mode, a tenth HE-LTF sequence for 160 MHz channel bandwidth and the 4x HE-LTF mode, an eleventh HE-LTF sequence for 160 MHz channel bandwidth and the 2x HE-LTF mode, and a twelfth HE-LTF sequence for 160MHz channel bandwidth and the 1x HE-LTF mode. Various examples for the first through the twelfth HE-LTF sequences have been introduced above in the present disclosure.

For example, the first HE-LTF sequence for non-OFDMA transmission may include non-zero values on subcarrier indices from −122 to −2, DC tones on subcarrier indices from −1 to 1, and non-zero values on subcarrier indices from 2 to 122.For OFDMA transmission, the first HE-LTF sequence may include zero values on subcarrier indices of −4, −3, 3, and 4.

The second HE-LTF sequence for non-OFDMA transmission may include zero values on every odd subcarrier index from −122 to −2, non-zero values on every even subcarrier index from −122 to −2, DC tones on subcarrier indices from −1 to 1, non-zero values on every even subcarrier index from 2 to 122, and zero values on every odd subcarrier index from 2 to 122.For OFDMA transmission, the second HE-LTF sequence may include zero values on subcarrier indices of −3 and 3.

The third HE-LTF sequence for both non-OFDMA transmission and OFDMA transmission may include non-zero values on subcarrier indices from −244 to −3, DC tones on subcarrier indices from −2 to 2, and non-zero values on subcarrier indices from 3 to 244.The third HE-LTF sequence may include plural unit sequences for plural resource units, wherein each of the plural unit sequences corresponds to one of plural base sequences multiplied by one of +1 or −1.The number of the plural unit sequences can be 18, the number of the plural resource units can be 18, and each of the plural unit sequences may include 26 elements whose value are +1 or −1.The number of the plural base sequences can be 2 or 4.

The fourth HE-LTF sequence for both non-OFDMA transmission and OFDMA transmission may include zero values on every odd subcarrier index from −244 to −4, non-zero values on every even subcarrier index from −244 to −4, a zero value on a subcarrier index of −3, DC tones on subcarrier indices from −2 to 2, a zero value on a subcarrier index of 3, non-zero values on every even subcarrier index from 4 to 244, and zero values on every odd subcarrier index from 4 to 244.The fourth HE-LTF sequence may include plural unit sequences for plural resource units, wherein each of the plural unit sequences corresponds to one of plural base sequences multiplied by one of +1 or −1.The number of the plural unit sequences can be 18, the number of the plural resource units can be 18, and each of the plural unit sequences may include 26 elements whose value are +1 or −1.The number of the plural base sequences can be 2 or 4.

The fifth HE-LTF sequence for non-OFDMA transmission may include non-zero values on subcarrier indices from −500 to −3, DC tones on subcarrier indices from −2 to 2, and non-zero values on subcarrier indices from 3 to 500.For OFDMA transmission, the fifth HE-LTF sequence may include zero values on subcarrier indices of −3 and 3.

The sixth HE-LTF sequence for both non-OFDMA transmission and OFDMA transmission may include zero values on every odd subcarrier index from −500 to −4, non-zero values on every even subcarrier index from −500 to −4, a zero value on a subcarrier index of −3, DC tones on subcarrier indices from −2 to 2, a zero value on a subcarrier index of 3, non-zero values on every even subcarrier index from 4 to 500, and zero values on every odd subcarrier index from 4 to 500.

The seventh HE-LTF sequence for both non-OFDMA transmission and OFDMA transmission may include zero values on subcarrier indices from −122 to −4 excluding every fourth subcarrier index from −122 to −4, non-zero values on every fourth subcarrier index from −122 to −4, zero values on subcarrier indices from −3 to −2, DC tones on subcarrier indices from −1 to 1, zero values on subcarrier indices of 2 and 3, non-zero values on every fourth subcarrier index from 4 to 122, and zero values on subcarrier indices from 4 to 122 excluding every fourth subcarrier index from 4 to 122.

The eighth HE-LTF sequence for both non-OFDMA transmission and OFDMA transmission may include zero values on subcarrier indices from −244 to −4 excluding every fourth subcarrier index from −244 to −4, non-zero values on every fourth subcarrier index from −244 to −4, a zero value on subcarrier index of −3, DC tones on subcarrier indices from −2 to 2, a zero value on subcarrier index of 3, non-zero values on every fourth subcarrier index from 4 to 244, and zero values on subcarrier indices from 4 to 244 excluding every fourth subcarrier index from 4 to 122.

The ninth HE-LTF sequence for both non-OFDMA transmission and OFDMA transmission may include zero values on subcarrier indices from −500 to −4 excluding every fourth subcarrier index from −500 to −4, non-zero values on every fourth subcarrier index from −500 to −4, a zero value on a subcarrier index of −3, DC tones on subcarrier indices from −2 to 2, a zero value on a subcarrier index of 3, non-zero values on every fourth subcarrier index from 4 to 500, and zero values on subcarrier indices from 4 to 500 excluding every fourth subcarrier index from 4 to 500.

The AP station transmits a downlink HE PPDU in the determined channel bandwidth (S4607). The HE-LTF field of the HE PPDU may include the one or more LTF symbols which are generated in S4605. The format of the downlink HE PPDU can follow that shown in FIG. 8.

Figure 47:
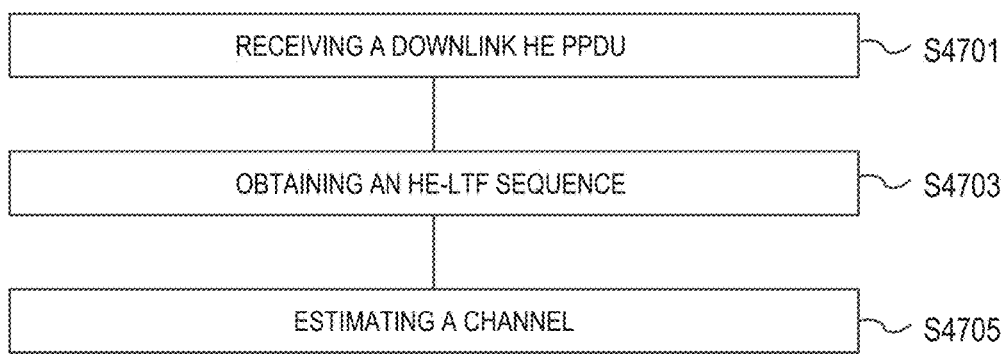

FIG. 47 shows operations for facilitating reception of a downlink HE PPDU by a non-AP station.

The non-AP station receives a downlink HE PPDU in a channel bandwidth (S4701). In an aspect, the downlink HE PPDU may be the downlink HE PPDU transmitted by the AP station in S4607 of FIG. 46. The HE-LTF field of the HE PPDU may include the one or more LTF symbols. The HE PPDU may correspond to a downlink HE PPDU. The channel bandwidth can be one of a plurality of bandwidths including 20 MHz, 40 MHz, 80 MHz, and 160 MHz. The format of the downlink HE PPDU can follow that shown in FIG. 8.

The non-AP station obtains an HE-LTF sequence from the HE-LTF symbol (S4703). The HE-LTF sequence may correspond to the channel bandwidth and an HE-LTF mode of the HE-LTF symbol. The HE-LTF mode of the HE-LTF symbol can be one of a plurality of HE-LTF modes including a 4x HE-LTF mode, a 2x HE-LTF mode, and a 1x HE-LTF mode. If the HE PPDU is a downlink non-OFDMA HE PPDU or a downlink OFDMA HE PPDU, the non-AP station may obtain the HE-LTF sequence on the whole subcarriers from the HE-LTF symbol. If the HE PPDU is the downlink OFDMA HE PPDU, the non-AP station may obtain the HE-LTF sequence on a part of the whole subcarriers from the HE-LTF symbol. The part may correspond to a resource unit which is allocated to the non-AP station. In particular, subcarriers belonging to the part may be the same as subcarriers belonging to the allocated resource unit. Alternatively, subcarriers belonging to the part may cover subcarriers belonging to the allocated resource unit.

The non-AP station estimates a channel by using the HE-LTF sequence (S4705). If the HE PPDU is a downlink non-OFDMA HE PPDU or a downlink OFDMA HE PPDU, the non-AP station may perform channel estimation on the whole subcarriers. If the HE PPDU is the downlink OFDMA HE PPDU, the non-AP station may perform channel estimation on the part of the whole subcarriers.

Figure 48:
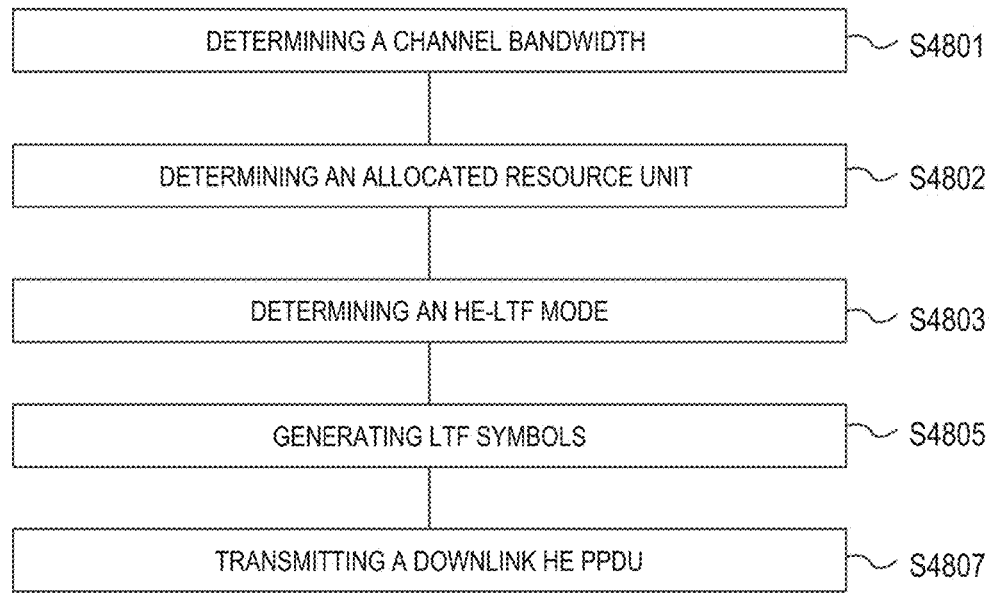

FIG. 48 shows operations for facilitating transmission of an uplink HE PPDU by a non-AP station.

The non-AP station determines a channel bandwidth (S4801). The non-AP station may determine the channel bandwidth among a plurality of bandwidths. The plurality of bandwidths may include 20 MHz, 40 MHz, 80 MHz, and 160 MHz.

The non-AP station determines a resource unit that is allocated to the non-AP station (S4802). The non-AP station may receive resource allocation information for an uplink transmission, and determine the allocated resource unit based on the resource allocation information.

The non-AP station determines an HE-LTF mode (S4803). The non-AP station may determine the HE-LTF mode among a plurality of HE-LTF modes. The plurality of HE-LTF modes may include a 4x HE-LTF mode, a 2x HE-LTF mode, and a 1x HE-LTF mode.

The non-AP station generates one or more LTF symbols (S4805). The non-AP station may generate the LTF symbols by using an HE-LTF sequence corresponding to the determined channel bandwidth and the determined HE-LTF mode. The non-AP station may use a part or the whole of the HE-LTF sequence. If the HE PPDU is an uplink non-OFDMA HE PPDU, the non-AP station may use the whole of the HE-LTF sequence. If the HE PPDU is an uplink OFDMA HE PPDU, the non-AP station may use a part of the HE-LTF sequence. The part may correspond to a resource unit which is allocated to the non-AP station. In particular, subcarriers belonging to the part may be the same as subcarriers belonging to the allocated resource unit.

The non-AP station transmits an uplink HE PPDU to the AP station in the determined channel bandwidth (S4807). The HE-LTF field of the HE PPDU may include the one or more LTF symbols which are generated in S4805. The format of the uplink HE PPDU can follow that shown in FIG. 8.

Figure 49:
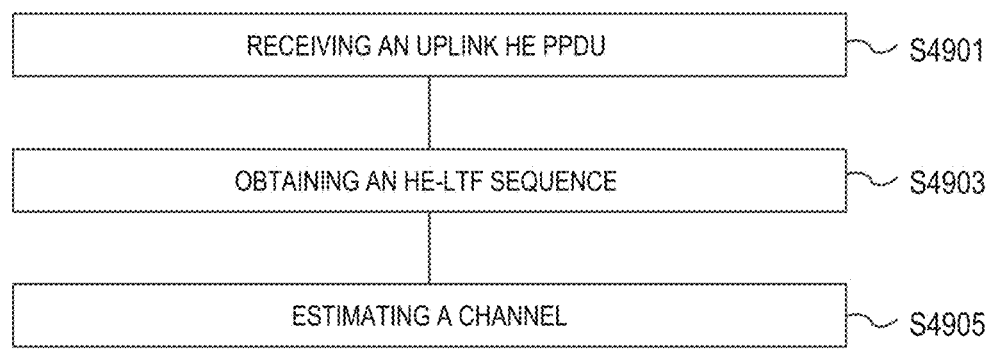

FIG. 49 shows operations for facilitating reception of an uplink HE PPDU by an AP station.

The AP station receives an uplink HE PPDU in a channel bandwidth (S4901). In an aspect, the uplink HE PPDU may be the uplink HE PPDU transmitted by the non-AP station in S4807 of FIG. 48. The HE-LTF field of the HE PPDU may include the one or more LTF symbols. The HE PPDU may correspond to an uplink HE PPDU. The channel bandwidth can be one of a plurality of bandwidths including 20 MHz, 40 MHz, 80 MHz, and 160 MHz. The format of the uplink HE PPDU can follow that shown in FIG. 8.

The AP station obtains an HE-LTF sequence from the HE-LTF symbol (S4903). The HE-LTF sequence may correspond to the channel bandwidth and an HE-LTF mode of the HE-LTF symbol.

The AP station estimates a channel by using the HE-LTF sequence (S4905).

Figure 50:
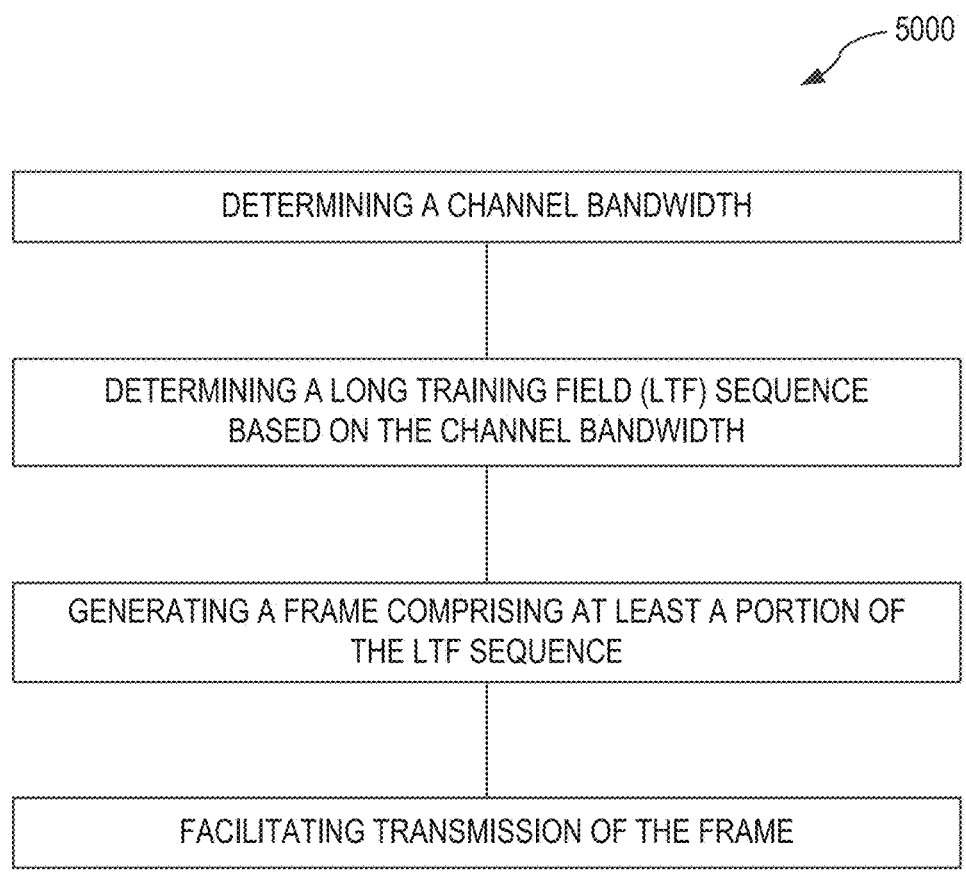
Figure 51:
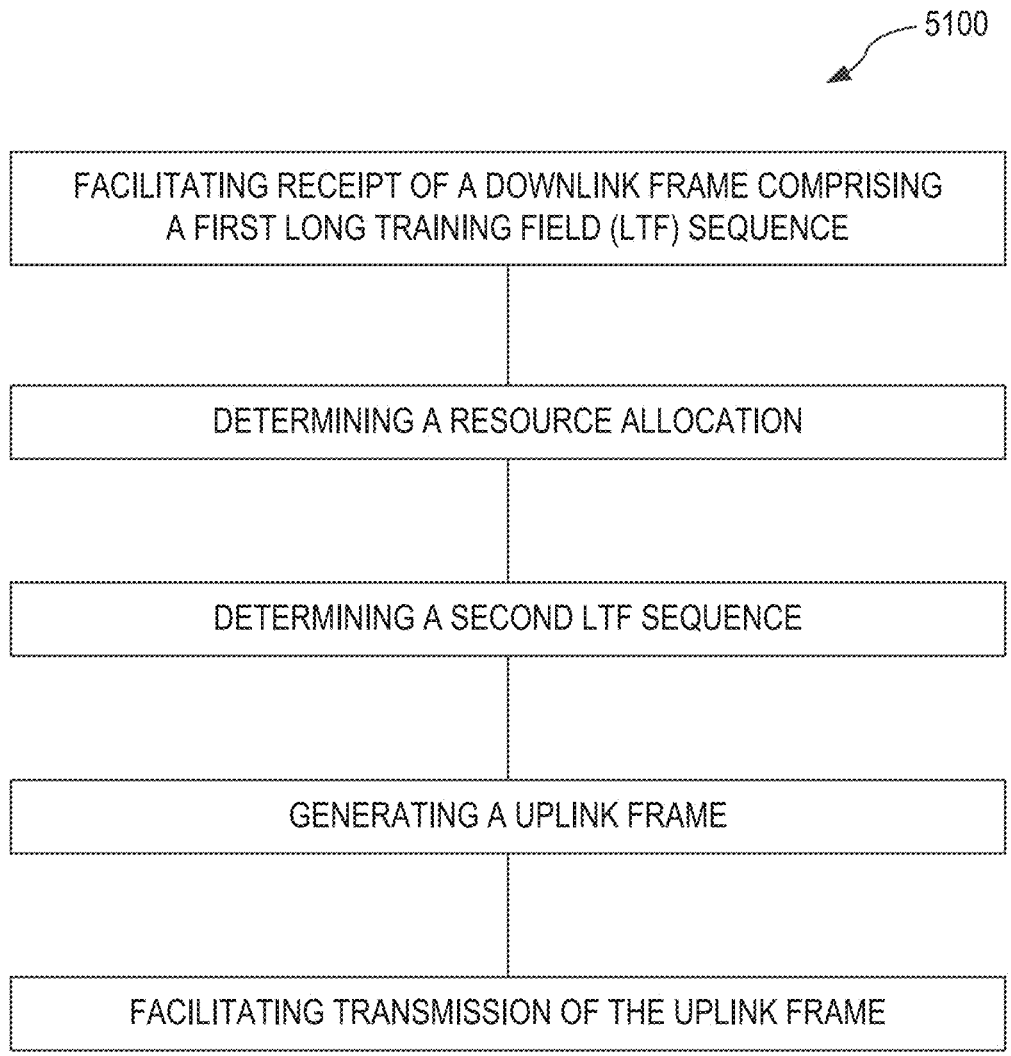
Figure 52:
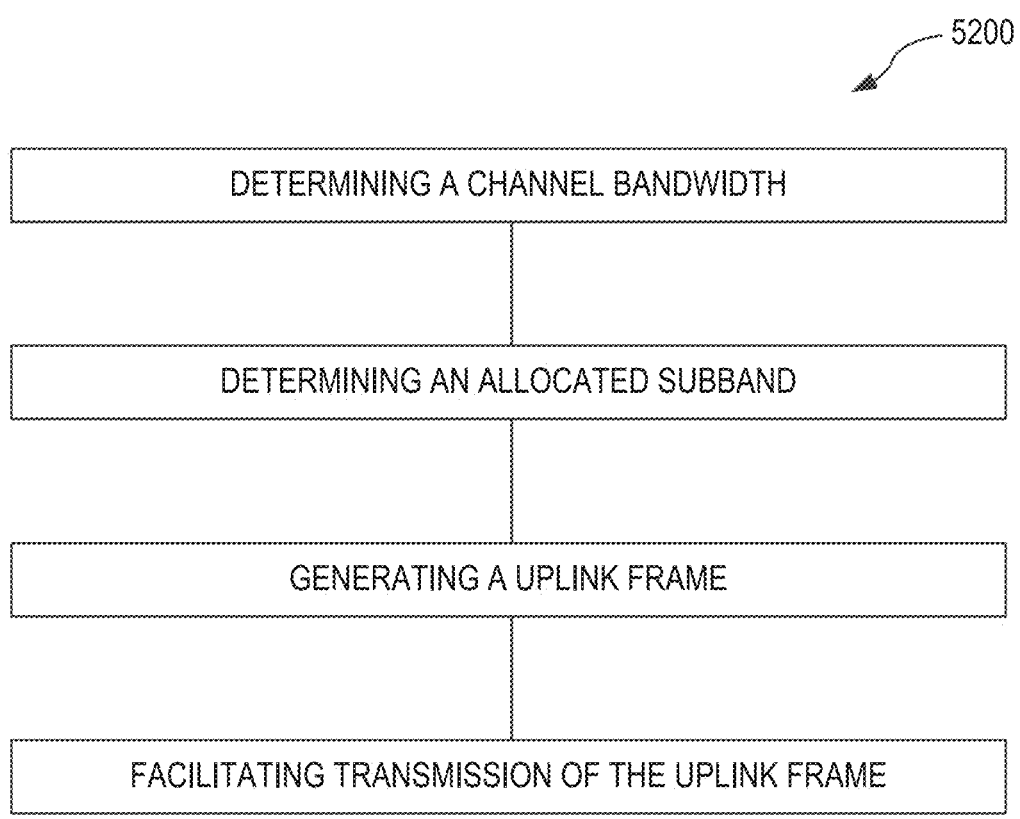

FIGS. 50 through 52 illustrate flow charts of examples of operations facilitating wireless communication. For explanatory and illustration purposes, the example processes 5000, 5100 and 5200 may be performed by the wireless communication devices 111-115 of FIG. 1 and their components such as a baseband processor 210, a PHY processor 215, a transmitting signal processing unit 280 and/or a receiving signal processing unit 290; however, the example processes 5000, 5100 and 5200 are not limited to the wireless communication devices 111-115 of FIG. 1 or their components, and the example processes 5000, 5100 and 5200 may be performed by other devices or components. Further for explanatory and illustration purposes, the blocks of the example processes 5000, 5100 and 5200 are described herein as occurring in serial or linearly. However, multiple blocks of the example processes 5000, 5100 and 5200 may occur in parallel. In addition, the blocks of the example processes 5000, 5100 and 5200 need not be performed in the order shown and/or one or more of the blocks or operations of the example processes 5000, 5100 and 5200 need not be performed. One or more operations described with reference to FIGS. 50 through 52 may be performed as part of one or more other operations associated thereof.

Various examples of aspects of the disclosure are described below as clauses for convenience. These are provided as examples, and do not limit the subject technology. Any identifications of the figures and reference numbers are merely examples and for illustrative purposes, and the clauses are not limited by those identifications. As an example, some of the clauses described below are illustrated in FIGS. 45 through 52.

Clause A: An apparatus for facilitating wireless communication, the apparatus comprising: one or more memories; and one or more processors coupled to the one or more memories, wherein the one or more processors are configured to cause: determining a channel bandwidth including a 20 MHz channel bandwidth, 40 MHz channel bandwidth, and 80 MHz channel bandwidth; determining an HE-LTF mode among a plurality of HE-LTF modes including a 4x HE-LTF mode and a 2x HE-LTF mode; generating an HE-LTF symbol by using an HE-LTF sequence corresponding to the determined channel bandwidth and the determined HE-LTF mode, wherein the HE-LTF sequence is among a plurality of HE-LTF sequences for the plurality of bandwidths and the plurality of HE-LTF modes; and transmitting an HE PPDU including the HE-LTF symbol, in the determined channel bandwidth.

Clause B: An apparatus for facilitating wireless communication, the apparatus comprising: one or more memories; and one or more processors coupled to the one or more memories, wherein the one or more processors are configured to cause: receiving a downlink HE PPDU including an HE-LTF symbol, in a channel bandwidth which is one of a plurality of bandwidths including 20 MHz, 40 MHz, and 80 MHz; and obtaining, from the HE-LTF symbol, an HE-LTF sequence corresponding to the channel bandwidth and an HE-LTF mode of the HE-LTF symbol, wherein the HE-LTF mode is one of a plurality of HE-LTF modes including a 2x HE-LTF mode and a 4x HE-LTF mode.

In one or more aspects, the claims are incorporated herein as clauses. In one or more aspects, various phrases and sentences of this present disclosure are incorporated herein as clauses. Each of implementations of Clauses A and B may include one or more of the clauses in any combination or may include some portions of one or more of the clauses in any combination. In one or more aspects, some of the phrases or words in Clauses A and B may be changed or removed.

In one aspect, a method may be an operation, an instruction, or a function and vice versa. In one aspect, a clause may depend from one or more of other clauses. In one aspect, a clause may be amended to include some or all of the words (e.g., instructions, operations, functions, or components) in one or more other clauses, one or more sentences, one or more phrases, one or more paragraphs, and/or one or more claims.

In one or more aspects, additional clauses are described below.

A method comprising one or more methods or operations of any one or more of the clauses.

An apparatus comprising one or more memories and one or more processors (e.g., 210), the one or more processors configured to cause performing one or more methods or operations of any one or more of the clauses.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations of any one or more of the clauses.

A processor (e.g., 210) comprising modules for carrying out one or more methods or operations of any one or more of the clauses.

A hardware apparatus comprising circuits (e.g., 210) configured to perform one or more methods or operations of any one or more of the clauses.

An apparatus comprising means (e.g., 210) adapted for performing one or more methods or operations of any one or more of the clauses.

An apparatus comprising components (e.g., 210) operable to carry out one or more methods or operations of any one or more of the clauses.

A computer-readable storage medium (e.g., 240, one or more internal, external or remote memories, or one or more registers) comprising instructions stored therein, the instructions comprising code for performing one or more methods or operations of any one or more of the clauses.

A computer-readable storage medium (e.g., 240, one or more internal, external or remote memories, or one or more registers) storing instructions that, when executed by one or more processors, cause one or more processors to perform one or more methods or operations of any one or more of the clauses.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for facilitating wireless communication in a 20 megahertz (MHz) channel bandwidth, the apparatus comprising:
    one or more memories; and
    one or more processors coupled to the one or more memories, the one or more processors configured to cause:
        determining a high efficiency long training field (HE-LTF) mode among a plurality of HE-LTF modes including a 4x HE-LTF mode and a 2x HE-LTF mode;
        generating an HE-LTF symbol by using a portion or an entirety of an HE-LTF sequence corresponding to the 20 MHz channel bandwidth and the determined HE-LTF mode, wherein the HE-LTF sequence is among a plurality of HE-LTF sequences for the plurality of bandwidths and the plurality of HE-LTF modes, wherein the HE-LTF sequence includes zero values on every odd subcarrier index of a first range of subcarrier indices and a second range of subcarrier indices, non-zero values on every even subcarrier index of the first range and the second range, and direct current tones on subcarrier indices of a third range of subcarrier indices; and
        transmitting a high efficiency physical layer protocol data unit (HE PPDU) including the HE-LTF symbol, in the 20 MHz channel bandwidth.

2. The apparatus of claim 1, wherein the plurality of HE-LTF sequences includes a first HE-LTF sequence for the 20 MHz channel bandwidth and the 4x HE-LTF mode, and a second HE-LTF sequence for the 20 MHz channel bandwidth and the 2x HE-LTF mode.

3. The apparatus of claim 2, wherein the second HE-LTF sequence includes zero values on every odd subcarrier index from −122 to −2 that corresponds to the first range of subcarrier indices, non-zero values on every even subcarrier index from −122 to −2, direct current (DC) tones on subcarrier indices from −1 to 1 that corresponds to the third range of subcarrier indices, non-zero values on every even subcarrier index from 2 to 122 that corresponds to the second range of subcarrier indices, and zero values on every odd subcarrier index from 2 to 122.

4. The apparatus of claim 3, wherein the second HE-LTF sequence includes plural unit sequences corresponding to plural resource units, and wherein each of the plural unit sequences corresponds to one of plural base sequences multiplied by +1 or −1.

5. The apparatus of claim 4, wherein the number of the plural unit sequences is 9, the number of the plural resource units is 9, and each of the plural unit sequences has 26 elements whose value are +1, 0 or −1.

6. The apparatus of claim 2, wherein the first HE-LTF sequence includes non-zero values on subcarrier indices from −122 to −2 that corresponds to the first range of subcarrier indices, direct current (DC) tones on subcarrier indices from −1 to 1 that corresponds to the third range of subcarrier indices, and non-zero values on subcarrier indices from 2 to 122 that corresponds to the second range of subcarrier indices.

7. The apparatus of claim 6, wherein the first HE-LTF sequence includes plural unit sequences corresponding to plural resource units, wherein each of the plural unit sequences corresponds to one of plural base sequences multiplied by +1 or −1.

8. The apparatus of claim 7, wherein the number of the plural unit sequences is 9, the number of the plural resource units is 9, and each of the plural unit sequences has 26 elements whose value are +1 or −1.

9. The apparatus of claim 2, wherein the plurality of HE-LTF modes further includes a 1x HE-LTF mode, and
wherein the plurality of HE-LTF sequences further includes a third HE-LTF sequence for the 20 MHz channel bandwidth and the 1x HE-LTF mode.

10. The apparatus of claim 9, wherein the third HE-LTF sequence includes zero values on subcarrier indices from −122 to −4 excluding every fourth subcarrier index from −122 to −4, non-zero values on every fourth subcarrier index from −122 to −4, zero values on subcarrier indices of −3 and −2, direct current (DC) tones on subcarrier indices from −1 to 1, zero values on subcarrier indices of 2 and 3, non-zero values on every fourth subcarrier index from 4 to 122, and zero values on subcarrier indices from 4 to 122 excluding every fourth subcarrier index from 4 to 122.

11. The apparatus of claim 1, wherein a duration of the HE-LTF symbol excluding a guard interval is 12.8 microseconds when the determined HE-LTF mode is 4x HE-LTF mode, and
wherein a duration of the HE-LTF symbol excluding a guard interval is 6.4 microseconds when the determined HE-LTF mode is 2x HE-LTF mode.

12. The apparatus of claim 1, wherein the HE PPDU is a downlink non-orthogonal frequency division multiple access (non-OFDMA) PPDU.

13. The apparatus of claim 1, wherein a part of the HE-LTF sequence is used for generating the HE-LTF symbol, the part corresponds to a resource unit which is allocated to the apparatus, and the HE PPDU is an uplink non-orthogonal frequency division multiple access (non-OFDMA) PPDU.

14. An apparatus for facilitating wireless communication in a 20 megahertz (MHz) channel bandwidth, the apparatus comprising:
one or more memories; and
one or more processors coupled to the one or more memories, the one or more processors configured to cause:
receiving a downlink high efficiency physical layer protocol data unit (HE PPDU) including a high efficiency long training field (HE-LTF) symbol, in the 20 MHz channel bandwidth; and
obtaining, from the HE-LTF symbol, a portion or an entirety of an HE-LTF sequence corresponding to the 20 MHz channel bandwidth and an HE-LTF mode of the HE-LTF symbol, wherein the HE-LTF mode is one of a plurality of HE-LTF modes including a 2x HE-LTF mode and a 4x HE-LTF mode, wherein the HE-LTF sequence includes zero values on every odd subcarrier index of a first range of subcarrier indices and a second range of subcarrier indices, non-zero values on every even subcarrier index of the first range and the second range, and direct current tones on subcarrier indices of a third range of subcarrier indices.

15. The apparatus of claim 14, wherein, when the HE-LTF mode is 2x HE-LTF mode, the HE-LTF sequence includes zero values on every odd subcarrier index from −122 to −2 that corresponds to the first range of subcarrier indices, non-zero values on every even subcarrier index from −122 to −2, DC tones on subcarrier indices from −1 to 1 that corresponds to the third range of subcarrier indices, non-zero values on every even subcarrier index from 2 to 122 that corresponds to the second range of subcarrier indices, and zero values on every odd subcarrier index from 2 to 122.

16. The apparatus of claim 15, wherein the HE-LTF sequence includes plural unit sequences corresponding to plural resource units, and wherein each of the plural unit sequences corresponds to one of plural base sequences multiplied by +1 or −1.

17. The apparatus of claim 16, wherein the number of the plural unit sequences is 9, the number of the plural resource units is 9, and each of the plural unit sequences has 26 elements whose value are +1, 0 or −1.

18. An apparatus for facilitating wireless communication in a 20 megahertz (MHz) channel bandwidth, the apparatus comprising:
one or more memories; and
one or more processors coupled to the one or more memories, the one or more processors configured to cause:
determining a high efficiency long training field (HE-LTF) mode among a plurality of HE-LTF modes including a 4x HE-LTF mode and a 2x HE-LTF mode;
generating an HE-LTF symbol by using a portion or an entirety of an HE-LTF sequence corresponding to the 20 MHz channel bandwidth and the determined HE-LTF mode, wherein the HE-LTF sequence includes zero values on every odd subcarrier index of a first range of subcarrier indices and a second range of subcarrier indices, non-zero values on every even subcarrier index of the first range and the second range, and direct current tones on subcarrier indices of a third range of subcarrier indices; and
transmitting a high efficiency physical layer protocol data unit (HE PPDU) including the HE-LTF symbol, in the 20 MHz channel bandwidth.

19. The apparatus of claim 18, wherein, when the HE-LTF mode is 2x HE-LTF mode, the HE-LTF sequence includes zero values on every odd subcarrier index from −122 to −2 that corresponds to the first range of subcarrier indices, non-zero values on every even subcarrier index from −122 to −2, DC tones on subcarrier indices from −1 to 1 that corresponds to the third range of subcarrier indices, non-zero values on every even subcarrier index from 2 to 122 that corresponds to the second range of subcarrier indices, and zero values on every odd subcarrier index from 2 to 122.

20. The apparatus of claim 19, wherein the HE-LTF sequence includes plural unit sequences corresponding to plural resource units, and wherein each of the plural unit sequences corresponds to one of plural base sequences multiplied by +1 or −1.

* * * * *